United States Patent [19]
Kool et al.

[11] Patent Number: 5,802,584
[45] Date of Patent: Sep. 1, 1998

[54] HARDWARE ALIGNMENT IN A HEADERLESS DISK DRIVE ARCHITECTURE

[75] Inventors: Fred A. Kool, Aptos; John S. Packer, Milpitas, both of Calif.

[73] Assignee: Adaptec, Inc., Milpitas, Calif.

[21] Appl. No.: 522,639

[22] Filed: Sep. 1, 1995

[51] Int. Cl.$^6$ .................................................. G06F 12/00
[52] U.S. Cl. .................... 711/154; 360/77.08; 360/51; 360/48
[58] Field of Search ................... 364/200; 360/48, 360/77.08, 51; 711/154

[56] References Cited

U.S. PATENT DOCUMENTS

| | | | |
|---|---|---|---|
| 4,509,118 | 4/1985 | Shenk | 364/200 |
| 5,068,755 | 11/1991 | Hamilton | 360/72.1 |
| 5,257,143 | 10/1993 | Zangenenpour | 360/48 |
| 5,274,509 | 12/1993 | Buch | 360/48 |
| 5,420,893 | 5/1995 | Ward | 375/368 |
| 5,422,763 | 6/1995 | Harris | 360/51 |
| 5,455,721 | 10/1995 | Namazie | 360/51 |
| 5,523,903 | 6/1996 | Hetzler et al. | 360/77.08 |
| 5,592,348 | 1/1997 | Strang, Jr. | 360/77.08 |
| 5,627,695 | 5/1997 | Prins et al. | 360/51 |
| 5,640,286 | 6/1997 | Acosta et al. | 360/48 |

*Primary Examiner*—Tod R. Swann
*Assistant Examiner*—David Langjahr
*Attorney, Agent, or Firm*—Skjerven, Morrill, MacPherson, Franklin & Friel LLP; David T. Millers

[57] ABSTRACT

A disk controller for headerless disk drive system contains a decoder which decodes control words from a data buffer and counts pulses of a byte clock to identify the boundaries of requested data sectors in data frames. To select the control words which correspond to the position of a read/write head relative to media containing the data, the disk controller also contains a programmable alignment processor and an EOS counter that increments in response to EOS pulses generate as the read/write head passes servo sectors. The EOS counter indicates the position of the read/write head by indicating a data frame over which the head is positioned. The alignment processor scans the control words to locate the control word corresponding the data frame indicated by the EOS counter. During the scanning, the alignment processor also aligns logical and physical data sector counters to the position of the read/write head. The disk controller uses the aligned values and begins decoding the control words and controlling data transfer.

24 Claims, 33 Drawing Sheets

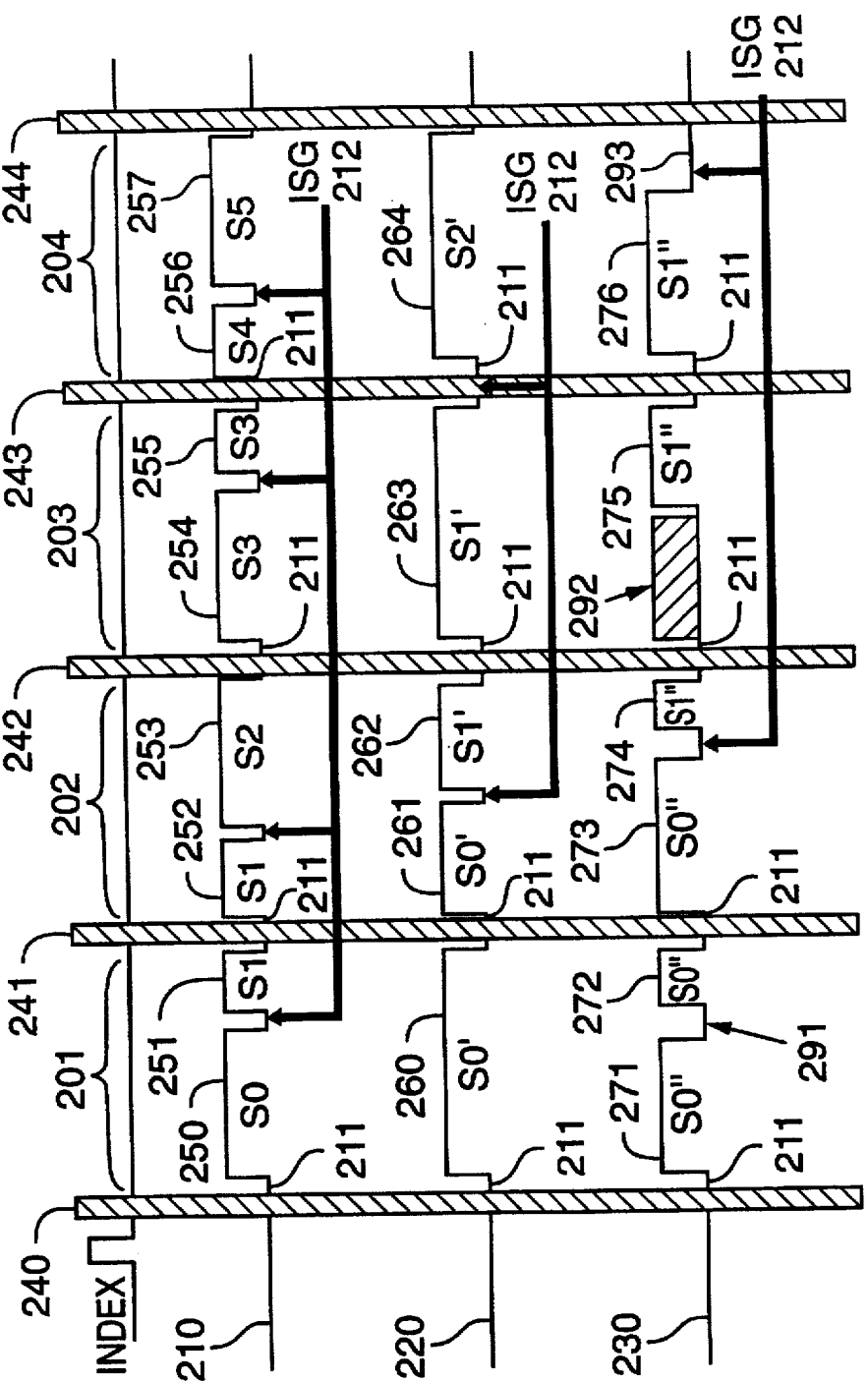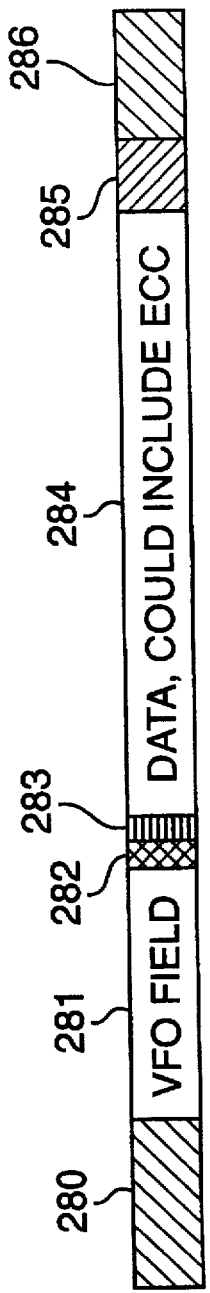
FIG. 2A
FIG. 2B

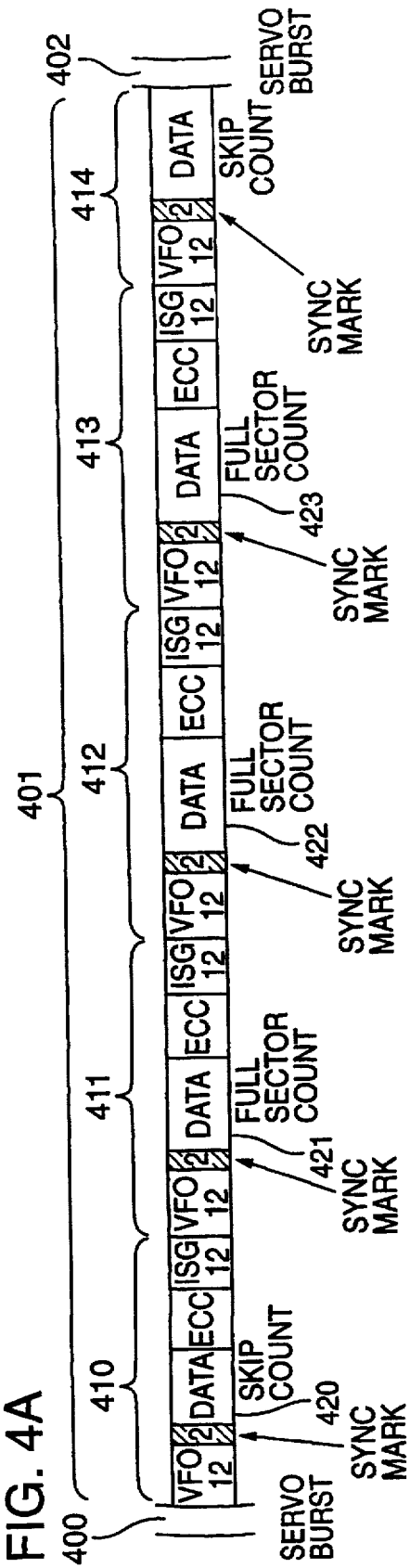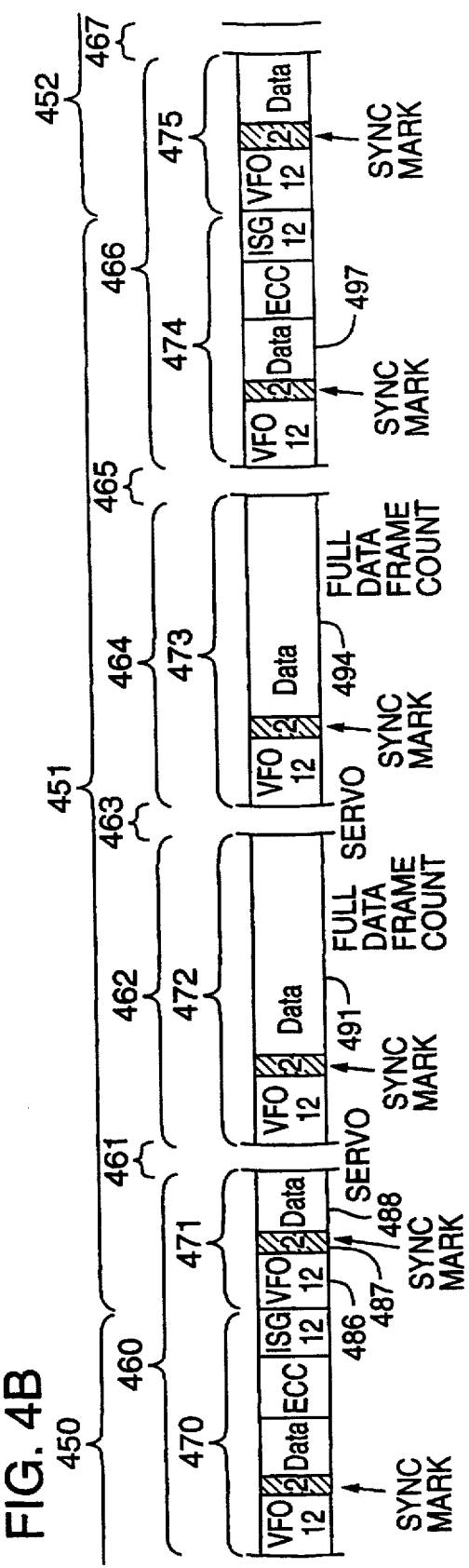

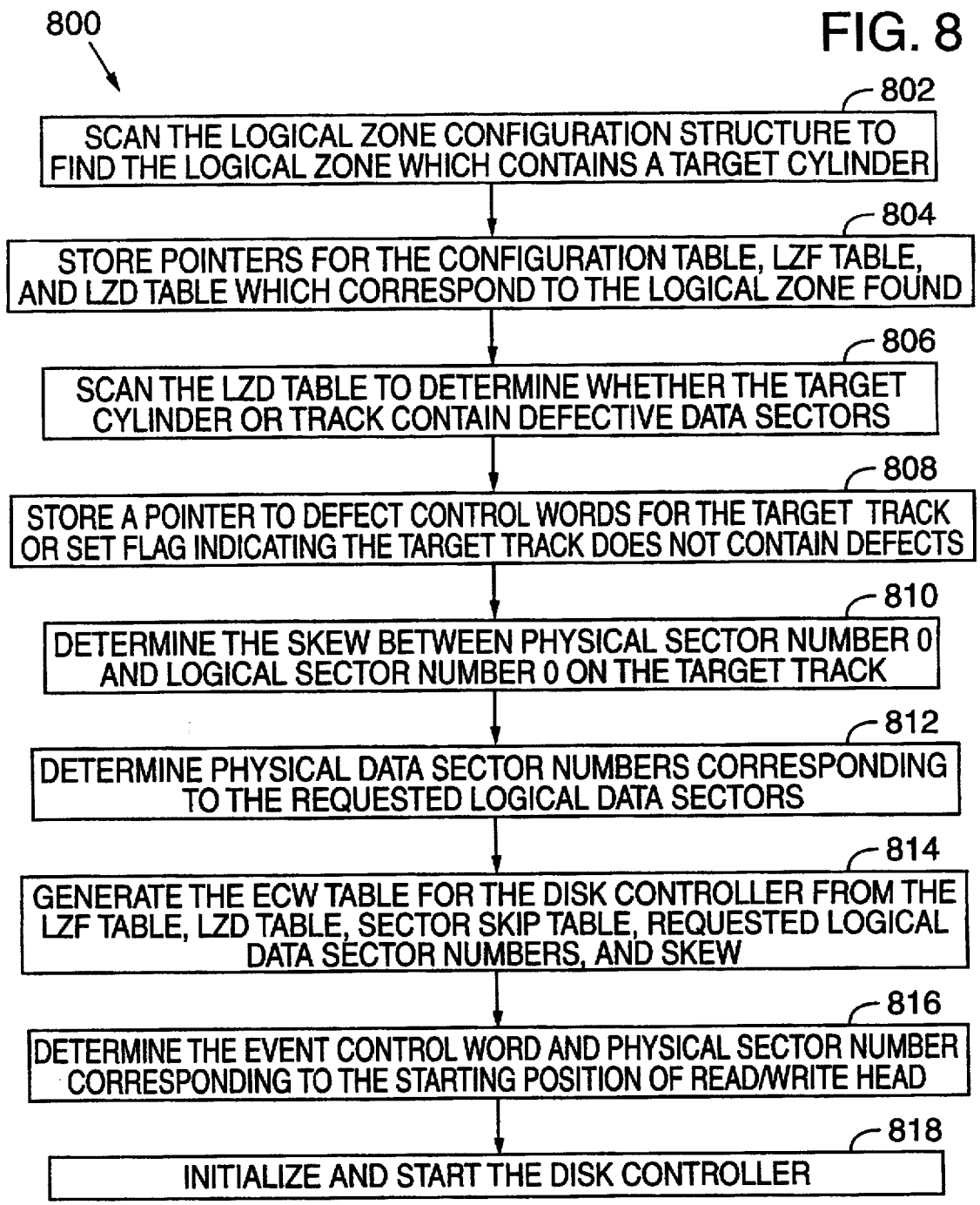

NOTES: 1) LASTHEAD=BIT 14 OF DEAFHEAD ENTRY
2) LAST DEFECT=BIT 15 OF DEFNUM ENTRY
3) FLAG3 IS USED TO SAVE THE INFORMATION THAT THIS IS THE LAST HEAD OR TRACK OF THIS CYLINDER

NOTES: 1) LAST DEFECT=BIT 15 OF DEFNUM ENTRY

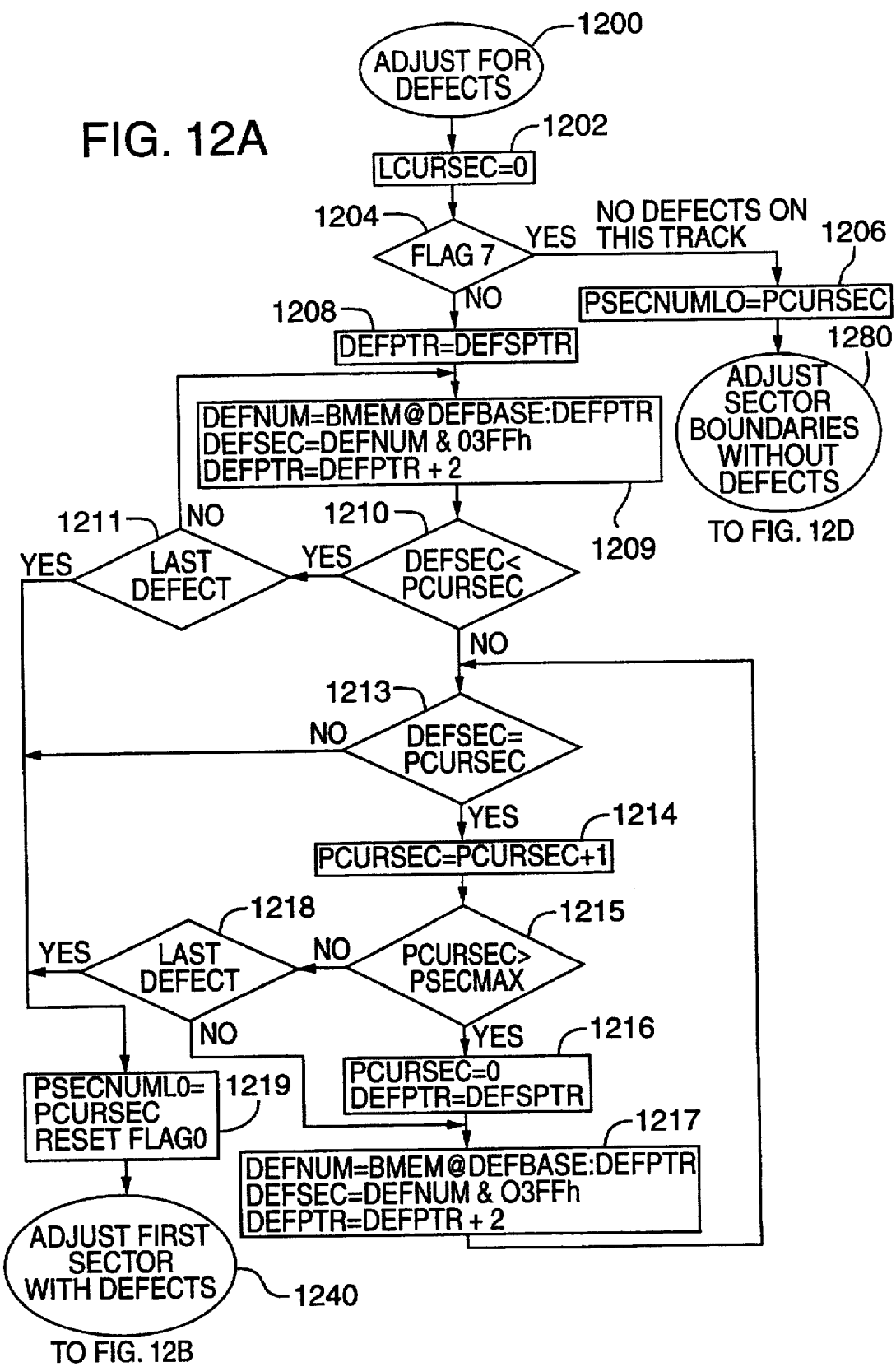

NOTES:
1) NS=DECODE OF SEGSEL FIELD WHICH DEFINES A NEW SECTOR SEGMENT.
2) FLAG7 IS SET TO INDICATE NO DEFECTIVE SECTORS ON THIS TRUCK.
3) FLAG5 IS SET TO INDICATE THE LAST DEFECT OF THE TRACK HAS BEEN PROCESSED.
4) LASTDEF IS BIT 15 OF THE DEFECT TABLE DEFNUM ENTRY.
5) SEEKCMPLT IS A BIT OF ABRCH REGISTER OR INPUT BRANCH FROM I/O PIN.

NOTE: 1) SKIPWD[15] IS SET WHEN THE CURRENT REQUESTED SECTOR IS TO BE SKIPPED.

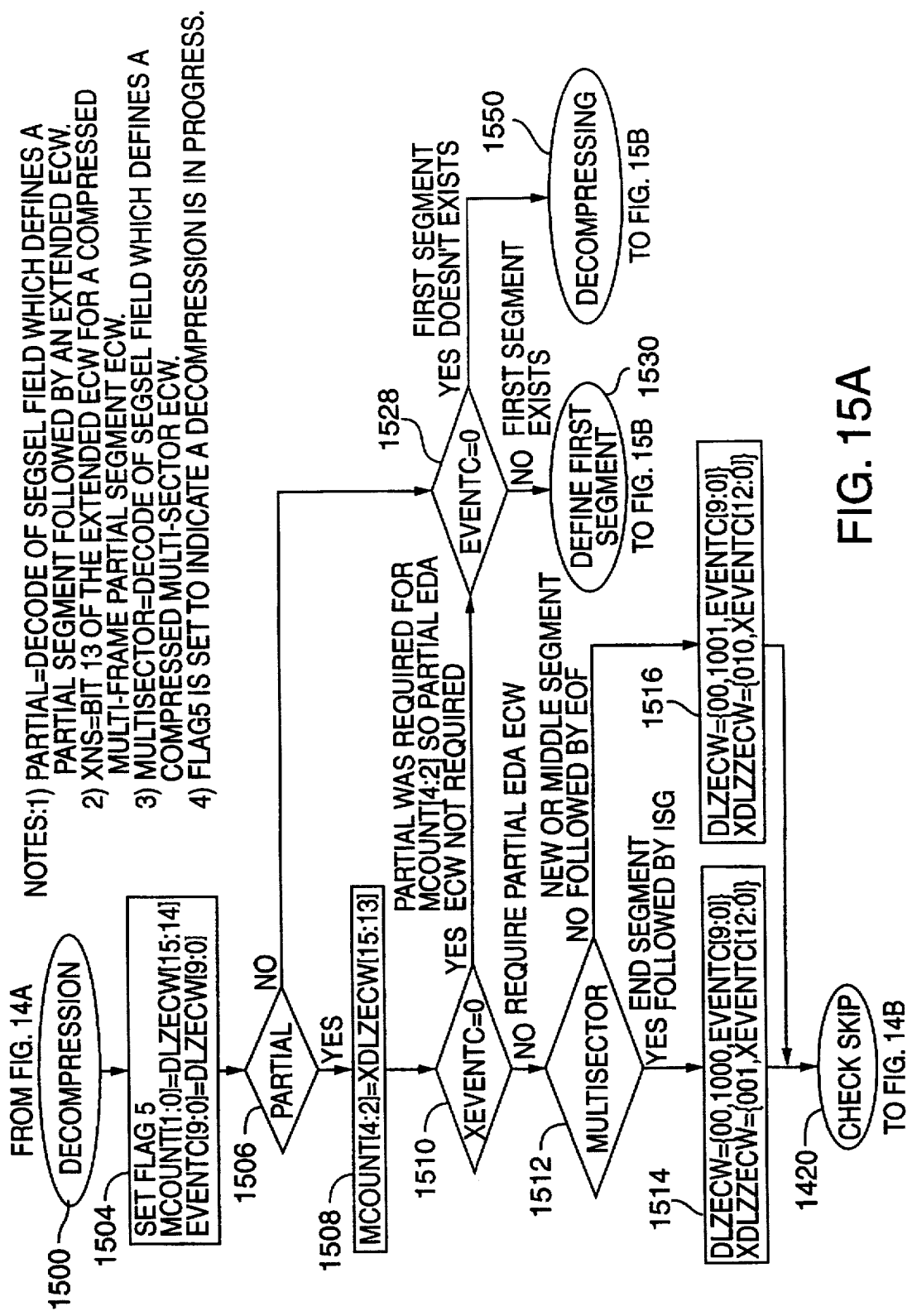

HARDWARE ALIGNMENT IN A HEADERLESS DISK DRIVE ARCHITECTURE

CROSS-REFERENCE TO RELATED APPLICATIONS

This application is related to co-filed and co-owned U.S. patent application Ser. No. 08/522,687, entitled "LOGICAL AND PHYSICAL ZONES FOR HARDWARE MANAGEMENT OF DEFECTS IN A HEADERLESS DISK DRIVE ARCHITECTURE", and U.S. patent application Ser. No. 08/522,039, entitled "PROGRAMMABLE DATA TRANSFER WITHOUT SECTOR PULSES IN A HEADERLESS DISK DRIVE ARCHITECTURE", which are hereby incorporated by reference in their entirety.

BACKGROUND OF THE INVENTION

1. Field of the Invention

This invention relates to disk drive systems having headerless data sector architectures.

2. Description of Related Art

Conventional disk dive systems (hard disks) store data in concentric tracks on one or more disks of a magnetic media. Read/write heads, one for each surface of the magnetic media, read and write data sectors in the tracks. To read or write a data sector, the disk drive system radially positions one of the read/write heads over a target track. Embedded servo sectors in the tracks contain fields which identify the radial position of the read/write heads. Conventional disk drives determine the angular position of the read/write heads from marks in the tracks.

A data frame is a writable area between two servo sectors. Depending on the media, disk rotational speed, and data sector size, a data frame may contain multiple data sectors, or one data sector may span multiple data frames. In either case, servo sectors can split a data sector into two or more data segments. Typically, a header in a data sector on the media provides information which identifies the data sector, indicates locations (if any) of splits in the data sector, and indicates whether the data sector is valid or defective.

A headerless disk architecture identifies data sectors without data sector headers. Removing headers from the data sectors increases the space available for data storage but complicates identification of data sectors, splits, and defects. A disk controller in the disk drive system must obtain format information from sources other than an on-disk header and must synchronize the information with the position of the read/write heads relative to the media. Storing detailed format information in a memory such as a data buffer typically requires a large amount of memory, especially if formats differ track to track because of defects. Selecting format information for the position of a read/write head can occupy a considerable fraction of the processing time of a microprocessor in the disk drive system. A more expensive microprocessor is often required to permit real time selection of format information during read and write operations.

Typically, alignment of format information requires that a servo control unit detect where data sectors start and generate a signal containing data sector pulses that indicate when a read/write head reaches a data sector. This makes servo control units more complex. Additionally, the track formats must include inter-sector gaps with sufficient length for the servo control unit to generate a data sector pulse and the disk controller to sense the data sector pulse within the time in which an inter-sector gap passes under a read/write head.

SUMMARY OF THE INVENTION

In accordance with an embodiment of the invention, a disk controller includes a disk controller that decodes event control words to identify boundaries of frame fields on a disk. A programmable alignment processor selects the event control words decoded by the disk controller so that the actions of the disk controller are aligned with the position of a read/write head relative to a track on a disk. The disk controller and the alignment processor are typically integrated as components of a monolithic integrated disk control circuit, but functions of the alignment processor can be implemented in firmware executed by a separate microprocessor.

One hardware embodiment of the alignment processor contains: a buffer controller for reading control words from and writing control words to an external memory; an instruction sequencer which executes a program that converts logical zone control words, defect control words, and sector skip table into event control words that describe a transfer operation on a target track. The disk controller decodes the event control words to identify structures on the target track and control the data transfer. The alignment processor also synchronizes the disk controller with the position of read/write head relative to the target track by selecting the event control words decoded by the disk controller. Typically, the alignment processor selects event control words according to a value in a counter that counts end of servo (EOS) pulses and indicates a data frame over which a read/write head is positioned.

BRIEF DESCRIPTION OF THE DRAWINGS

FIGS. 2A and 2B illustrate track formats in a disk drive system in accordance with an embodiment of the invention.

FIGS. 4A and 4B illustrate track formats described by compressed control words in accordance with an embodiment of the invention.

FIG. 8 shows a flow diagram of alignment processor operations in accordance with an embodiment of the invention.

FIGS. 12A, 12B, 12C, and 12D show flow diagrams of processes which determine physical sector numbers corresponding to a range of requested data sectors.

FIGS. 15A and 15B show a flow diagram of a process which decompresses compressed LZ control words.

Use of the same reference symbols in different figures indicates similar or identical items.

DETAILED DESCRIPTION OF THE PREFERRED EMBODIMENTS

Figure 1:
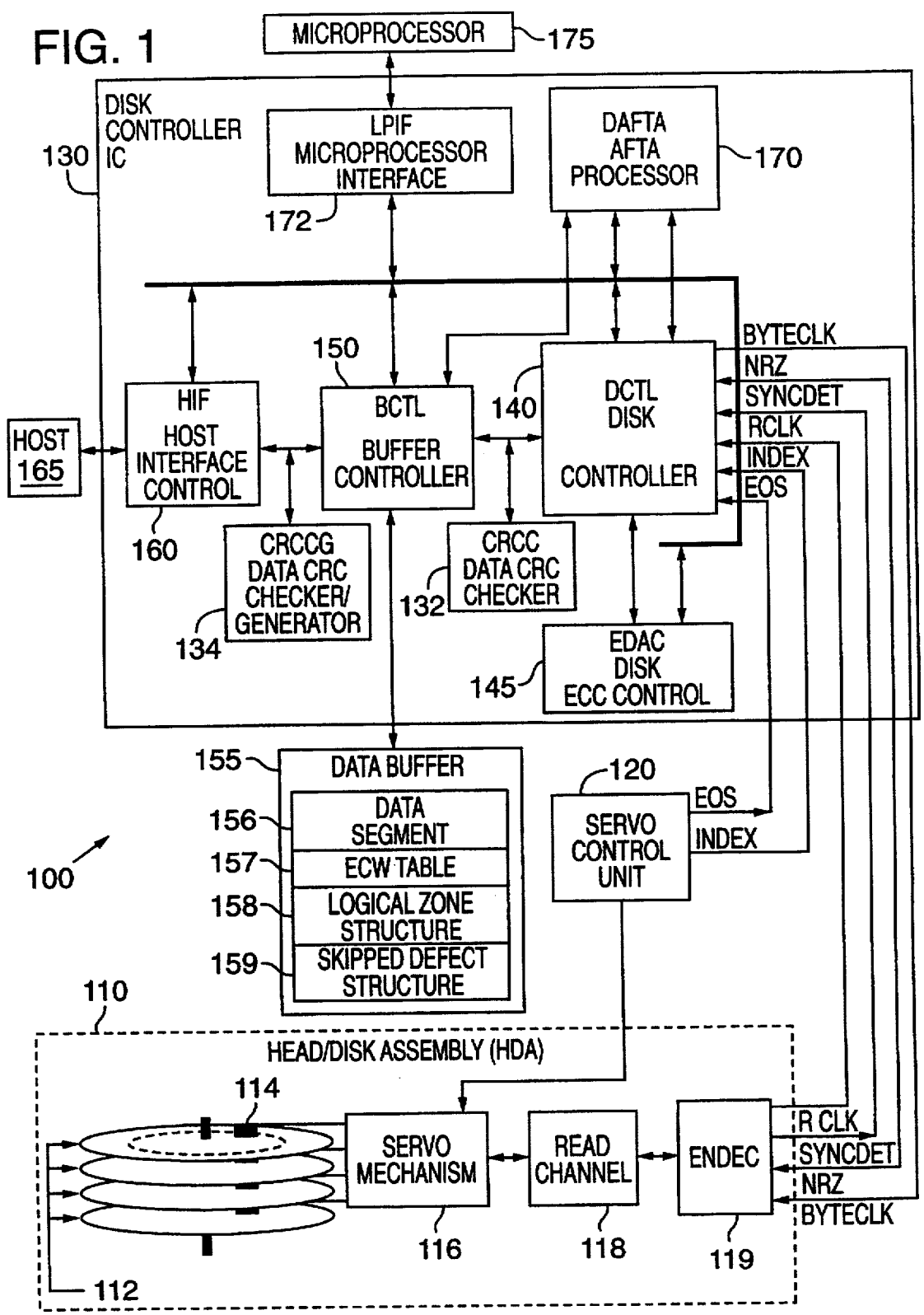
FIG. 1 shows a block diagram of a disk drive system in accordance with an embodiment of the invention.

FIG. 1 shows a headerless architecture for a disk drive system 100 that contains a disk controller 140 that identifies data sectors and splits in data sectors using event control words (ECWs) stored in a data buffer 155. The ECWs describe the format of a track on a magnetic media (disks) 112. An alignment processor 170, also referred to herein as automatic full track architecture (AFTA) processor 170, generates the ECWs from data structures stored in data buffer 155. The data structures include a logical zone structure 158 and a skipped defect structure 159. Logical zone structure 158 contains logical zone format (LZF) tables which contain logical zone (LZ) control words and indicate formats for tracks in logical zones of media 112. Skipped defect structure 159 contains defect control words which indicate defective data sectors that should be skipped.

Each event control word contains an event-count indicating the number of bytes in a variable length frame field and typically specifies what occurs during, before, and/or after the frame field. Disk controller 140, which controls data transfer between data buffer 155 and media 112, decodes event control words to identify events such as read/write heads 114 reaching a data sector, a defect field, or a servo sector. Disk controller 140 begins controlling a data transfer by decoding an event control word selected by alignment processor 170. The first ECW to be decoded corresponds to the position of read/write heads 114 relative to media 112, as indicated by an EOS count. The EOS count is a count of pulses generated at the end of servo sectors and identifies the data frame over which read/write heads 114 are currently positioned.

In the embodiment of FIG. 1, a disk control IC 130 contains alignment processor 170 and disk controller 140. Alternatively, a microprocessor (MPU) 175 connected to microprocessor interface 172 executes firmware which implements the functions of alignment processor 170. Alignment processor 170 determines which physical data sectors are to be transferred, determines a read scenario for zero latency read (ZLR) operations, generates ECW table 157 for a track containing the requested data sectors, aligns disk controller 140 with media 112, and loads registers of disk controller 140 to start the transfer.

Disk controller 140 synchronizes data transfers according to EOS pulses and sync detection signals which indicate when read/write heads 114 pass over servo sectors and data sync fields on media 112. The boundaries of data fields are identified relative to the start of a data frame (after an EOS pulse) or the start of data segment (after sync detection) by counting bytes. Event-counts from event control words or from registers in disk controller 140 indicate the byte counts of frame fields. Accordingly, data sector pulses from a servo control unit 120 are not required to identify data sectors. This simplifies servo control hardware, increases data storage capacity, and increases data transfer rates.

Disk drive system 100 has a conventional head/disk assembly (HDA) 110 which includes magnetic media 112, read/write heads 114, a servo mechanism 116, a read channel 118, and an encoder/decoder 119. Servo mechanism 116 positions read/write heads 114 radially for reading or writing data on media 112 at locations indicated by cylinder, head, and physical sector numbers. Cylinder, head, and physical sector numbers identify a data sector by respectively indicating a radial position of read/write heads 114, a selected one of read/write heads 114, and an angular position of media 112 relative to read/write heads 114. During a seek, servo mechanism 116 moves read/write heads 114 to a target cylinder containing a target track. (A cylinder is the set of tracks, one track on each surface of media 112, and corresponds to a particular radial position of read/write heads 114.)

Servo control unit 120 controls servo mechanism 116, reads servo sectors from media 112, and sends signals EOS and INDEX to disk controller 140. Signal EOS is a series EOS pulses. Servo control unit 120 generates an EOS pulse each time read/write heads 114 pass the end of a servo sector. Servo control unit 120 generates an index pulse in signal INDEX upon reading an index servo sector.

Disk controller 140 is compatible with a variety of servo control units and head disk assemblies. Disk controller 140 digitally filters signals INDEX and EOS and generates a one-clock-cycle pulse from the leading edge of each index or EOS pulse. The filtering ignores narrow pulses having a pulse width less than a minimum width and detects wide pulses that are wider than a maximum width. In one embodiment, to reduce filtering time, the minimum and maximum widths are respectively one and two clock cycles of a relatively fast clock signal such as a signal BUFCLK (the clock signal used by a buffer controller 150). Disk controller 140 is configurable to detect leading or trailing edges of index and EOS pulses that are asserted high or low.

In one embodiment of the invention, disk controller 140 operates in two modes, sector pulse positioning mode or byte counting positioning mode. Sector pulse positioning mode synchronizes to EOS pulses and again to sector pulses generated at the starts of data sectors. Servo control unit 120 generates sector pulses in a conventional manner well known in the art using a counter running on the servo clock. Byte counting positioning mode synchronizes to EOS pulse and does not require sector pulses because event-counts and a byte clock indicate the starts of data sectors.

Disk controller 140 controls data transfers from a selected one of read/write heads 114 through encoder/decoder 119 and read channel 118. For example, during a read, read channel 118 and encoder/decoder 119 convert magnetically induced analog signals from the selected read/write head into digital signals including a data signal NRZ. During a write, disk controller 140 sends data signal NRZ to encoder/decoder 119 to control writing of the frame fields, such as VFO (Variable Frequency Oscillator) fields, data sync fields, and data fields. For writing a data field to media 112, disk controller 140 reads data from a data segment 156 of data buffer 155 and generates signal NRZ at a byte-rate indicated by a write clock signal WCLK. Encoder/decoder 119 and read channel 118 convert signal NRZ from disk controller 140 to pulses which the selected one of read/write heads 114 writes to media 112.

Disk controller 140 has two modes of data sync detection, internal and external. The mode employed depends on read channel 118. In the external sync mode, read channel 118 supplies a sync detect signal SYNCDET which has a fixed time offset relative to the start of a data field. A sync offset register SYNCOFS in disk controller 140 indicates the offset between sync detect signal SYNCDET and data bytes from read channel 118. In the internal sync mode, disk controller 140 recognizes a data sync field from a sync byte indicated by signal NRZ. Some conventional read channel ICs indicate a sync byte through signal NRZ in place of, or sometimes in addition to, sync detect signal SYNCDET. In internal sync mode, disk controller 140 is programmable to handle a data sync field containing either a single sync byte or multiple sync bytes.

A host device 165 such as a computer connects to disk system 100 through a host interface 160. When host device 165 requests data transfer, MPU 175 and alignment processor 170 determines target cylinder, head, and sector numbers corresponding to the transfer. Disk controller 140 directs servo control unit 120 to seek to the target cylinder. Alignment processor 170 generates event control words describing the track format for the target cylinder and head, stores the event control words in ECW table 157, and initializes a pointer to select to an event control word corresponding to the position of read/write heads 114 relative to media 112. Disk controller 140 loads event control words from ECW table 157 at the address indicated by the pointer and identifies frame fields using the control words.

Typically, host device 165 provides logical block addresses (LBA) which indicate logical data sectors somewhere on media 112. In one embodiment of the invention, MPU 175 converts the LBAs to logical cylinder, head, and sector numbers, and alignment processor 170 converts the logical cylinder, head, and sector numbers to physical cylinder, head, and sector numbers which indicate the physical position of requested data sectors. Alternatively, alignment processor 170 is programmed to convert the LBAs to physical cylinder, head, and sector numbers.

Each logical zone in accordance with the invention is a set of tracks with the same track format and has a logical zone format (LZF) table in logical zone structure 158. The LZF table for a logical zone indicates the track format for the tracks in the logical zone. Track formats depends on the implementation of disk drive system 100, but each track generally contains embedded servo sectors which divide the track into data frames. The embedded servo sectors contain servo fields which servo control unit 120 uses to identify a target track and to keep read/write heads 114 centered on the target track after a seek. The LZF table indicates where a servo writer wrote the servo sectors on tracks of media 112 and also indicates the locations of physical data sectors in data frames defined by the servo sectors.

The number of data frames on a track and the number of data sectors per data frame depends on the rotational velocity and bit density of the track. Typically, tracks on media 112 are partitioned into physical zones, and each physical zone contains tracks having relatively constant bit densities and velocities. Tracks in a physical zone have servo sectors located in the same areas relative to an index field on the track. If media 112 is defect free, every track in a physical zone has physical data sectors at the same relative locations relative to the servo sectors.

If media 112 has defective areas, some tracks in a physical zone can be formatted differently from other tracks in the physical zone. In accordance with this invention, a logical zone is a group of tracks that have the same track format, even after compensation for defects. For example, if a radial scratch through half of a physical zone causes a defect that is repeated for half of the tracks in the physical zone, the physical zone can be broken into two logical zones, one logical zone with a track format accounting for the defect, and another logical zone with a track format for defect-free media.

FIG. 2A shows servo sectors 240 to 244 which define the boundaries of four data frames 201 to 204. Data frames 201 to 204 contain frame fields written according to a track format such as format 210, 220, or 230. Frame fields include: EOS jitter fields (EJFs) 211; inter-segment gap (ISG) fields 212; frame fields inside data segments; and swallowed defect fields. EJFs 211 are unusable spaces on media 112 which pass under read/write heads 114 during the time required to generate, detect, and act upon EOS pulses. EJFs 211 have lengths that depend on the timing of the EOS pulses.

Normally, servo control unit 120 reads servo fields in a servo sector and generates an EOS pulse after reading the last servo field; but if the servo sector is defective or not readable, servo control unit 120 generates an EOS pulse after a predetermined timeout period. EOS pulses for valid data sectors are delayed so that the timing of EOS pulses relative to the start of the next data frame is the nearly the same for both valid and defective servo sectors. However, the time between an EOS pulse and read/write heads 114 reaching the start of a data frame still has some jitter. As described below, during a read operation, a read gate delay (RGD) can be inserted following an EJF or preceding a data segment to compensate for the difference between the length of the EJF when data was written and the length of the EJF when data is read.

Some servo control units generate sector pulses which indicate the start of a data sector, while read/write heads are over an inter-sector gap (ISG) field. Accordingly, such inter-sector gap fields must be long enough for hardware to generate, detect, and act on a sector pulse. In accordance with an embodiment of this invention, disk controller 140 identifies data sectors without sector pulses, and ISG fields 212 are shorter. This makes more space available for data segments and increases data transfer rates. In a typical embodiment of the invention, ISG fields 212 are each about twice the expected jitter in the timing of EOS pulses to stop data segments from overlapping.

Track format 210 has 1.5 data sectors per data frame and divides data frames 201 to 204 into data sectors S0 to S5. Track format 220 has two data sectors for every three data frames and divides data frames 201 to 204 into data sectors S0' and S1' and part of a data sector S2'. Data sectors S0 to S5 and S0' to S2' each contain one or more of data segments 250 to 257 and 260 to 264. For example, data sector S0 contains a single data segment 250, and data sector S1 contains two data segments 251 and 252.

Each data segment 250 to 257 and 260 to 261 contains a data field 284 and overhead fields such as a VFO field 281, a training field 282, a data sync field 283, and a pad field 285 as shown in FIG. 2B. Data field 284 contains storage locations for data bytes and possibly for an error correction code (ECC). Overhead fields typically have lengths that are the same for all data segments in a track and are defined by the manufacture of the disk drive system. VFO field 281 is typically about 12 bytes written with a constant value. When one of read/write heads 114 reads VFO field 281, a phase-locked loop in disk controller 140 locks onto the frequency of a pulse train in signal NRZ caused by bytes in VFO field 281 and generates a byte clock signal BYTECLK at the frequency of the pulse train. Disk controller 140 determines from event-counts, when to expect VFO field 281.

Data sync field 283 is for byte alignment of data field 284. Typically, bytes in VFO field 281 have value zero, and data sync field 283 contains one or more non-zero bytes. Multiple bytes in data sync field 283 increase fault tolerance. In internal sync detection mode, disk controller 140 detects data sync field 283. In external sync detection mode, read channel 118 and encoder/decoder 119 detect data sync field 283 and assert sync detect signal SYNCDET to disk controller 140. For 8/9 run length limited (RLL) encoding, where eight bits (a byte) of information are encoded on disk as nine bits with a limited maximum run of consecutive bits without a transition between 0 and 1, encoder/decoder 119 requires training field 282 between VFO Field 281 and sync field 283. Training field 282 provides an unambiguous pattern that when read and decoded prepares sync detection circuits for decoding the sync pattern.

Disk drive system 100 uses two defect handling methods. One defect handling method, referred to herein as defect skipping, creates, in skipped defect structure 159, an LZD table for each logical zone. The LZD table contain defect control words indicating the physical sector numbers of defective data sectors in tracks of the logical zone. Spare data sectors are provided on media 112 for use if a defective data sector is found and listed in an LZD table. The physical data sectors that are not defective or spare data sectors and therefore are usable for data storage, are referred to as logical data sectors. LBAs are in one-to-one correspondence with the logical data sectors. Typically, each track contains a fixed number of logical data sectors, and spare data sectors follow the last logical sector of the track. In alternative arrangements, the number of logical data sectors per track is not fixed, and spare data sectors are at specified locations on media, for example, on the last track of each cylinder.

Another defect handling method in accordance with this invention changes track formats to create swallowed defect fields so that defects on media 112 are between data segments of the physical data sectors. Track format 230 of FIG. 2A swallows defective areas 291 and 292 and could be generated by modifying track format 220. For example, defective area 291 splits data sector S0" into two data segments 271 and 272 in data frame 201. A data segment 273 of data sector S0" is in data frame 202 and is longer than data segment 261 of data sector S0', so that data sector S0" contains the same number of data storage locations as data sector S0'. A defective area 292 in data frame 203 is swallowed by creating a swallowed defect field which shifts the start of data segment 275 past the end of defective area 292. An area 293 in data frame 204 is an example of an area which is not defective but is unusable for storage because area 293 is too small for a minimum size data segment according to the format of FIG. 2B. A swallowed defect field can be created for area 293.

Defect swallowing in track format 230 allows data frames 201 to 204 contain two data sector S0" and S1". If defective areas 291 and 292 were present in track format 220, data sectors S0' and S1' would be defective, and data frames 201 to 204 would contain only one usable data segment 264 which is part of data segment S2'. Accordingly, defect swallowing can provide more usable data storage space on media 112.

Figure 3:
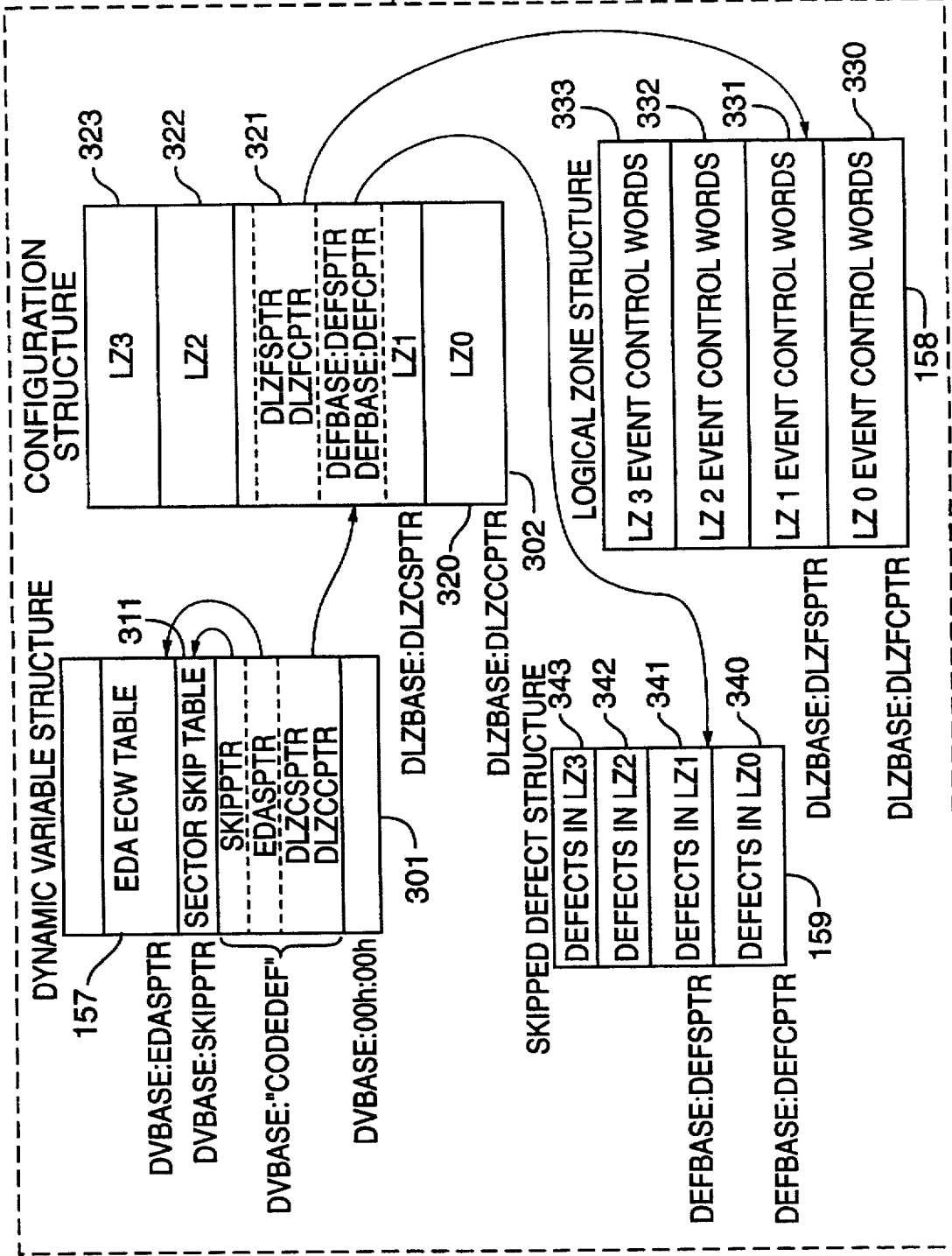
FIG. 3 illustrates a data structure which describes logical zones in accordance with an embodiment of the invention.

FIG. 3 shows a data structure describing a system with four logical zones. The data structure, which is stored in a memory such as data buffer 155, includes a dynamic variable structure 301, a configuration structure 302, logical zone format structure 158, and skipped defect structure 159. Configuration structure 302, logical zone format structure 158, and skipped defect structure 159 are subdivided into four configuration tables 320 to 323, four LZF tables 330 to 333, and four LZD tables 340 to 343, respectively, but more generally, the data structure has one configuration table, one LZD table, and one LZF table for each logical zone.

Values in dynamic variable structure 301 change with each disk I/O operation. Table 1 shows an example of variables contained in dynamic variable structure 301. Dynamic variable structure 301 contains a pointer DLZCSPTR which points to a configuration table in configuration structure 302, for a target track.

TABLE 1

Dynamic Variable Structure

| VARIABLE | Offset from DVBASE | DESCRIPTION |
|---|---|---|
| REQCYL | "REQCYL" | Requested Cylinder Number |
| REQHEAD | "REQHEAD" | Requested Head Number |
| LREQSECF | "LREQSECF" | Logical sector number of first requested data sector |
| LREQSECL | "LREQSECL" | Logical sector number of last requested data sector |
| MAXHEAD | "MAXHEAD" | Maximum number of heads |
| LREQSECFQ | "LREQSECFQ" | Queued logical sector number of first requested sector |
| LREQSECLQ | "LREQSECLQ" | Queued logical sector number of last requested sector |
| DLZCSPTR | "DLZCSPTR" | Offset from DLZBASE to configuration table for target logical zone |
| LCURRSEC | "LCURRSEC" | Logical Sector Number of Head Landing |
| PCURRSEC | "PCURRSEC" | Physical Sector Number of Head Landing |
| PSECNUML0 | "PSECNUML0" | Physical Sector Number of Logical Sector Number 0 |
| PREQSECF | "PREQSECF" | Physical Sector Number of the first Requested Sector |
| HOSTLINKNUM | "HOSTLINKNUM" | Number that defines the buffer segment for disk data. |
| SKIPPTR | "SKIPPTR" | Offset from DVBASE to sector skip table |
| EDASPTR | "EDASPTR" | Offset to ECW table |
| SKIPWD[0:63] | SKIPPTR to SKIPPTR + 126 | Sector skip table |
| EDAECW[0:n] | EDASPTR to EDASPTR + 2n | ECW table |

Table 2 shows the format of configuration structure 302.

TABLE 2

Configuration Structure

| Variable | Offset from DLZBASE | Description of Variable |
|---|---|---|
| DLZDCRCOFS | DLZCPTR | Offset to CRC Bytes for the Structure |
| LZSCYL | DLZCPTR + "LZSCYL" | First physical cylinder number in logical zone 0 |
| LZSPSEC | DLZCPTR + "LZSPSEC" | Physical sector number of logical sector 0 in the first cylinder of logical zone 0 |
| CYLSKEW | DLZCPTR + "CYLSKEW" | Cylinder skew for logical zone 0 |
| HDSKEW | DLZCPTR + "HDSKEW" | Head skew for logical zone 0 |
| PSECMAX | DLZCPTR + "PSECMAK" | Maximum number of physical sectors per track for logical zone 0 |
| LZREPEAT | DLZCPTR + "LZREPEAT" | Repeat size for LZF table of the logical zone 0 |
| EOSMAX | DLZCPTR + "EOSMAX" | Maximum value for EOS counter before wrap to 000h |
| SPARECNT | DLZCPTR + "SPARECNT" | Number of spare data sectors per Cylinder in logical zone |
| DEFBASE | DLZCPTR + "DEFBASE" | Base Address 23:16 for LZD structure for logical zone 0 |
| DEFCPTR | DLZCPTR + "DEFCPTR" | Offset from DEFBASE to defect table for start of CRC check |
| DEFSPTR | DLZCPTR + "DEFSPTR" | Offset from DEFBASE to LZD table for logical zone 0 |
| DLZFCPTR | DLZCPTR + "DLZFCPTR" | Offset from DLZBASE to beginning of LZF table for CRC check |
| DLZFSPTR | DLZCPTR + "DLZFSPTR" | Offset from DLZBASE to event control words for logical zone 0 |
| Other Config. Tables | | Configuration tables for logical zones following logical zone 0. |
| CRC | DLZDCRCOFS | CRC Bytes which check bytes 000h through DLZDCRCOFS-1 |

Configuration structure 302 contains configuration tables 320 to 323 for the logical zones 0 to 3 and cyclic redundancy check (CRC) bytes for checking the validity of configuration structure 302. In one embodiment, each configuration table 320 to 323 contains entries LZSCYL, LZSPSEC, CYLSKEW, HDSKEW, PSECMAX, LZREPEAT, EOSMAX, LZREPEAT, EOSMAX, SPARECNT, DEFBASE, DEFCPTR, DEFSPTR, DLZFCPTR, and DLZFSPTR which indicate the properties described in Table 2 for the corresponding logical zone. In alternative embodiments, other entries can be added to or removed from the configuration tables, for example, an entry can be added to indicate the first LBA of a data sector in the logical zone.

Table 3 shows an embodiment of a skipped defect structure 159.

TABLE 3

Skipped defect structure

| WORD VARIABLE | Offset from DZBASE | DESCRIPTION |
|---|---|---|
| DEFCRCOFS | DEFCPTR | Offset to CRC Bytes for the Defect Table |
| DEFCYL | DEFSPTR | Start of LZD table for logical zone containing defective data sectors. Cylinder for following head numbers. |
| DEFHEAD | DEFSPTR +2 | Head Number for the following Defect Entries, Bit 15:14 = 00b |
| DEFNUM × M | DEFSPTR +4 | M defect entries. |
| DEFHEAD | DEFSPTR +4 +2M | Head Number for the following Defect Entries, Bit 15:14 = 01b |
| DEFNUM × N | DEFSPTR +6 +2M | N defect entries. |
| DEFCYL | DEFSPTR +6 +2M +2N | Cylinder for following head numbers. |
| DEFHEAD | DEFSPTR +8 +2M +2N | Head number for the following defect entries, Bit 15:14 = 00b |
| DEFNUM × L | DEFSPTR +10 +2M +2N | L defect entries. |
| DEFHEAD | DEFSPTR +10 +2M +2N +2L | End of table, Bit 15 = 1, Bits 14:0 = 0000h |
| DEFCYL | DEFSPTR | Start of LZD table for next logical zone containing defective data sectors. |
| DEFHEAD | DEFSPTR +2 | ... |
| CRC | DEFCRCOFS | CRC Bytes which check bytes 000h to "CRC"-1 |

Skipped defect structure 159 is changed as defective data sectors are detected but typically remains unchanged after being stored in data buffer 155. CRC bytes in skipped defect structure 159 permit error checking. Skipped defect structure 159 can contain more than one data structure such as shown in Table 3 to reduce the size of each such structure and the number of bytes scanned for CRC error checking.

Skipped defect structure 159 contains three types of defect control words, DEFCYL, DEFHEAD, and DEFNUM. Defect control word type DEFCYL indicates a cylinder number of a cylinder containing defective data sectors. One or more defect control words of type DEFHEAD follow each defect control word of type DEFCYL and indicate head numbers of tracks containing defective data sectors. Defect control word type DEFHEAD contains a number field indicating a head number and a flag field indicating whether the head number is the last track with defects, in the cylinder indicated by the preceding defect control word of type DEFCYL. In the example of Table 3, bits 15:14 of defect control word type DEFHEAD are 00b if the head number is not the last for the cylinder, and 01b if the head number is the last for the cylinder. Following each defect control word of type DEFHEAD is a set of defect control words of type DEFNUM indicating the physical sector numbers of the defective data sectors. Each defect control words DEFNUM contain a flag field indicating whether the defect control word is the last for a track. Each LZD table starts with a defect control word of type DEFCYL and ends with a defect control word of type DEFHEAD having bits 15:14 equal to lob to indicate the end of the LZD table.

Alignment processor 170 generates event control words for a target track and stores the event control words in ECW table 157. When read/write heads 114 are on the target track, alignment processor 170 initializes a pointer EDACWPTR to the address of an event control word which corresponds to an event following a subsequent servo sector in the track. In one embodiment of the invention, pointer EDAECWPTR is in buffer controller 150. Typically, pointer EDAECWPTR does not point to the first event control word in ECW table 157 because read/write heads 114 do not come on track at the first physical sector of the track. Disk controller 140 fetches event control words from ECW table 157 starting with the event control word at the address indicated by pointer EDAECWPTR.

The number of LZ control words in an LZF table depends on the track format and the syntax of the LZ control words. A repeat size entry LZREPEAT from a configuration table for a logical zone indicates the number of LZ control words in the LZF table for the logical zone. If the track format for a logical zone has a pattern that repeats, the LZ control words can describe only the repeated pattern. If the track format contains portions that do not repeat, which may be the case for defect swallowing, the control words describe the entire track format. Alignment processor 170 cycles through the LZ control word of the LZF table as many times as required to generate event control words for a full track.

LZ control words describe events encountered as a read/write head follows a track and may employ a great variety of syntaxes for conveying track format information. In one example syntax, each LZ control word includes a 16-bit control word divided into three fields MCOUNT, SEGSEL, and EVENTC and may include a 16-bit extension if more information is required for an event. When a control word includes an extension, the first 16-bit word is sometimes referred to herein as a partial control word. Field MCOUNT indicates a number of standard size data segments, i.e. data segments which either fill a data frame or constitute a full data sector. Fields SEGSEL and EVENTC describe events which include data segments or frame fields such as a swallowed defect field not having a standard size. Field SEGSEL indicates the type of event and whether the 16-bit control word is a partial control word. Field EVENTC is an event-count that indicates the size or duration of the event.

Table 4 shows 4-bit values for field SEGSEL and the meanings of the 4-bit values. Data segments having data fields with length indicated by field EVENTC can be a start data segment which starts a new data sector (NS=1), a data segment which continues a data sector (CS=1), an end data segment which ends a data sector (EODS=1), and/or a data segment at the end of a data frame (EOF=1). Each of the possible combinations is in Table 4.

TABLE 4

Segment Select Definition

| SEG-SEL | DEFINITION | NS | CS | EOF | EODS |
|---|---|---|---|---|---|
| 0000 | MIDDLE SEGMENT FOLLOWED BY A SWALLOWED DEFECT. Field EVENTC defines the data field size. | 0 | 1 | 0 | 0 |
| 0001 | END SEGMENT FOLLOWED BY A SWALLOWED DEFECT OR INTER-SECTOR GAP: Field EVENTC defines the data field size. | 0 | 1 | 0 | 1 |
| 0010 | START SEGMENT FOLLOWED BY A SWALLOWED DEFECT: Field EVENTC defines the data field size. | 1 | 0 | 0 | 0 |
| 0011 | START SEGMENT FOLLOWED BY A INTER-SECTOR GAP: This segment is a full data sector including the ECC field. | 1 | 0 | 0 | 1 |
| 0100 | MIDDLE SEGMENT FOLLOWED BY A SERVO FIELD: Field EVENTC defines the data field size. | 0 | 1 | 1 | 0 |
| 0101 | END SEGMENT FOLLOWED BY A SERVO FIELD: Field EVENTC defines the data field size. | 0 | 1 | 1 | 1 |
| 0110 | START SEGMENT FOLLOWED BY A SERVO FIELD: Field EVENTC defines the data field size. | 1 | 0 | 1 | 0 |
| 0111 | START SEGMENT FOLLOWED BY AN INTER-SECTOR GAP AND A SERVO FIELD: This Segment is a full Data Sector including the ECC Field. | 1 | 0 | 1 | 1 |
| 1000 | PARTIAL CONTROL WORD FOR A MIDDLE SEGMENT: The extension that follows has the format {PARITY, EOF, EODS, XEVENTC[12:0]} and indicates whether an Inter-Sector Gap (EODS = 1) and/or Servo Field (EOF = 1) follows the segment. The data field has a length given by the sum of fields EVENTC and XEVENTC. | 0 | 1 | X | X |
| 1001 | PARTIAL CONTROL WORD FOR A FIRST SEGMENT: The extension that follows has the format {PARITY, EOF, EODS, XEVENTC[12:0]} and indicates whether an Inter-Sector Gap (EODS = 1) and/or Servo Field (EOF = 1) follows the segment. The data field has a length given by the sum of fields EVENTC and XEVENTC. | 1 | 0 | X | X |
| 1010 | PARTIAL CONTROL WORD FOR A SWALLOWED DEFECT FIELD: The total number of bytes skipped is EVENTC[9:0] plus XEVENTC[12:0] from the following extension. | X | X | X | X |
| 1011 | SWALLOWED DEFECT: The number of bytes skipped is EVENTC[9:0]. | X | X | X | X |
| 1100 | MULTIPLE SECTORS: An end segment of a data sector followed by a number of full data sectors before a servo field. The end segment size is EVENTC[9:0]. If EVENTC is zero, there is no end segment i.e. the multiple sectors begin at a frame boundary. Field MCOUNT defines a number of full data sectors. | 0 | 1 | 0 | 1 |
| 1101 | MULTIPLE FRAMES: This ECW defines a first segment followed by a number of full data frame segments. Each full data frame segment is a middle segment. Field MCOUNT defines the number of full frame segments. Field EVENTC defines the length of the first segment. | 1 | 0 | 1 | 0 |
| 1110 | PARTIAL CONTROL WORD FOR MULTIPLE SECTORS: This is similar to the MULTIPLE SECTORS ECW except either the MCOUNT[1:0] or EVENTC[9:0] is not large enough for the number of sectors or the size of the segment. Field XMCOUNT defines the most significant bits and field MCOUNT defines the least significant | 0 | 1 | 0 | 1 |

TABLE 4-continued

Segment Select Definition

| SEG-SEL | DEFINITION | NSS | CS | EOF | EODS |
|---|---|---|---|---|---|
| | bits of a 5-bit count. The data field size is the sum of EVENTC[9:0] and XEVENTC[12:0]. | | | | |
| 1111 | PARTIAL CONTROL WORD FOR MULTIPLE FRAMES: This is similar to the MULTIPLE FRAMES ECW except either the MCOUNT or EVENTC was not large enough. Field XMCOUNT defines the most significant bits and field MCOUNT defines the least significant bits of a 5-bit count. The data field size is the sum of EVENTC[9:0] and XEVENTC[12:0]. | 1 | 0 | 1 | 0 |

Extension control words have two alternative formats. If a partial control word has field SEGSEL indicating multiple frames or sectors, an extension that follows the partial control word contains a 3-bit field XMCOUNT which is an extension of field MCOUNT and a 13-bit field XEVENTC which is event-count added to field EVENTC. Other partial control words are followed by an extension having 13-bit field XEVENTC, a 1-bit field XEOF indicating the segment is followed by a servo sector, and a 1-bit field XEODS indicating the segment is the last of a data sector (and therefore contains an ECC.)

Using the syntax of Table 4, three 16-bit LZ control words, 00 0010 A, 00 1011 B, and 00 0100 C, describe data frame 201 of track format 230 (FIG. 2A), where A, B, and C are 10-bit event-counts respectively indicating the length of a data field in data segment 271, the length of defective area 291, and the length of a data field in data segment 272. Each of the LZ control words 00 0010 A, 00 1011 B, and 00 0100 C has field MCOUNT set to 00 because data frame 201 of track format 230 does not contain any standard length data segments.

FIGS. 4A and 4B show example track formats containing data segments with standard lengths. FIG. 4A illustrates a track format where a data frame 401 contains five data segments 410 to 414. Data segments 411 to 413 are full data sectors and have data fields with a standard size that is fixed for all data sectors on the track. An LZ control word 11 1100 D describes initial data segment 410 and three single-segment data sectors 411, 412, and 413 in a data frame 401. In LZ control word 11 1100 D, field MCOUNT contains value 11b indicating three data sectors 411 to 413 follow an end data segment 410, field SEGSEL is 1100b indicating multiple sectors, and field EVENTC indicates a data field 420 of data segment 410 contains D bytes of data. Each of data fields 421, 422, and 423 of data segments 411, 412, and 413 have the standard length of a full data sector. A register DSECSIZE in disk controller 140 contains a full data sector count FDS indicating the length of a data field in a data sector having a single data segment. LZ control word 11 1100 D, decompresses into four LZ control words 00 0001 D, 00 0011 FDS, 00 0011 FDS, and 00 0011 FDS, if FDS is the full data sector count and can be expressed in ten bits.

FIG. 4B shows a track format where data sector 451 includes a data segment 471 in a data frame 460, data segments 472 and 473 which fill data frames 462 and 464 respectively, and a data segment 474 in data frame 466. A single LZ control word 10 1101 E, where E is a 10-bit event-count for a data segment 471, describes data segments 471, 472, and 473. Field MCOUNT is 10b to indicate two data segments 472 and 473 follow segment 471. Field SEGSEL is 1101b to indicate multiple data frames fill data frames 462 and 464. A register FRAMESIZE in disk controller 140 contains an event-count FDF for a data segment that fills a data frame on the track. A separate LZ control word 00 0001 F describes data segment 474 having F bytes in a data field 497. In an LZF table, control word 10 1101 E follows an LZ control word which indicates that a data segment 470 is the end of a data sector 450. Accordingly, segment 471 must be a first segment of a data sector. LZ control word 10 1101 E is equivalent to three LZ control words 00 0110 E, 00 0100 FDF, and 00 0100 FDF according to the syntax of Table 4.

The syntax for LZ control words could be varied in a variety of ways in accordance with this invention. For example, some events described indicate fixed-length data segments, (i.e. full data sectors or full data frames) which follow an initial variable-length data segment. An alternative syntax describes an event where a data segment, such as data segment 414 or 474, follows multiple fixed-length data segments or an event including only the fixed-length data segments such as data segments 472 and 473. In other alternative syntaxes, the fields SEGSEL and MCOUNT are combined into a single event type field, or field SEGSEL contains more bits to allow for additional event types. Also, an event type field such as field SEGSEL could uses specific bits which are set or cleared to indicate whether or not a data segment is the start of a new data sector, a continuation of a data sector, the end of a data sector, and/or the end of a data frame.

One example of an event type not included in Table 4 is an event type which describes a header of a data sector. In a headerless architecture, a header could be handled in the same manner as any other variable-length frame field. For example, since the information in the header is redundant to the information provided by the LZ control words, the header can be skipped using an event-count from field EVENTC of the LZ control word describing the header. Many other variations are possible.

To reduce the size of logical zone structure 158, logical zone structure 158 contains compressed control words which describe multiple data segments. Additionally, in some LZF tables describing a track with a pattern that repeats, a single LZ control word in an LZF table describes several different areas on the track. Alignment processor 170 converts the LZ control words from an LZF table to event control words which are stored in ECW table 157 for disk controller 140. In one embodiment of the invention, LZ control words in the LZF table and event control words in ECW table 157 use the same syntax, and alignment processor 170 copies LZ control words from the LZF table as many times as required to describe the track format. In another embodiment of the invention, alignment processor 170 decompresses LZ control words by converting each LZ control word in which field MCOUNT is non-zero into a set of event control words each of which describes a single data segment (at the start, middle, or end of a data sector, a full data sector, or a full data frame), a non-sector area, or swallowed defect field. This decreases the complexity of decoding function in disk controller 140. An example syntax for 16-bit event control words contains a field EVENTC (bits 9:0) which indicates a 10-bit event-count and a field SEGSEL (bits 13:11) which is defined as in Table 4 except that values 1100 to 1111 which indicate multiple data segments are not used.

In addition, a field SKIP (bit 14) in each event control word indicates whether a data segment described by fields SEGSEL and EVENTC is requested for a data transfer or should be skipped. Alignment processor 170 sets field SKIP depending on whether a data segment is in a requested logical data sector. A data sector is skipped if skipped defect structure 159 indicates the data sector is defective, if the data sector is a spare (and therefore not a logical data sector), if the data sector is outside the requested range of data sectors (including a look-ahead range for reads), or if sector skip table 311 indicates the data sector should be skipped.

After determining field SKIP, alignment processor 170 sets a parity bit (bit 15) to force every event control word to have the same parity (even or odd). Disk controller 140 checks parity to find errors in the event control words when the control word are loaded into a FIFO in disk controller 140.

Figure 5A:
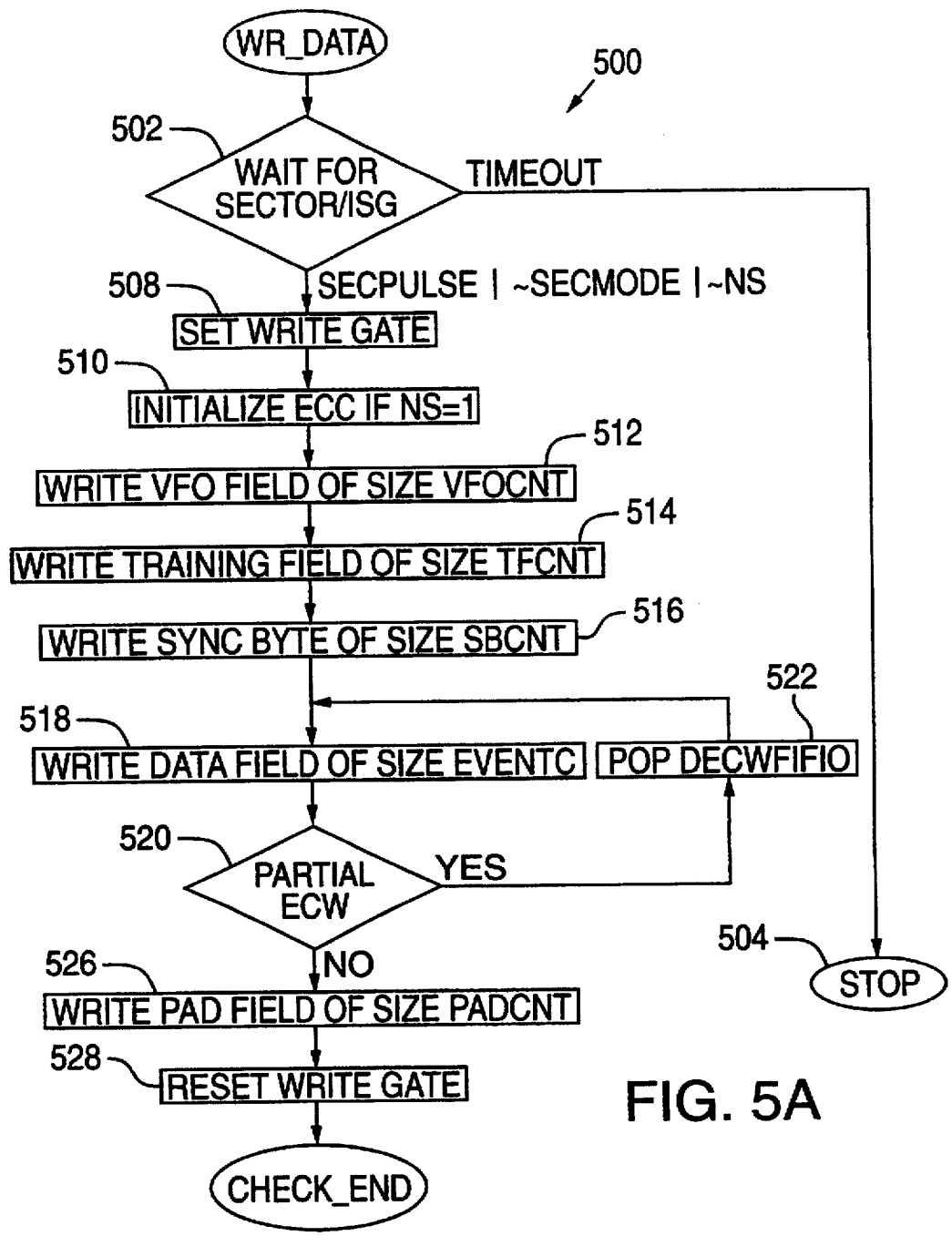
FIGS. 5A, 5B, 5C, and 5D show flow diagrams for write, read, and skip operations in accordance with embodiments of the invention.
Figure 5B:
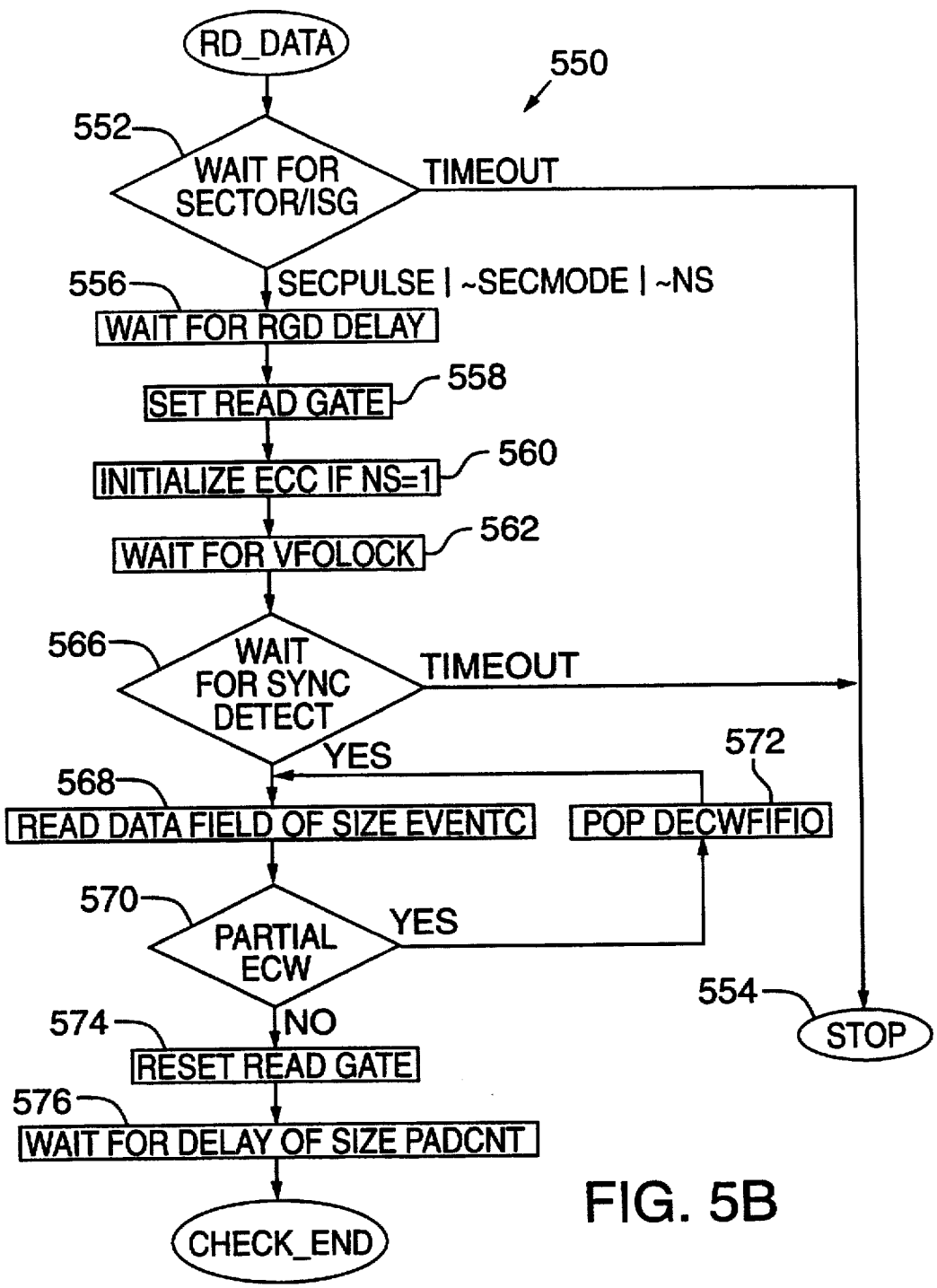

FIGS. 5A and 5B respectively show flow diagrams of a write process 500 and a read process 550 for writing and reading a data segment according to the format of FIG. 2B. Write process 500 and read process 550 use event-counts stored in registers of disk controller 140 to indicate the lengths of VFO field 281, training field 282, data sync field 283, and pad field 285. The lengths of frame fields 281, 282, 283, and 285 are typically the fixed for every data segment, and the event-counts for these fields can be set during initialization of the disk drive system if the register storing the event-counts are volatile memory or during manufacture if the registers are non-volatile memory.

Event control words loaded from ECW table 156 into a FIFO buffer in disk controller 140 indicate the number of bytes in data field 284. According to the above example syntax, field EVENTC of an event control word (plus field XEVENTC of an extension if present) indicates the number of bytes in data field 284. Field SKIP (bit 14) is reset or set to indicate that segment 250 should be transferred or skipped. The example of transfer of data segment 250 (FIG. 2A) which is described by event control word 0 0 0011 FDS is presented below.

Disk controller 140 starts write process 500 by waiting in step 502 for a triggering event such as an EOS pulse, the end of an ISG field, a sector pulse, or the end of a swallowed defect field. The current or previous event control word indicates which triggering event is expected. When alignment processor 170 starts disk controller 140, the triggering event is an EOS pulse. During step 502, disk controller 140 loads a timeout count into a timer. The size of the timeout count and what occurs during the step 502 depends on the expected event. For example, the timeout count can be the expected time to handle a servo sector. The timeout count is the frame size if the triggering event is an EOS pulse. Following a servo sector, an EJF field passes read/write heads 114 during step 502. The length of the EJF field varies with jitter in the electronics.

If the expected triggering event does not occur within the timeout count, disk controller 140 stops as in step 504. If the triggering event occurs, disk controller 140 transitions to step 508 and sets a write gate. Field SEGSEL of the event control word describing the data segment being written indicates whether the data segment is the start or end of a data sector. If the data segment is the start of a data sector, as is the case for data segment 250, disk controller 140 causes ECC controller 145 to initialize an error correction code (ECC) in step 510. Otherwise, the write process transitions from step 508 to step 512.

In steps 512, 514, 516, 518, and 526, disk controller 140 writes VFO field 281, training field 282, data sync field 283, data field 284, and pad field 285 to media 112. To write VFO field 281, disk controller 140 loads an event-count from a register VFOCNT into a byte counter. For each pulse of byte clock signal BYTECLK, the byte counter decrements, and disk controller 140 sets signal NRZ to indicate the VFO byte value 00h. In a process well known to those skilled in the art, encoder/decoder 119, read channel 118, and read/write heads 114 transfer the bytes indicated by signal NRZ to media 112.

When the byte counter decrements to zero, disk controller 140 transfers to step 514; loads an event-count from a register TFCNT into the byte counter; and while the byte counter again decrements to zero, forms training field 282 by writing bytes sequentially from registers TFPAT1 to TFPAT7 to media 112. When the byte counter reaches zero, disk controller 140 transfers to step 516; loads an event-count from a register SBCNT into the byte counter; and while the byte counter decrements to zero, forms data sync field 283 by writing bytes from registers SBPAT0 to SBPAT2 to media 112.

After writing data sync field 283, disk controller 140 transfers to step 518 and loads the byte counter with an event-count from field EVENTC of the event control word in the control word FIFO. Disk controller 140 writes data bytes from data segment 156 of data buffer 155 to media 112 while decrementing the byte count. While the data bytes are written, ECC controller 145 generates an ECC for the data. If the data segment being written is the last data segment of a data sector, the ECC is written following the data bytes in the data field. For data segment 250, field SEGSEL has value 0011 which indicates segment 250 is the last data segment of a data sector.

In step 520, disk controller 140 determines whether the current control word includes an extension. For data segment 250, field EVENTC equals event-count FDS, and field SEGSEL indicates no extension. Disk controller 140 transfers to step 526. However, if field SEGSEL indicates that an extension follows then disk controller 140 transfers to step 522 and reads the extension control word from the control word FIFO. Disk controller 140 transfers back to step 518, loads the byte counter with an event-count from field XEVENTC of the extension, and continues writing data field 284. Upon completion of data field 284, disk controller 140 transfers to step 526.

In step 526, disk controller 140 loads the byte counter with an event-count for pad field 285 from a register PADCNT and, while the byte counter decrements to zero, writes pad byte values 00h to media 112 to form pad field 285. After the pad bytes are written, writing of the data segment is complete and disk controller 140 resets write gate in step 528.

Disk controller 140 starts read process 550 (FIG. 5B) in step 552 by waiting for a triggering event, such as an EOS pulse, the end of an ISG field, or the end of a swallowed defect field. The triggering event is indicated as described above in regard to FIG. 5A, and the triggering event for data segment 250 is an EOS pulse. If the triggering event does not occur within a timeout period, disk controller 140 transfers to step 554 and stops. If the expected triggering event occurs within the timeout period, disk controller 140 transitions from step 552 to step 556.

During step 552, an EJF field passes under read/write head 114, but the length of the EJF field which passes during step 552 may differ from the length of the EJF field when the data segment was written. In step 556, disk controller 140 waits a fixed read gate delay (RGD) before setting the read gate in step 558. The read gate delay compensates for difference in the lengths of EJF fields and ensures that the read gate is asserted only after read/write heads 114 reach or pass the start of the data segment. The read gate delay should be at least one byte longer than the difference between the longest expected EJF field and the shortest expected EJF field. Without a read gate delay, the read gate is asserted before read/write heads 114 reach VFO field 281 (the first field of the data segment) if the data segment was written with a long EJF field and read with a short EJF field. If this occurs, stray marks on media 112 before VFO field 281 cause undependable reads.

With the read gate delay, the read gate is asserted after the beginning of VFO field 281. In a worst case, the read gate is asserted at a time twice the read gate delay after the start of VFO field 281. Accordingly, the length of VFO field 281 must be sufficient for an accurate phase lock even when the readable length of VFO field 281 is shortened by twice the read gate delay.

Disk controller 140 initializes accumulation of an ECC in step 560 if the data segment being read is the first data segment of a data sector. In step 562, disk controller 140 phase locks byte clock signal BYTECLK to a pulse train generated by reading VFO field 281. Disk controller 140 then waits in step 566 for detection of data sync field 283. Disk controller 140 detects data sync from signal NRZ in internal sync detection mode or from sync detect signal SYNCDET in external sync detection mode. If data sync is not detected within a data sync timeout period, disk controller 140 transfers to step 554 and stops. An example timeout period counts pulses of signal byte clock until reaching a count which is the sum of the values in registers VFOCNT, TFCNT, and SBCNT.

If data sync is detected within the timeout period, disk controller 140 starts reading data field 284 in step 568. Disk controller 140 loads the data byte counter with an event-count from field EVENTC of the current event control word. For data segment 250, event-count EVENTC equals event-count FDS. Disk controller 140 reads data from media 112 and stores the data in data buffer 155 while decrementing the data byte counter.

During a read, ECC controller 145 generates an ECC for the data read. If the data segment is the last of a data sector, an ECC is read from media 112, and ECC controller 145 compares the ECC read to the ECC generated. If the two differ, a conventional error correction process can possibly correct the data in data buffer 155. In the embodiment of FIG. 1, ECC controller 145 performs the error correction.

When the byte counter reaches zero, disk controller 140 determines in step 570 whether the current event control word has an extension. If the event control word has an extension, disk controller 140, in step 572, pops the extension from the control word FIFO and transfers back to step 518. If the current event control word does not have an extension, event controller 140 transitions to step 574.

Disk controller 140 resets the read gate in step 574, and then, in step 576, loads the byte counter with event-count for pad field 285, from register PADCNT. Pad bytes are skipped while the byte counter decrements to zero. Skipping pad field 285 completes reading data segment 250.

Figure 5C:
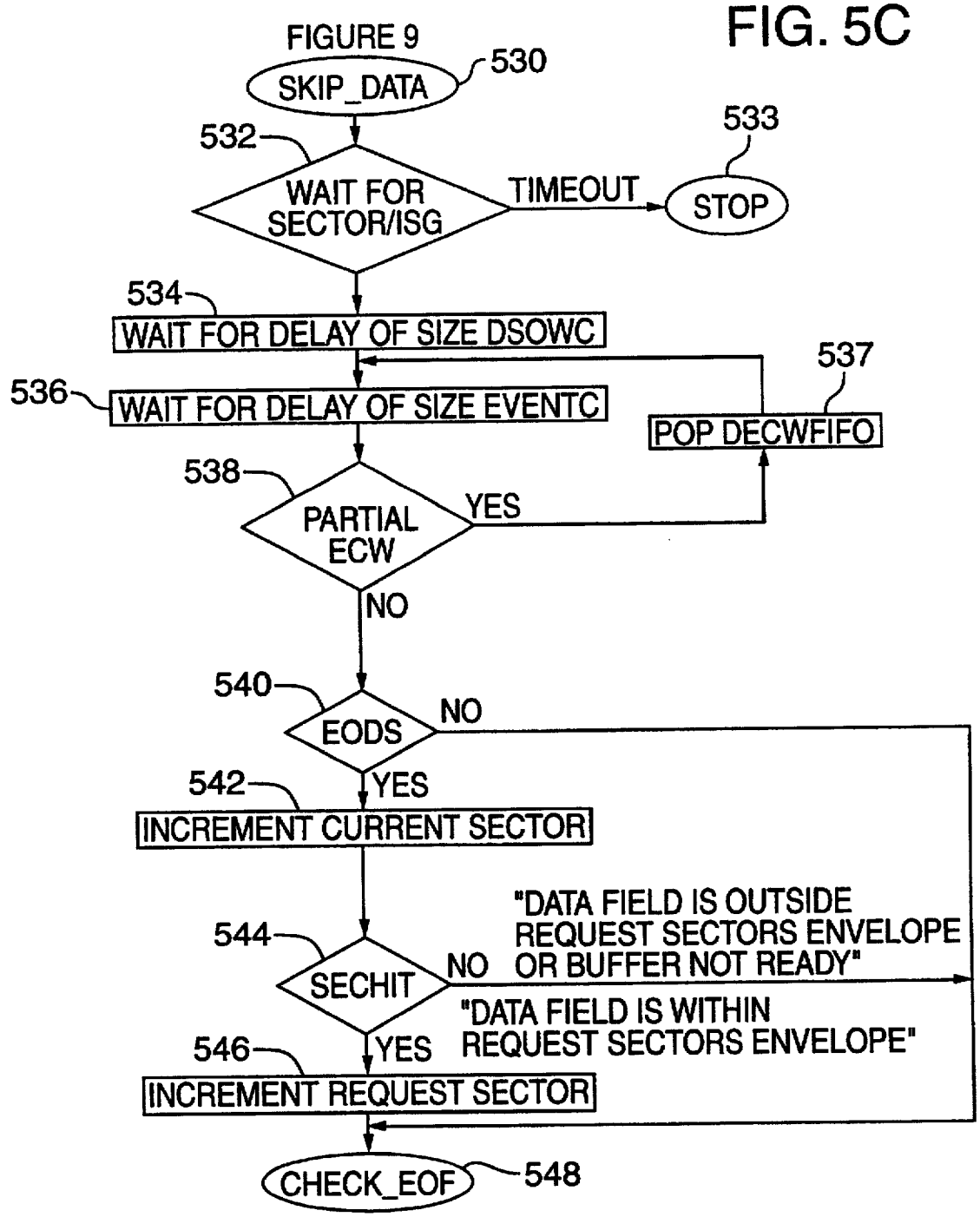

If field SKIP in the event control word indicates that the current data segment should be skipped, disk controller 140 executes a process 530 (FIG. 5C) for skipping a data sector. Depending on events preceding process 530, disk controller 140 begins in step 532 by waiting for a triggering event such as an EOS pulse or waiting a fixed delay time. If triggering event is expected and does not occur within a timeout period, process 530 stops. The delay time depends on frame fields such as an ISG or a pad bytes field between a preceding event and the event to be skipped. In step 534, disk controller 140 loads a count DSOWC, which is a combined event-count (VFOCNT+TFCNT+SBCNT) for VFO, training, and sync fields, into the byte counter and waits while the byte counter decrements to zero. Next, disk controller 140 waits while read write/heads 114 pass over the data field of the skipped data sector. In step 536, the value from field EVENTC of the current event control word is loaded into the byte counter and decremented to zero. If the current event control word is a partial event control word, the extension control word is popped from the event control word FIFO, and disk controller 140 waits for a count given by field XEVENTC of the extended event control word.

An alternative process similar to read process 550 can also skip a data segment. The alternative process resets the read gate after sync detection in step 566 so that in step 568 data is not transferred to data buffer 155. The alternative process resynchronizes disk controller 140 and media 112 at data sync fields. Disk controller 140 can skip an entire data frame by removing event control words describing the data frame from the ECW FIFO and waiting for the next EOS pulse.

After reading, writing, or skipping a data sector, disk controller 140 updates sector counters. In step 540 (FIG. 5C), disk controller 140 checks whether the event control word just skipped corresponds to the data segment at the end of a data sector. If not, disk controller 140 checks whether the event control word corresponds to the data segment at the end of a data frame. In step 542, disk controller 140 increments a current sector counter if the data segment was the last of a data sector. Step 544 checks whether the data sector is within the range of requested data sectors. If so, a count of the request sector handled is incremented.

Field SEGSEL of event control word 0 0 0011 FDS indicates an inter-sector gap follow data segment 250. Accordingly, after skipping, writing, or reading data segment 250, disk controller 140 removes an event control word from the control word FIFO and skips an inter-sector gap by loading an event-count from a register ISGCNT into the byte counter and waiting while the byte counter decrements to zero. The inter-sector gap must be longer than twice the read gate delay so that two neighboring data segments do not overlap even when a data segment is written with the longest expected EJF field and the following data segment is written with the shortest expected EJF field.

An event control word X Y 1010 Z describes Data segment 251, where Z indicates the size of data segment 251, Y indicates whether data segment 251 should be skipped, and X is set to provide even parity. The count for the ISG field reaching zero triggers writing, reading, or skipping of data segment 251. Disk controller 140 handles data segment 251 in the same manner as data segment 250 except that no inter-sector gap follows segment 251 because a servo sector 241 follows data segment 251. After processing data segment 251, disk controller 140 waits for servo control unit 120 to handle servo sector 241.

Figure 5D:
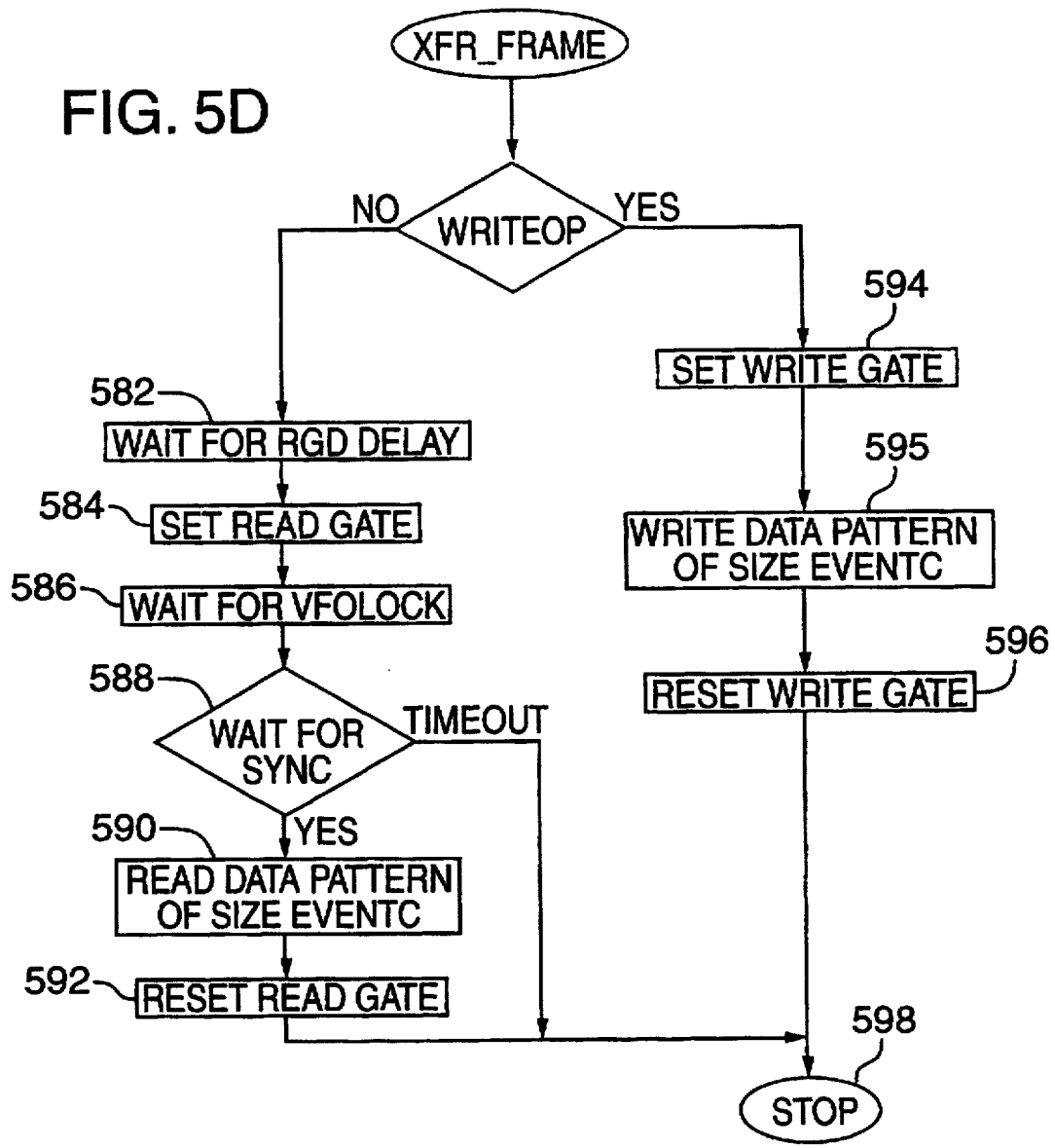

The flow diagram of FIG. 5D shows alternative write and read processes. These write and read processes are referred to herein as frame write and frame read because the processes can write or read an entire data frame in one operation. The frame write and frame read can also write or read a part of a data frame or a single data segment. After a triggering event, such as an EOS pulse, the frame write process begins in step 594 by setting the write gate. After setting the write gate, an event-count from field EVENTC is loaded into the byte counter, and disk controller 140 writes data from data segment 156 of data buffer 155 to media 112. The disk drive system constructs in data buffer 155 the frame fields such as VFO fields, data sync fields, and data fields for the frame being written. An advantage of the frame write process is the increased variety of possible formats for data segments and data frames. In one example format, a data frame contains only a single VFO field and data sync field preceding data for one or more data sectors. A data frame can contain a data field containing data from multiple logical data sectors.

After a triggering event, the frame read process begins by waiting in step 582 through a read gate delay before disk controller 140 sets the read gate in step 584. Disk controller 140, in step 586, locks byte clock signal BYTECLK to a pulse train caused by reading a VFO field and then waits, in step 588, for detection of a data sync field. If a data sync field is not detected within a timeout period, disk controller 140 transfers to step 598 and stops. Otherwise, disk controller 140 transfers to step 590. In step 590, the byte counter is loaded with an event-count from field EVENTC of an event control word, and disk controller 140 reads data bytes from media 112 while the byte counter decrements to zero. Disk controller 140 resets the read gate in step 592 completing the frame read process. If a frame read process reads data for more than one data sector, MPU 175 can divide the data read into sectors for transfer to the host.

Frame write and frame read is also for media certification. For example, a frame write can fill a data frame with data that is read by a frame read and compared to the data written. The differences between data written and data read indicate the locations of defects on the media.

Figure 6:
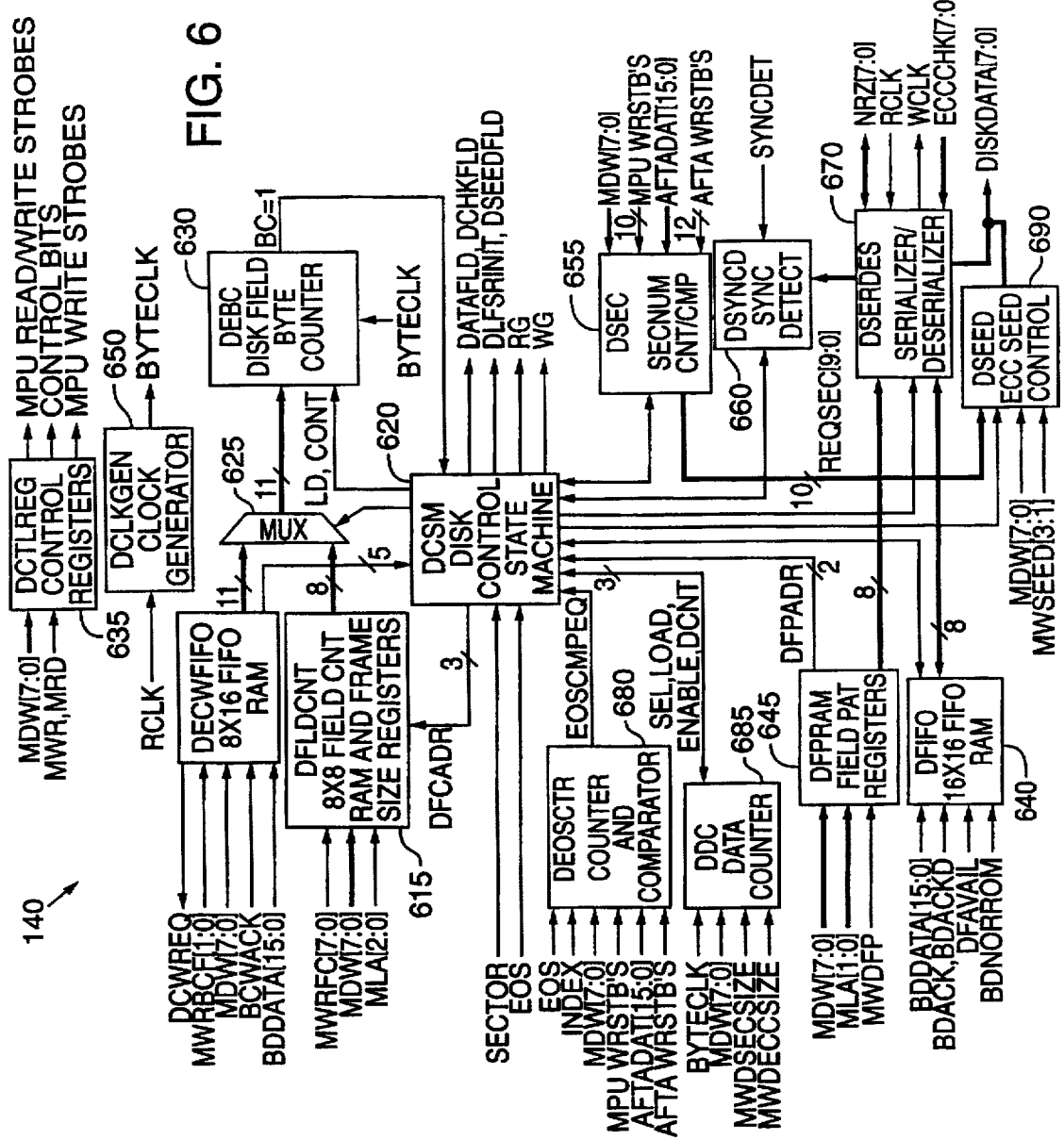
FIG. 6 shows a block diagram of a disk controller in accordance with an embodiment of the invention.

FIG. 6 shows a block diagram of an embodiment of disk controller 140. A disk control state machine (DCSM) 620 decodes event control words and controls data flow through disk controller 140 between data buffer 155 and HDA 110. Data represented by signal NRZ passes through a serializer-deserializer 670 and data FIFO 640 in disk controller 140 in route to or from data buffer 155. MPU 175 and/or alignment processor 170 monitor and control DCSM 620 by accessing a register set, within disk controller 140. The register set includes field count registers 615, field pattern registers 645, an event control word FIFO buffer 610 (hereinafter ECW FIFO 610), a byte counter 630, a data counter 685, a sector counter 655, an EOS counter 680, and control registers 635. An example embodiment of the register set is described in Appendix A, which is incorporated herein by reference in its entirety.

Field count registers 615 include registers VFOCNT, TFCNT, SBCNT, and PADCNT disclosed above and store event-counts for fixed-length frame fields. ECW FIFO 610 contains event control words (including extensions) according to above described example syntax. To implement a process for reading, writing, or skipping data segments, such as described above in regard to FIGS. 5A, 5B, 5C, and 5D, DCSM 620 controls a multiplexer 625 and determines which event-count from field count registers 615 or field EVENTC of an event control word in ECW FIFO 610 is loaded into byte counter 630.

During a read, a clock generator circuit 650 phase locks byte clock signal BYTECLK to a read clock signal RCLK generated when HDA 110 reads a VFO field. After the VFO field, the action of DCSM 620 depends on whether a value in control registers 635 indicates internal or external mode of sync detection. With internal mode, sync detection circuit 660 compares bytes from signal NRZ to an expected pattern of sync bytes stored in registers SBPAT0 to SBPAT2, and signals DCSM 620 when the expected pattern is detected. In external mode, DCSM 620 synchronizes with a fixed offset from a sync found mark SYNCFND is syncdetect signal SYNCDET.

Data counter 685 counts data and ECC bytes written to or read from data fields of a data sector. DCSM 620 determines the boundary between data and ECC from the count in data counter 685. When an event control word from ECW FIFO 610 indicates a data segment starts a new data sector, DCSM 620 loads data counter 685 with a value from a register DSECSIZE and causes an ECC seed control circuit 690 to provide an ECC seed value to ECC controller 145. Data counter 685 decrements once for each byte of data transferred to or from a data sector. Data counter 685 reaching zero indicates the end of data and the start of an ECC.

In addition to reading, writing, and skipping data sectors, disk controller 140 monitors the position of read/write heads 114 relative to media 112. In particular, EOS counter 680 contains a frame number indicating a data frame over which the selected one of read/write heads 114 is positioned. In one embodiment of the invention, EOS counter 680 is reset by index pulses and increments at each EOS pulse. In another embodiment, the servo sectors contain data frame numbers; and MPU 175 reads a frame number from a servo sector when read/write heads 114 come on track and initializes EOS counter 680 to that frame number. EOS counter 680 automatically increments the frame number with each EOS pulse, and when the frame number equals a value from register EOSMAX, resets the frame number to zero.

Sector counter 655 contains the physical sector number of the data sector over which the selected one of read/write heads 114 is positioned. Alignment processor 170 initializes sector counter 655 before starting DCSM 620, and DCSM 620 increments the physical sector number each time an event control word indicates the end of a data sector. The physical sector number wraps to 000h when incremented to a value in a register CURRSECMAX.

When host device 165 requests a data transfer, alignment processor 170 determines cylinder and head numbers indicating a target track and the physical sector numbers of the requested data sectors. MPU 175 directs servo control unit 120 to seek to the target track. During the seek, alignment processor 170 converts LZ control words from logical zone structure 158 to event control words which describe a full track and stores the event control words in ECW table 157. Each event control word contains an event-count for a frame field which should be skipped, read, or written. For a read, alignment processor 170 may expand the requested range of data sectors to include data sectors for read look-ahead. Data sectors listed in defect structure 159, outside the requested range of data sectors, or in sector skip table 311 are skipped.

Once read/write heads 114 reach the requested track, servo control unit 120 reads a servo sector and communicates a data frame number to MPU 175. MPU 175 writes the data frame number to EOS counter 680 via data bus MDW [7:0]. Alignment processor 170 reads EOS counter 680 to determine the current data frame, initializes registers WRAPSEC0, WRAPSEC1, WRAPTOSEC0, and WRAPTOSEC1 for zero latency read and look-ahead read operations, aligns pointer EDAECWPTR to ECW table 157 with the position of read/write heads 114 at the next EOS pulse, and then starts disk controller 140. Event control words from ECW table 157 are automatically loaded into ECW FIFO 610. Disk controller 140 starts controlling the data transfer at the next EOS pulse and counts bytes according to byte clock signal BYTECLK and event-counts as described above.

Disk controller 140 controls headerless disk functions including: 1) transferring data bytes between HDA 110 and data buffer 155; 2) skipping frame fields not involved in a transfer; and 3) updating the data frame number in EOS counter 680 and the physical sector number in sector counter 655.

Alignment processor 170 performs headerless disk alignment functions including: 1) building an event control word table for disk controller 140; 2) initializing the physical sector number in counter 655; and 3) aligning the event control words for decoding by disk controller 140. FIG. 1 shows a hardware embodiment of alignment processor 170 where alignment processor 170 is part of disk control IC 130. In another embodiment of the invention, some or all of the functions of alignment processor 170 are implemented in software executed by MPU 175.

Figure 7A:
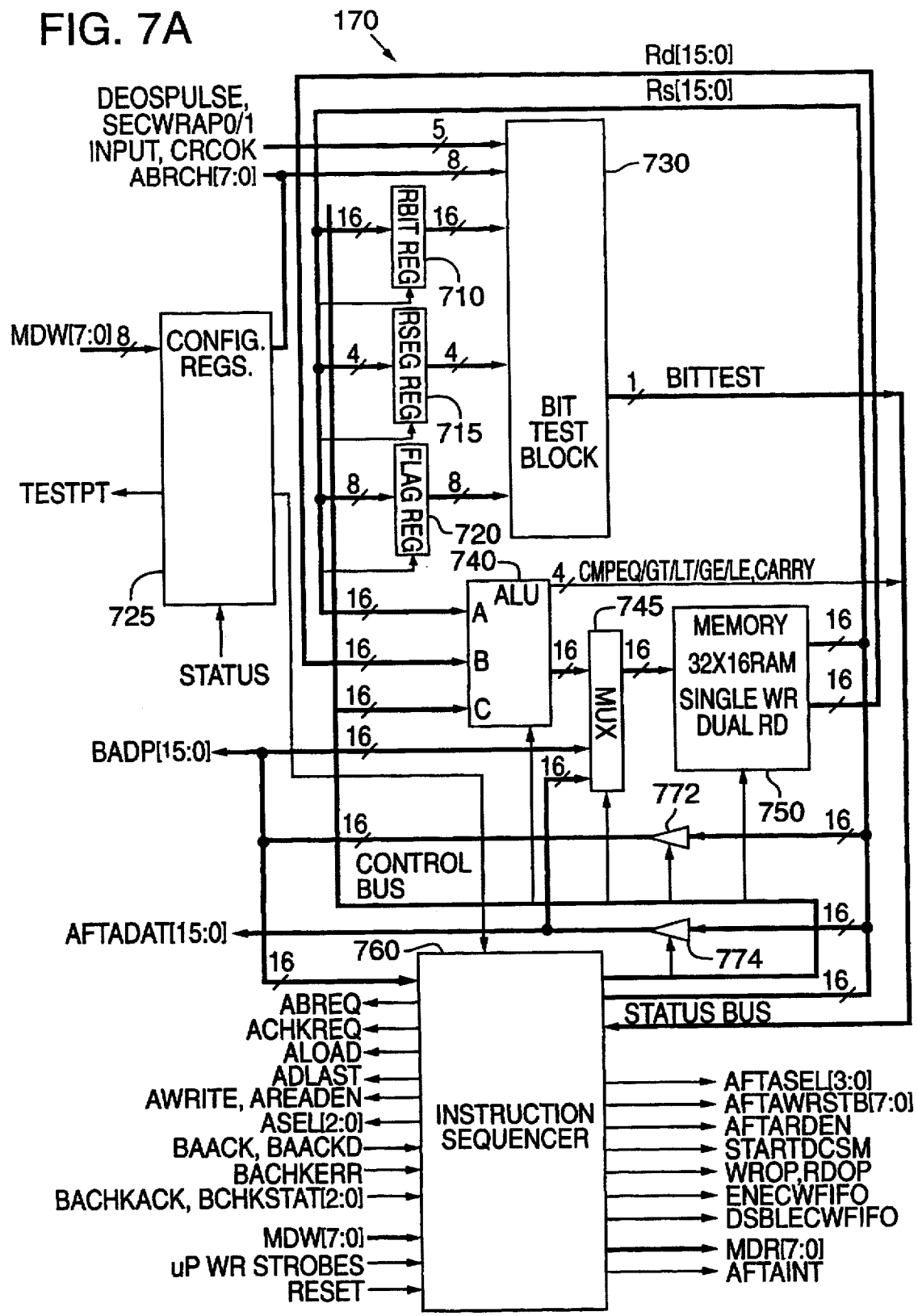
FIGS. 7A and 7B show block diagrams of an alignment processor in accordance with an embodiment of the invention.

FIG. 7A shows a block diagram of a hardware embodiment of alignment processor 170. Alignment processor 170 is a RAM based sequencer capable of storing and manipulating up to 32 16-bit variables stored in a memory 750. In this embodiment, memory 750 is a 32×16-bit single write, dual read RAM. In other embodiments, memory 750 can be larger or smaller for more or less storage capacity and can be an alternative memory type such as a register file.

An instruction sequencer 760 in alignment processor 170 executes a program that implements the functions of alignment processor 170. Appendix B shows an example syntax for an instruction set for alignment processor 170, and is incorporated herein by reference in its entirety. The program manipulates variables and can store/fetch variables to/from data buffer 155 or the register set of disk controller 140 or buffer controller 150.

Instruction sequencer 760 branches on several conditions which result from compare operations performed by a bit test block 730 or an arithmetic logic unit (ALU) 740. Bit test block 730 generates a signal BITTEST to indicate the state of a bit from one of registers 710, 715, 720, and 725 or the state of one of external signals DEOSPULSE (signal EOS with EOS pulses synchronized with a buffer clock signal BCLK), SECWRAP0, SECWRAP1 (status bits from disk controller 140), or INPUT (signal from an external pin for externally controlled branch condition). Instruction sequencer 760 selects the bit or external signal tested. Register 710 is a 16-bit register loaded with a variable from memory 750. Register 715 is a 4-bit register loaded with bits 13:10 (field SEGSEL of an LZ control word or event control word) of a variable from memory 750. Flag register 720 contains flag bits FLAG0 to FLAG7 from instruction sequencer 760. Registers 725 contains configuration information for alignment processor 170. MPU 175 accesses registers 725 via bus MDW[7:0]. Signal CRCOK, which indicates the completion of a CRC check, is a logical AND of bits 3:0 of a register ATCSTAT in configuration registers 725, which is a CRC check status register. Signal ABRCH [7:0] is from a register ABRCH in control registers 725 for user defined branch conditions.

ALU 740 performs arithmetic and logical operations on one or more variable from memory 750 and stores the result in memory 750. ALU 740 has three data input buses, buses Rd[15:0] and Rs[15:0] from memory 750 and a control bus from instruction sequencer 760. Arithmetic and logical operations manipulate either two variable from RAM 750 or a variable from RAM 750 and a value from instruction sequencer 760. Operations include addition and subtraction with a carry, shifts left and right, logical OR and AND operations, and a compare which generates status bits that indicate if a variable equal to, greater than, or less than a second variable.

Memory 750 has a single write port connected to a multiplexer 745 and dual read ports connected to 16-bit data buses Rs[15:0] and Rd[15:0]. Multiplexer 745 has a first 16-bit input port coupled to buffer interface 150 through an address/data bus BADP[15:0], a second 16-bit input port coupled to ALU 740, and a third 16-bit input port coupled to memory 750 through bus AFTADAT[15:0].

Instruction sequencer 760 fetches a variable from data buffer 155, into memory 750, by enabling buffer 772 and asserting an address signal on a bus BADP[15:0] and then disabling buffer 772 and causing multiplexer 745 to select a data signal from bus BADP[15:0] for the write port of memory 750. Instruction sequencer 760 stores a variable from memory 750, into data buffer 155, by enabling buffer 772 and asserting an address signal on bus BADP[15:0] and then memory 750 to assert a data signal on bus BADP[15:0]. Bus AFTADAT[15:0] couples to disk controller 140 for reading and writing register values in disk controller 140. A signal AFTAWRSTB[7:0] selects the register to be written or read.

Figure 7B:
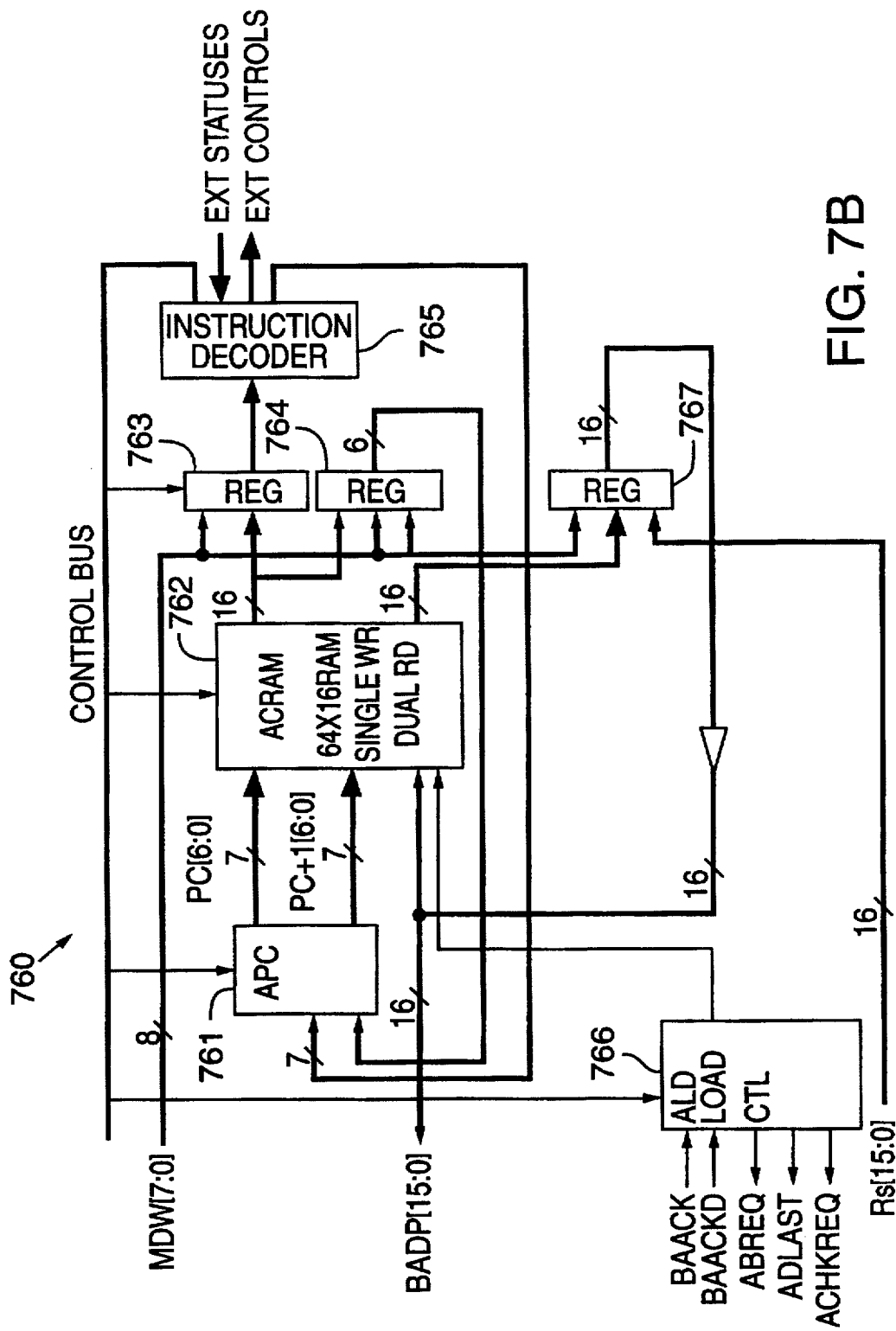

FIG. 7B shows a block diagram of instruction sequencer 760. Instruction sequencer 760 contains a program counter 761, an instruction memory 762, instruction registers 763 and 764, an instruction decoder 765, and an address register 767. Instruction sequencer 760 executes program code in instruction memory 762 at an address indicated by program counter 761. In embodiment of FIG. 7B, instruction memory 762 is a 160-byte RAM for up to eighty 16-bit instructions. Programs larger than the capacity of instruction memory 762 are executed in overlays which are stored in data buffer 155 and fetched into memory 762 as required. In alternative embodiments, smaller or larger instruction memory for smaller or larger overlays, or an instruction memory large enough for the entire program may be employed. Instruction memory 762 would typically be faster memory than data buffer 155 to improve performance of alignment processor 170. Instruction memory 762 is relatively small so that the expense of fast memory is not great.

Overlays are fetched via bus BADP[15:0] starting from an address indicated by address register 767. MPU 175 can initiate an overlay fetch by writing the address of an overlay to address register 767, via bus MDW[7:0], and then writing an "Overlay" instruction to instruction register 763 via bus MDW[7:0]. The address of the overlay in data buffer 155 is a concatenation of a base address DCBASE and a 16-bit address from address register 767. Instruction decoder 765, when decoding an "overlay" instruction, stores program code in instruction memory 762 starting at address 00h and resets program counter 761 to 00h. Execution of an "overlay" instruction which is part of the current overlay replaces the current overlay with another overlay.

Program flow is normally to the next instruction word (program counter 761 increments) except during branch instructions, such as bit test or compare instructions. After a bit test instruction, execution can jump anywhere within the eighty word address space (to an address embedded in the instruction if branch condition is true) or proceed to the next word (if branch condition is false). When a compare instruction is executed, the program can jump anywhere within the eighty word range or skips a word (bus PC+1[6:0] indicates the next address).

Instruction memory 762 has one write port and two read ports. The write port is coupled to bus BADP[15:0] for writing code overlays to instruction memory 762. The read ports enable decoding of two-word instructions in one clock cycle. The first word is written to instruction register 763. The second word of the instruction is written to instruction register 764 and address register 767.

Instructions which access data buffer 155 delay execution of the next instruction until the access is complete. Instruction sequencer 760 performs several external operations such as those shown in Appendix B.

For a typical data transfer in accordance with an embodiment of the invention, host device 165 (FIG. 1) transmits one or more LBAs indicating logical data sectors requested for a data transfer. MPU 175 or alignment processor 170 converts the LBAs into target cylinder, head, and logical sector numbers using tables that indicate the number of logical data sectors per track or per cylinder. The cylinder, head, and first and last logical sector numbers are written to fields REQCYL, REQHEAD, LREQSECF, and LREQSECL in dynamic variable structure 311 in buffer memory 155.

Alignment processor 170 executes a program which fills ECW table 157 and aligns disk controller 140 to start with an event control word that corresponds to the position of read/write heads 114 relative to media 112. FIG. 8 shows an example embodiment of an alignment process 800 performed by alignment processor 170. Alignment processor 170 starts in step 802 by scanning configuration structure 302 to find a logical zone which contains the target track. Configuration structure 302 contains LZ configuration tables formatted as in Table 2. Each LZ configuration table contains a field LZSCYL which indicates the first cylinder of a corresponding logical zone. The last LZ configuration table containing a field LZSCYL having a value less than requested cylinder REQCYL corresponds to the logical zone containing the target track. In step 804, alignment processor 170 writes the address of that LZ configuration table to field DLZCSPTR in dynamic variable structure 301. The LZ configuration table contains pointers DEFSPTR and DLZFSPTR to the LZD and LZF tables for the logical zone containing the target track.

Each LZ control word in the LZF table is common to all tracks in the logical zone and in particular describes the target track. In contrast, each defect listed in the LZD table corresponds to a specific track. In step 806, alignment processor 170 scans the LZD table to locate the defect control words (if any) for the target track. If the LZD table indicates defective data sectors in the target track, alignment processor 170 transfers to step 808 and stores a pointer to the first defect control word for the target track. If the target track contains no defective data sectors, a flag is set to indicate no defects.

In step 810, alignment processor 170 determines a skew (a number of physical data sectors) between physical data sector number 0 and logical sector number 0. Step 810 starts with a value from field LZSCYL of the configuration table which indicates the physical sector number of logical sector number 0 on the first track of the zone and then adds values from fields CYLSKEW and HDSKEW which give the additional skew per cylinder and per head as read/write heads move from the first track of the logical zone to the target track. Step 812 compensates for defective data sectors which may shift the location of logical sector and determines the physical locations of the requested logical data sectors.

In step 814, alignment processor 170 uses the LZF table for the logical zone, defect entries for the target track, and the skew between logical and physical sector numbers to generate ECW table 157 for disk controller 140. Fields SEGSEL and EVENTC of the event control words are from the LZ control words. The skip bit is set in the ECWs for swallowed defect fields and in ECWs for data segments in data sectors which are defective (in the LZD table), are outside the range indicated by fields LREQSECF and LREQSECL, or are listed in sector skip table 311. A parity bit is set to give each ECW even parity.

In step 816, alignment processor 170 scans through ECW table 157 to determine the event control word and the physical sector number which correspond to the position that read/write heads 114 will have when disk controller 140 starts. Alignment processor 170 determines a starting EOS count for disk controller 140 and then during scanning of ECW table 157, counts the number of end of data frames and new data sectors indicated by the event control words until the frame count reaches the starting EOS count. Finally in step 818, alignment processor 170 initializes disk controller 140 according to the position of read/write heads 114 so that disk controller 140 starts decoding event control words when the starting EOS count is reached.

FIGS. 9 to 16B show flow diagrams for specific embodiments of the process steps shown in FIG. 8. In the figures, values from buffer memory 155 are indicated with the prefix BMEM@ followed by an address. The address typically includes a base address DVBASE, DLZBASE, and DEFBASE respectively for dynamic variable structure 301, configuration structure 302 and logical zone structure 158, and skipped defect structure 159. A field name in quotations, e.g. "DLZCSPTR", is an offset to the field having that name. Variables not preceded by BMEM@ are in disk controller IC 100, either variables in memory 750 (FIG. 7) or registers of disk controller 140.

Figure 9:
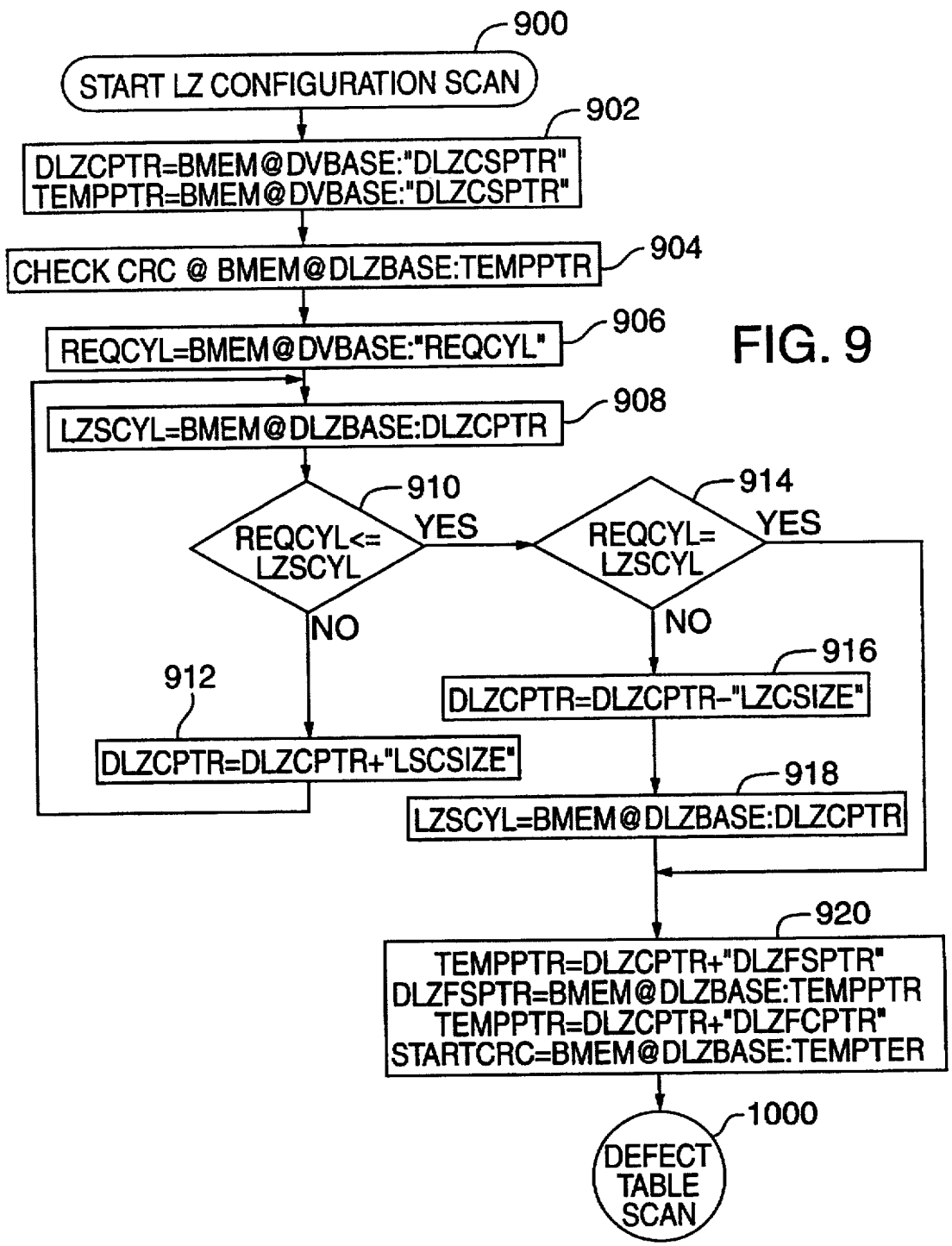
FIG. 9 shows a flow diagram of a process for scanning a configuration structure to locate a logical zone containing a target cylinder.

FIG. 9 is a flow diagram of a process 900 for scanning configuration structure 302 to find which logical zone contains the target track. In steps 902, alignment processor 170 initializes local variables in memory 750. Variable DLZCPTR points to field LZSCYL in the first configuration table of configuration structure 302. In step 904, a CRC check for the LZ configuration table is started at address in data buffer 155. The CRC check is performed in the same manner as CRC checks of data from magnetic media, except of course that data being checked for errors is from memory, not from a magnetic media. Step 906 initializes variable REQCYL in alignment processor 170 to be equal to a requested cylinder number from dynamic variable structure 302.

In step 908, alignment processor 170 reads field LZSCYL from a configuration table and compares the value from field LZSCYL to the requested cylinder REQCYL in step 910. Field LZSCYL of a configuration table indicates the first cylinder in a logical zone corresponding to the configuration table. If the value from field LZSCYL is less than requested cylinder REQCYL, process 900 transfers to step 912, and length "LSCSIZE" of a configuration table is added to variable DLZCPTR so that variable DLZCPTR points to the next configuration table in configuration structure 302. Process 900 then loops back to step 908, and repeats reading a field LZSCYL (step 908) and comparing the first cylinder in the logical zone to requested cylinder REQCYL. The loop including steps 908, 910, and 912 is repeated until a logical zone has a first cylinder which is greater than or equal to the requested cylinder then alignment processor 170 transfers to step 914.

In step 914, alignment sequence 170 determines whether the first cylinder of the logical zone is equal to requested cylinder REQCYL. If the first cylinder of the logical zone is equal to requested cylinder REQCYL, process 900 transfers to step 920, and a local variable DLZFSPTR is set equal to field DLZFSPTR from the configuration table so that variable DLZFSPTR points to the LZF table for the logical zone containing requested cylinder REQCYL. A CRC check is started for the LZF table.

If the first cylinder of the logical zone is not equal to requested cylinder REQCYL, process 900 transfers from step 914 to step 916 and 918 which set pointer DLZCPTR back to the previous configuration table and sets variable LZSCYL equal to the first cylinder value from that configuration table. The logical zone contains requested cylinder REQCYL. Process 900 then transfers to step 920, described above. Following step 920, alignment processor 170 scans the LZD table.

FIGS. 10A, 10B, 10C, and 10D show a flow diagram of a process 1000 which scans an LZD table having the format of Table 3 and locates defect entries for the target track. Alignment processor 170 starts process 1000 in step 1002 by initializing local variables and starting a CRC check of the LZD structure being scanned. Variables used in process 900 of FIG. 9 retain values from process 900. A variable DEFBASE points to a base address for skipped defect structure 158. Variable DEFSPTR points to the LZD table of the logical zone containing the target head.

In step 1004, alignment processor 170 fetches an entry from the LZD table, stores the entry in variable DEFCYL, and advances pointer DEFSPTR to point to the next entry in the LZD table. Variable DEFCYL identifies a cylinder containing defective data sectors. Next, in step 1006, alignment processor 170 fetches an entry from the LZD table, stores the entry in variable DEFHEAD, and advances pointer DEFSPTR to the next entry in the LZD table. Alignment processor 170 performs an AND operation to separate a head number HEADNUM from flag bits in variable DEFHEAD.

Step 1008 checks the flag bits of variable DEFHEAD to determine whether the end of the LZD table has been reached. The last entry of the LZD has bit 15 set. If the end of the LZD table has been reached, bit FLAG7 in flag register 720 of alignment processor 170 is set in step 1010 to indicate no defects, and a skew calculation operation 1100, described below, is started. If bit 15 is zero, alignment processor 170 transfers to step 1012 and compares variable DEFCYL to requested cylinder number REQCYL. If variable DEFCYL is equal to requested cylinder number REQCYL, process 1000 transitions to step 1016. If variable DEFCYL is not equal to requested cylinder number REQCYL, process 1000 transitions to step 1014 and determines if requested cylinder number REQCYL is less than variable DEFCYL. If so, the LZD table does not contain any defects for requested cylinder number REQCYL, and execution transfers to step 1010 where bit FLAG7 is set. If requested cylinder number REQCYL is not less than cylinder DEFCYL, alignment processor 170 begins a scan 1030 (FIG. 10B) through the defect control words for the track indicated by variable DEFCYL and head number HEADNUM.

Figure 10A:
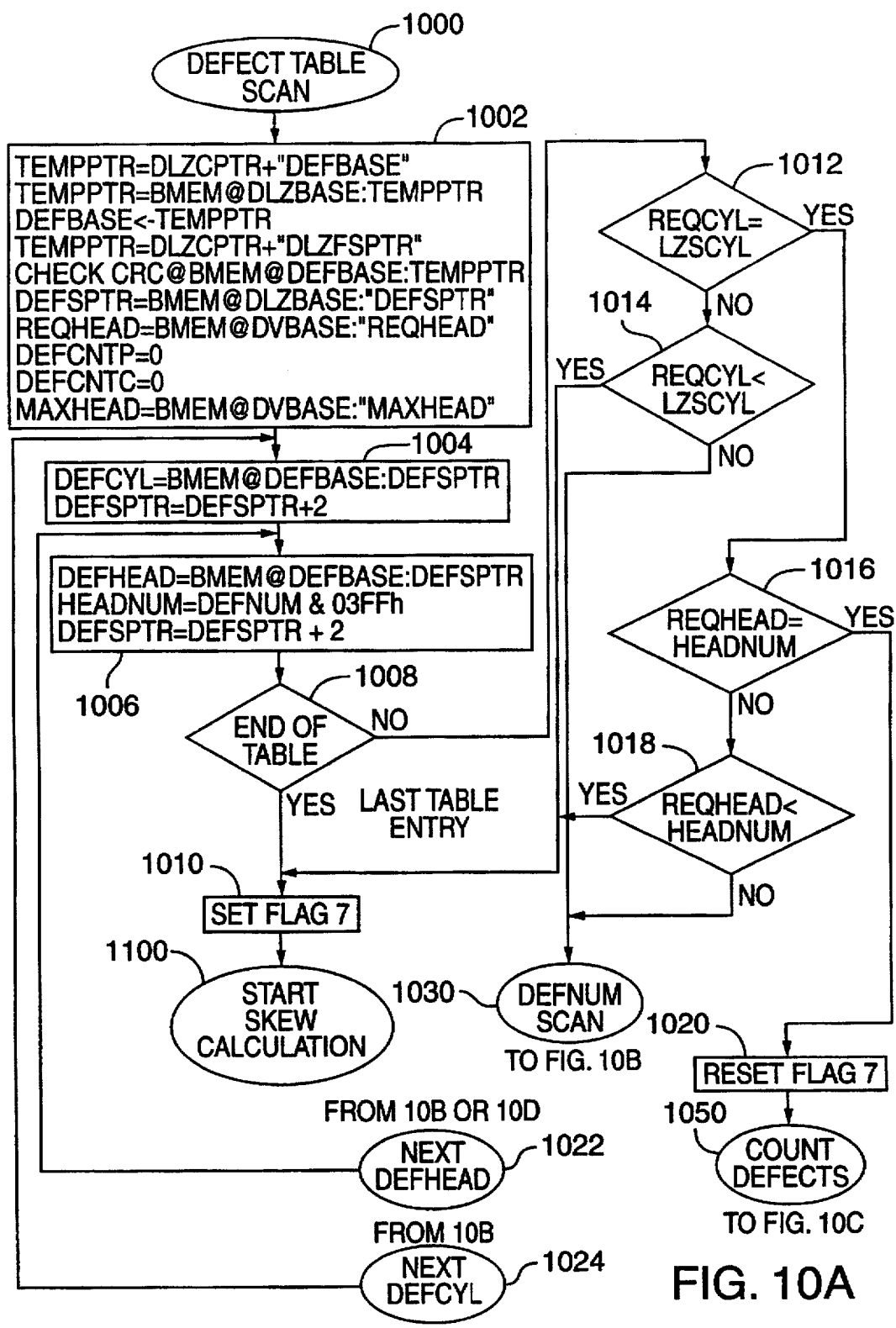
FIGS. 10A, 10B, 10C, and 10D show flow diagrams of a process for scanning a defect table to determine if defective data sectors affect the locations of requested data sectors.
Figure 10B:
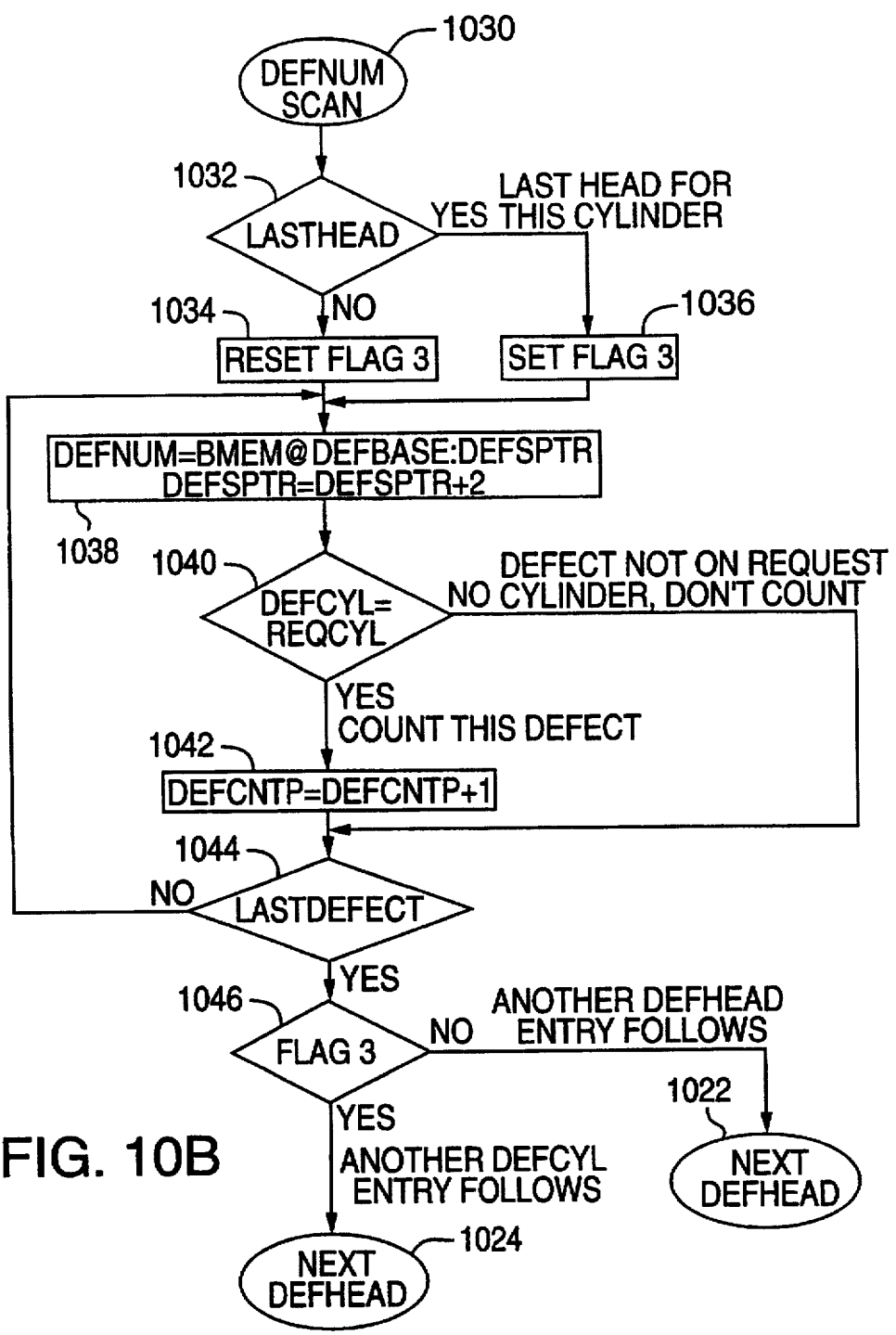
Figure 10C:
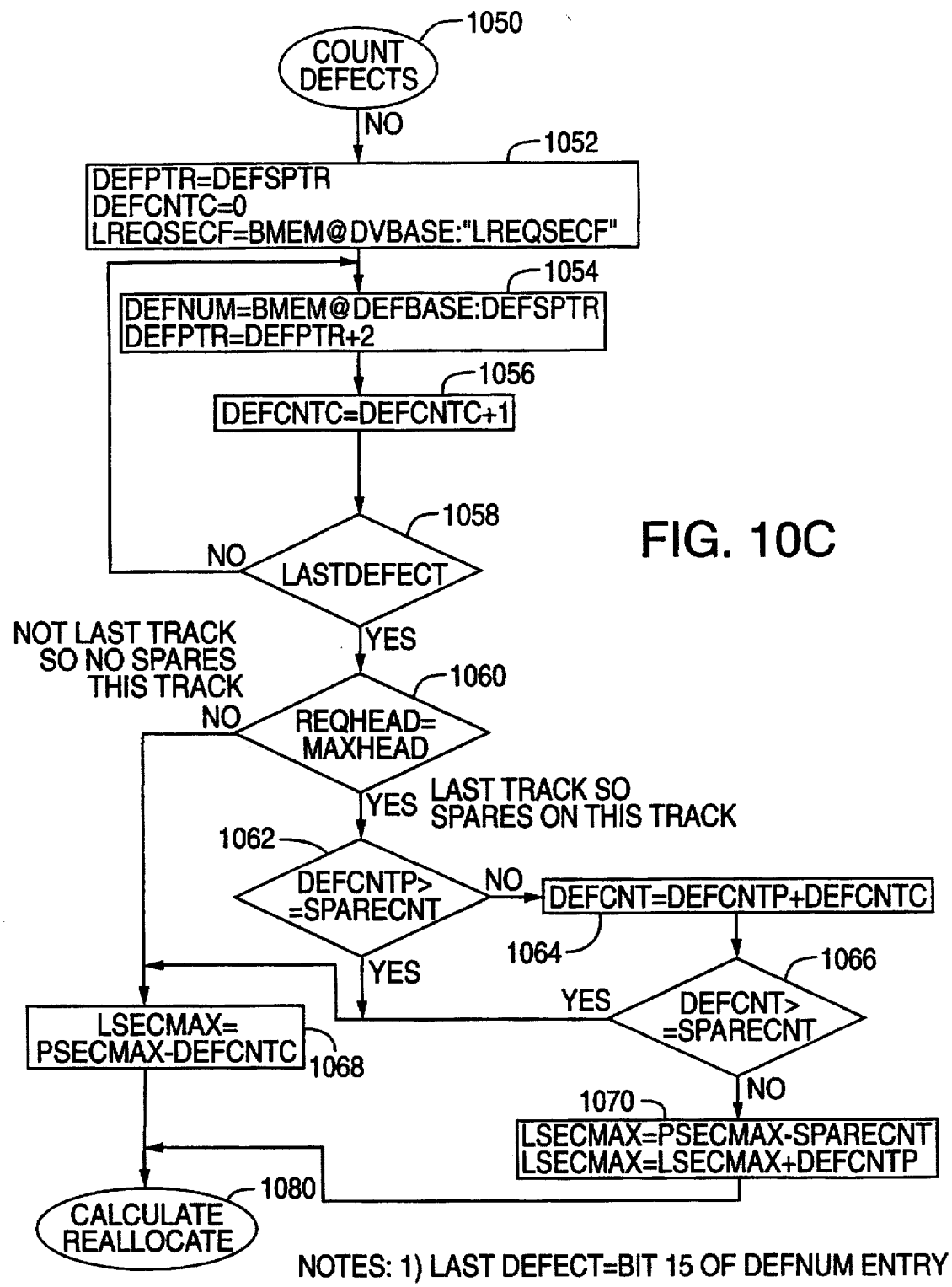
Figure 10D:
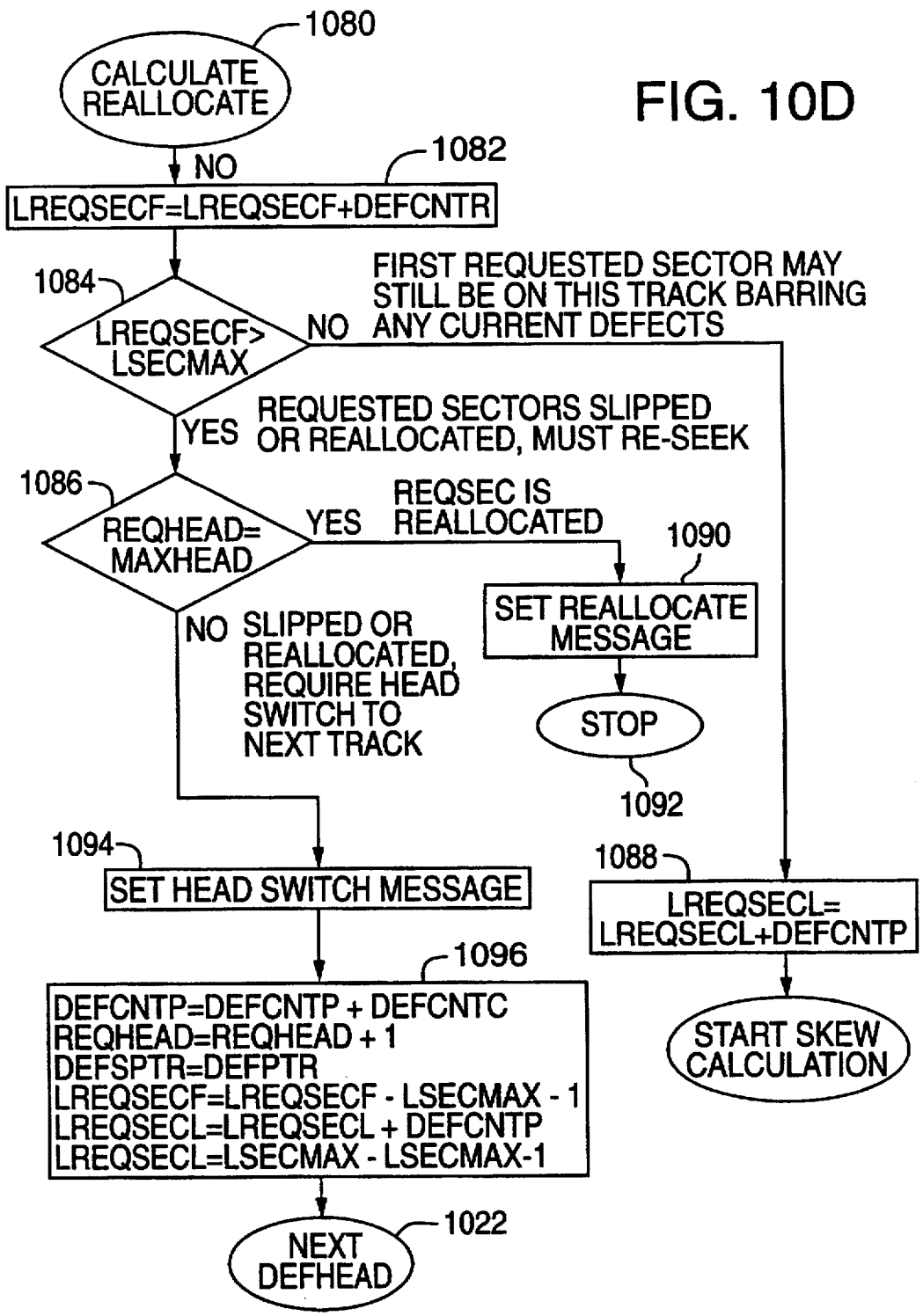

Step 1016 determines whether head number HEADNUM is equal to requested head REQHEAD. If so, the process transfers to step 1020 which resets bit FLAG7 to indicate that the target track has defective data sectors and then transfers to a process 1050 (FIG. 10C) which counts the number of defective data sectors in the target track. If head number HEADNUM is not equal to requested head number REQHEAD, step 1018 checks whether head number HEADNUM is greater that requested head number REQHEAD. Requested head number REQHEAD being less than head number HEADNUM indicates there are no defective data sectors in the target track, and alignment processor 170 transfers to step 1010 and sets bit FLAG7 before starting skew calculation 1100. Otherwise process 1000 has not reached requested head number REQHEAD, and alignment processor 170 transfers to scan 1030 (FIG. 10B).

Scan 1030 begins in step 1032 which checks whether flag bits of variable DEFHEAD indicate the last head entry for the cylinder indicated by variable DEFCYL. If so, scan 1030 transfers to step 1036 and sets bit FLAG3 in flag register 720. If not, bit FLAG3 is reset in step 1034. After step 1034 or 1036, a loop including steps 1038, 1040, 1042, and 1044 is repeated until alignment processor 170 fetches the last defect control word for head number HEADNUM, from the LZD table. Steps 1038, 1040, and 1042 read a defect control word into variable DEFNUM, check whether the defect control word indicates a defective data sector in requested cylinder number REQCYL, and increment a count DEFCNTP of the defect control words for requested cylinder number REQCYL. Upon reaching the last defect control word for variable DEFCYL, step 1046 checks bit FLAG3. If bit FLAG3 is set, the next entry in the LZD table is a cylinder number and the process transfers to step 1024 (FIG. 10A). If bit FLAG3 is reset, the next entry in the LZD table is a head number and the process transfers to step 1022 (FIG. 10A).

If step 1016 in defect table scan 1000 finds an entry for the target track, process 1050 (FIG. 10C) counts defective data sectors in the target track for a disk format referred to as cylinder sparing. For cylinder sparing, only the last track in a cylinder, (i.e. the track having the highest head number) contains spare data sectors; and if a track contains defective data sectors, the last logical data sectors of the track are reallocated onto a track corresponding to the next head number. Logical data sectors of the last track of a cylinder shift into the spare data sectors. Alternative defect counting processes handle track sparing, zone sparing, and multi-cylinder sparing.

In step 1052, alignment processor 170 sets a variable DEFPTR to point to the first defect control word for the target track, and a count DEFCNTC (the number of defective data sectors in the target track) to zero. A loop containing steps 1054, 1056, and 1058 reads the defect control word pointed to by variable DEFPTR, advances variable DEFPTR, and increments count DEFCNTC. Alignment processor 170 transfers from step 1058 to step 1060, after repeating steps 1054, 1056, and 1060 until a flag bit in a defect control word DEFNUM indicates the defect control word is the last for the target track.

Steps 1060, 1062, 1066, 1068, and 1070 determine a value LSECMAX which initially indicates the number of logical data sectors on the target track. If, in step 1060, requested track REQHEAD is not last track MAXHEAD of the cylinder, step 1068 sets value LSECMAX equal to the number PSECMAX of physical data sectors on the track minus the count DEFCNTC of defective data sectors in the track. If requested track REQHEAD is the last for the cylinder, the requested track may contain spare data sectors. Step 1064 adds count DEFCNTC to count DEFCNTP to determine a total count DEFCNT of defects in the cylinder. If total count DEFCNT is greater than or equal to the number SPARECNT, there are no spare data sectors left; and step 1068 determines value LSECMAX, the number of logical data sectors on the requested track. If the total count DEFCNT of defective data sectors is less than the number SPARECNT of spare data sectors, some spare sectors remain; and step 1070 sets value LSECMAX equal to the number PSECMAX of physical data sectors minus the number SPARECNT of spare data sectors, plus the count DEFCNTP of preceding defects. Following step 1060 or 1070, alignment processor 170 branches to a processes 1080 (FIG. 10D) for locating data sectors moved because of defects.

Process 1080 begins in step 1082 when alignment processor 170 modifies variable LREQSECF (the first requested data sector) by adding the count DEFCNTP. Count DEFCNTP indicates the shift of the first logical data sector in the target track caused by preceding defective data sectors. Step 1084 compares variable LREQSECF to the value LSECMAX to determine if the first requested logical data sector is on the target track or has been shifted to another track. If variable LREQSECF is not greater than value LSECMAX, requested data sectors is on the target track, and step 1088 is executed to shift the last requested data sector by the count DEFCNTP. This may cause variable LREQSECF to be greater than the number LSECMAX of data sectors on the requested track. After step 1088, skew calculation 1100 begins to determine the locations of requested data sectors.

If variable LREQSECF is greater than value LSECMAX, the requested data sectors are actually on another track, and steps 1086, 1090, 1094, and 1096 attempt to determine whether the requested sectors are in the target cylinder. If requested head number REQHEAD is equal to the head number MAXHEAD of the last track in the cylinder, then the requested data sectors are not in the target cylinder. Process 1080 transfers from step 1086 to 1090 and 1092 where alignment processor 170 sends a reallocation message to MPU 175 and then stops. MPU 175 determines the cylinder where data was reallocated. Typically, one or more spare cylinders are provided for such reallocation.

If requested head number REQHEAD is not the last, logical data sectors have slipped to another track in the target cylinder. In step 1094, alignment processor 170 sends a message indicating a head switch. Step 1096 changes variables as required to determine if a requested data sector is on the next track. Variable DEFCNTP, which indicates the size of shift of logical data sectors caused by defects in previous tracks, is increased by the count DEFCNTC of defective sectors in the current track. Variable DEFSPTR advances to the end of the defect control words for the target track. Head number REQHEAD is incremented to the next head number. Variables LREQSECF is adjusted to the new logical sector numbers of the next track by subtracting LSECMAX. Additionally 1 is subtracted to account for data sector beginning with logical sector number 0. Variable LREQSECL is similarly modified. Alignment processor 170 then returns to step 1022 and counts the defects for the new requested head REQHEAD.

After defect table scan 1000, bit FLAG7 is reset or set to indicate whether or not the target track contains defective data sectors, and variable DEFSPTR points to the first defect entry for the target track. Alignment processor 170 then determines the physical sector numbers of requested logical data sectors. This is done in two steps, (1) determining the skew between physical data sector number 0 and logical data sector number 0, and then (2) determining physical data sectors corresponding to the requested data sectors.

Figure 11:
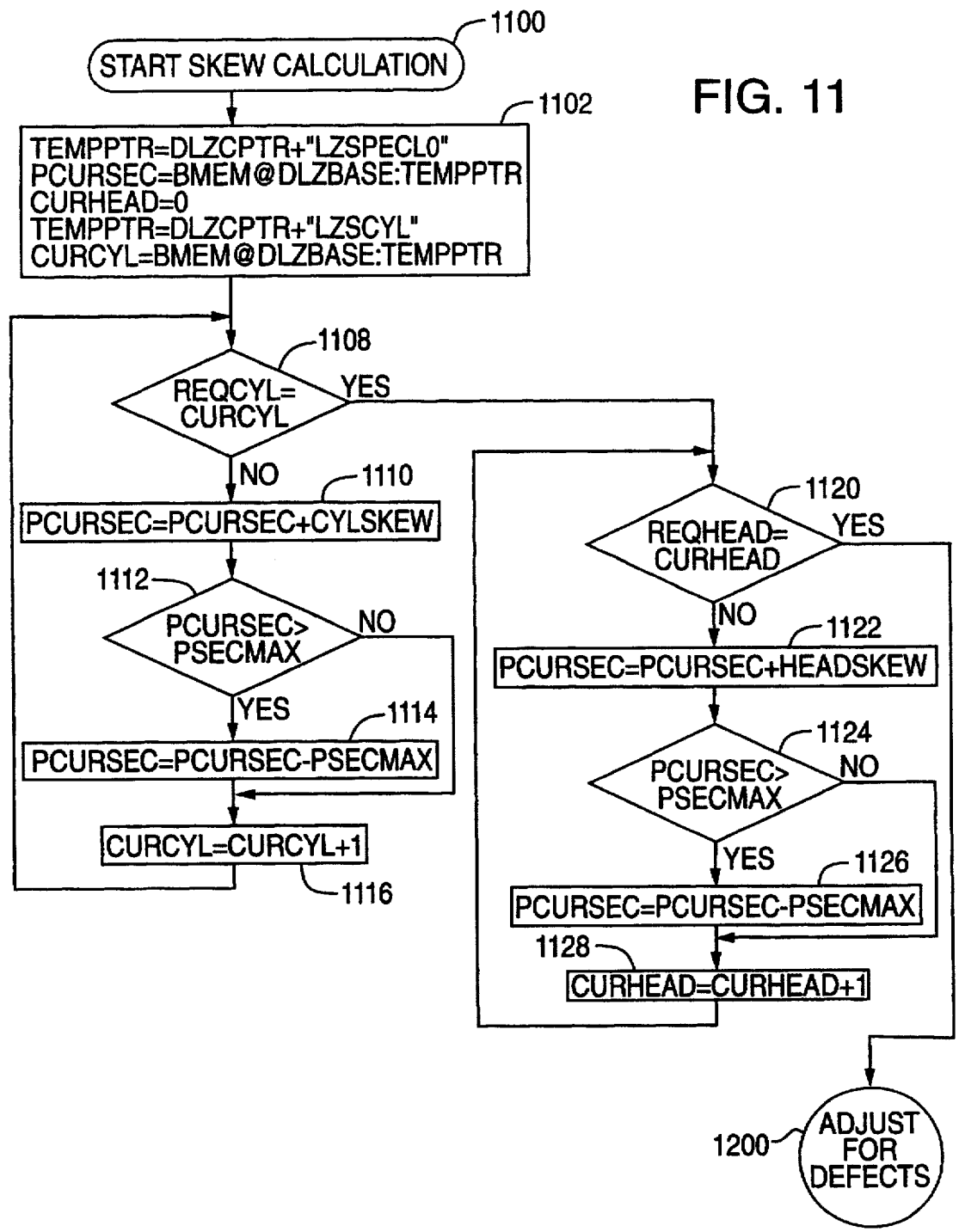
FIGS. 11 shows a flow diagram of a process which determines the skew between a data sector with physical sector number 0 and a data sector with logical sector number 0 on a track without defective data sectors.

FIG. 11 shows a flow diagram of a process for determining the skew between physical data sector number 0 and logical data sector number 0 on the target track assuming the target cylinder contains no defective data sectors on or before the target track. Alignment processor 170 starts in step 1102 by initializing variables CURCYL, CURHEAD, and PCURSEC. Variables CURCYL and PCURSEC are set equal to fields LZSCYL and LZPSECL0 from the LZ configuration table for the target logical zone. Variable CURHEAD equals zero.

Steps 1108, 1110, 1112, 1114, and 1116 together constitute a process loop which accumulates skew encountered when moving read/write heads 114 from the first cylinder of the logical zone to the requested cylinder. Step 1110 increases variable PCURSEC by the skew CYLSKEW between adjacent cylinders. If variable PCURSEC becomes greater than the number PSECMAX of physical data sectors on the track, the skew has wrapped around the track. Steps 1112 and 1114 subtract number PSECMAX from variable PCURSEC if necessary to correct for wrap around. Step 1116 increments variable CURCYL. Steps 1108, 1110, 1112, 1114 and 1116 are repeated until variable CURCYL reaches requested cylinder number REQCYL and then process 1100 transfers to step 1120.

Steps 1120, 1122, 1124, 1126, and 1128 together constitute a process loop which accumulates skew encountered when switching from the first head to the requested head. Step 1122 increases variable PCURSEC by skew HDSKEW between adjacent heads in the requested cylinder. Steps 1124 and 1126 subtract number PSECMAX from variable PCURSEC if necessary to correct for wrap around. Step 1128 increments variable CURHEAD, and steps 1120, 1122, 1124, 1126 and 1128 repeat until variable CURHEAD reaches requested head number REQHEAD and then process 1100 transfers from step 1120 to a process 1200 (FIG. 12A).

FIGS. 12A, 12B, 12C, and 12D show flow diagrams for a process which identifies the physical sector numbers corresponding to the requested range of data sectors. FIG. 13 shows a flow diagram of a process 1300 that determines the physical sector number of the last logical data sector on the track.

Alignment processor 170 starts process 1200 (FIG. 12A) in step 1202 by initializing a variable LCURSEC which represents a logical sector number. In step 1204, alignment processor 170 determines whether bit FLAG7 was set in LZD table scan process 1000. If bit FLAG7 was set, the target track contain no defects, and variable PCURSEC indicates the physical sector number of the first logical sector on the target track. Alignment processor 170 transfers to step 1206 and sets a variable PSECNUML0 to equal the physical sector number of logical sector number 0, before alignment processor 170 transfers to a process 1280 which identifies the requested data sectors on a defect-free target track.

If the target track contains defects, alignment processor 170 transfers from step 1204 to step 1208. Steps 1208 to 1218 determine the physical sector number of the first logical sector on the target track. The first logical sector differs from the physical data sector indicated by variable PCURSEC if that physical data sector is defective. Step 1209 sets variable DEFPTR to point to the first defect entry for the target track and determines from the entry a physical sector number DEFSEC of a defective data sector in the target track. Alignment processor 170 loops through steps 1209, 1210, and 1211 and reads sector numbers until a sector number DEFSEC that is not less than variable PCURSEC is found or the last defective sector (as indicated by flag bits in defect control word DEFNUM) for the target track is found. If the last defective sector is found and is less than variable PCURSEC, variable PCURSEC is the physical sector number of the first logical data sector on the target track, and alignment processor 170 transfers from step 1211 to step 1219 and sets a variable PSECNUML0, which is the physical sector number of logical sector zero, equal to variable PCURSEC. From step 1219, alignment processor 170 transfers to a process 1240 (FIG. 12B) which determines the physical sector number of the first requested logical data sector.

If a sector number of a defective data sector is not less than variable PCURSEC, alignment processor 170 determines whether the sector number of the defective data sector equals variable PCURSEC. If not, variable PCURSEC is the physical sector number of the first logical data sector, and alignment processor 170 transfers from step 1213 to step 1219. If variable PCURSEC identifies a defective data sector, variable PCURSEC is incremented in step 1214. Steps 1215 and 1216 reset variable PCURSEC to 0 if step 1214 incremented variable PCURSEC past maximum value PSECMAX, the last physical sector number on the target track. Step 1217 retrieves the sector number DEFSEC of the next defective data sector. Alignment processor 170 repeats a loop containing steps 1213 to 1217 until a defect sector number DEFSEC not equal to variable PCURSEC is found or the last defect for the target track is found when PCURSEC is less than PSECMAX. In either case, alignment processor 170 transfers to step 1219 and process 1240.

Process 1240 determines the physical sector number corresponding to the first requested logical data sector number LREQSECF. Alignment processor 170 begins process 1240 in step 1241 by determining whether variable LCURSEC, initially 0, is equal to the first requested logical sector number LREQSECF. If so, alignment processor 170 transfers to step 1256 and sets a variable PREQSECF, which represents the physical sector number of the first requested data sector, equal to variable PCURSEC. If not, alignment processor 170 executes a process loop, steps 1241 to 1253, which increments variable LCURSEC for every logical data sector and increments variable PCURSEC for every physical data sector until variable LCURSEC is equal to variable LREQSECF or variable LCURSEC exceeds the number LSECMAX of logical data sectors on the target track.

In the process loop, steps 1242 to 1244 increment variable PCURSEC and correct for wrap around if variable PCURSEC exceeds the maximum physical sector number PSECMAX for the target track. The process continues incrementing variable PCURSEC until variable PCURSEC corresponds to a logical data sector. Steps 1246 to 1251 scan through defect control words for the target track until the last defect control word for the target track is reached or until a sector number DEFSEC of a defective sector is equal to or greater than variable PCURSEC. If, in step 1248, variable PCURSEC is equal to sector number DEFSEC, variable PCURSEC does not correspond to a logical sector, and process 1240 transfers back to step 1242 to check whether the next physical data sector is a logical data sector. If, in step 1249, sector number DEFSEC is greater than variable PCURSEC, variable PCURSEC corresponds to a logical sector, and process 1240 transfers to step 1252 and increments variable LCURSEC. If the last defect control word for the target track is found before a sector number DEFSEC that is greater than or equal to variable PCURSEC, variable PCURSEC corresponds to the physical sector number of a logical data sector, and every physical sector number greater than the current value of variable PCURSEC also corresponds to a logical data sector. Before incrementing variable LCURSEC in step 1252, step 1251 sets bit FLAG0 to indicate that the LZD table need not be scanned for values of variable PCURSEC greater than the current value. If alignment processor 170 determines, in step 1245, that bit FLAG0 is set, alignment processor 170 transfers to step 1252 and does not scan the LZD table.

Alignment processor 170 exits the process loop at step 1241 or 1253. If, in step 1253, variable LCURSEC is greater than the number LSECMAX of logical sectors on the target track, the first requested data sector is not on the target track. Alignment processor 170 transfers to step 1253 and sends a reseek message to MPU 175 to indicate that the requested data sectors are on another track. From step 1241, alignment processor 170 transfers to step 1256 and then to a process 1260.

Figure 12B:
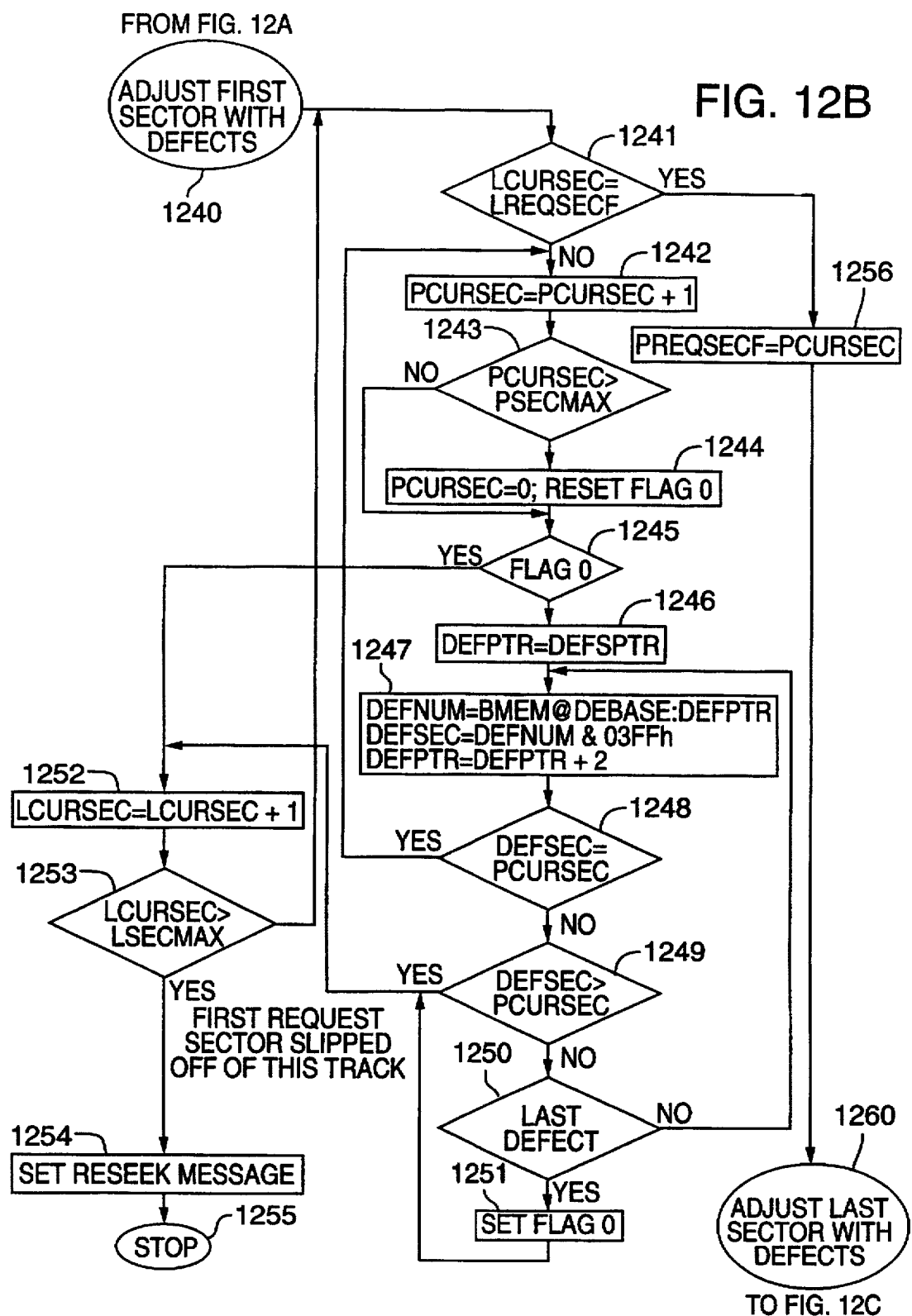
Figure 12C:
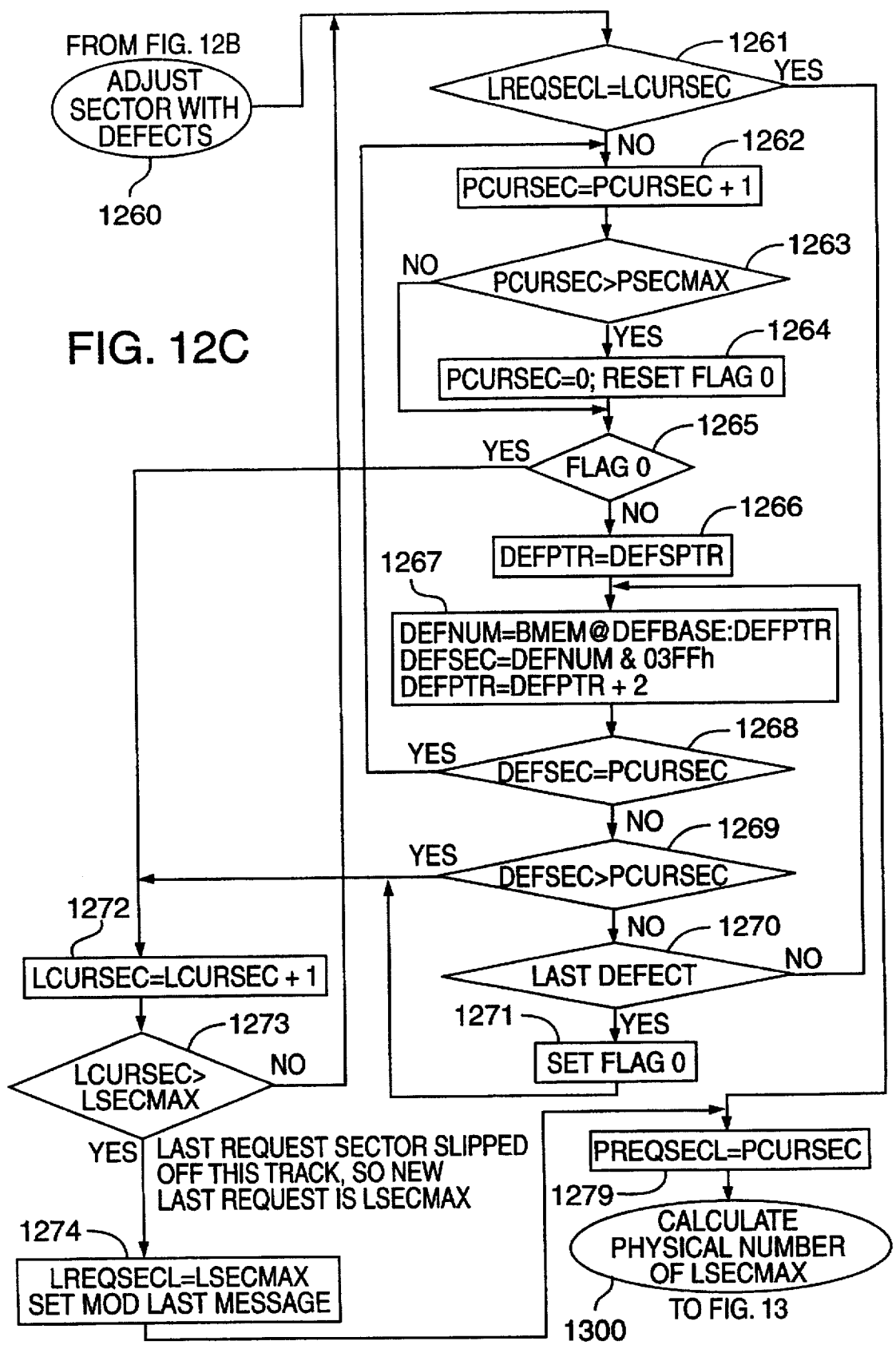
Figure 13:
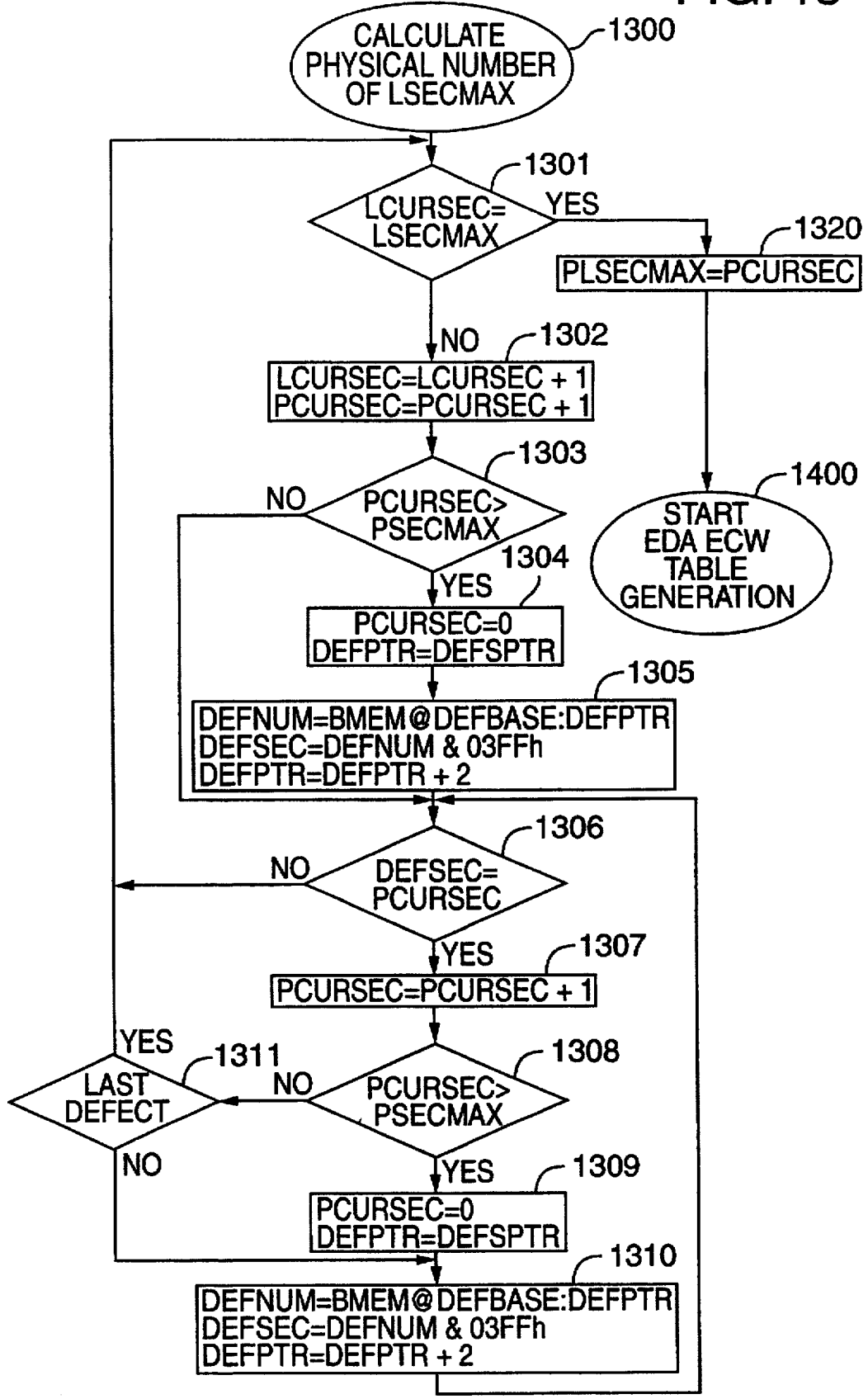
FIG. 13 shows a flow diagram of a process which calculates the physical sector number of the last logical data sector on a track.

FIG. 12C shows a flow diagram of process 1260, which determines a physical sector number PREQSECL corresponding to the last requested logical sector number LREQSECL. A process loop containing steps 1261 to 1273 increments variable LCURSEC for every logical data sector and increments variable PCURSEC for every physical data sector until variable LCURSEC is equal to variable LREQSECL in step 1261 or variable LCURSEC exceeds the number LSECMAX of logical data sectors on the target track. The process steps 1261 to 1273 correspond exactly to the process steps 1241 to 1253 which are described above in regard to FIG. 12B.

Alignment processor 170 exits the process loop containing steps 1261 to 1273 at either step 1261 or 1273. If, in step 1273, variable LCURSEC is greater than the number LSECMAX of logical sectors on the target track, the last requested data sector is not on the target track. Alignment processor 170, in step 1274, changes the last requested sector number LREQSECL to the last logical sector number LSECMAX on the target track and sends a message to MPU 175 to indicate that the range of requested data sectors has been changed. From step 1274 or 1261, alignment processor 170 transfers to step 1279, sets variable PREQSECL equal to variable PCURSEC, and then transfers to process 1300 to calculate the physical sector number of the last logical data sector on the target track.

Figure 12D:
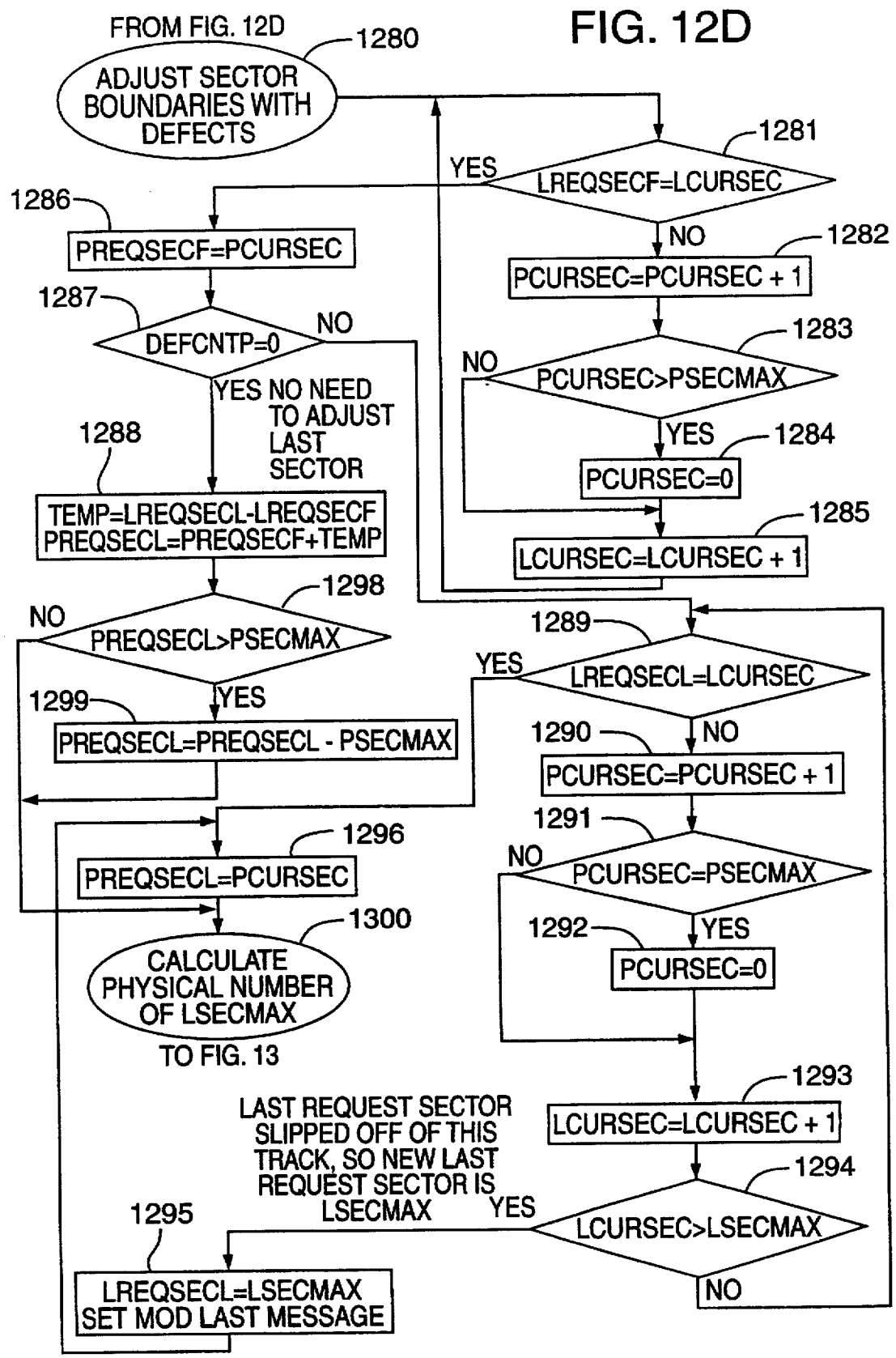

Returning to FIG. 12A, if bit FLAG7 was set in defect scan process 1000, the target track is free of defective data sectors. FIG. 12D shows a flow diagram of process 1280 which determines the physical sector numbers of the first and last requested logical data sectors in the case when the target track does not contain defective data sectors. Steps 1281 to 1285 constitute a process loop which increments variable LCURSEC in step 1285 and variable PCURSEC in step 1282 until, in step 1281, variable LCURSEC is equal to the logical sector number LREQSECF of the first requested data sector and variable PCURSEC indicates the physical sector number of the first requested data sector. Steps 1283 and 1284 correct variable PCURSEC if variable PCURSEC wraps past the last physical data sector number PSECMAX on the target track. When variable LCURSEC is equal to logical sector number LREQSECF, step 1286 sets variable PREQSECF equal to variable PCURSEC to save the physical sector number of the first requested logical data sector.

If the count DEFCNTP of defects on previous tracks in the target cylinder is zero, the last requested data sector is on the target track, and alignment processor 170 transfers from step 1287 to step 1288. Step 1288 adds the difference between the last and first requested logical sector numbers LREQSECL and LREQSECF to the physical sector number PREQSECF of the first requested data sector to determine the physical sector number PREQSECL of the last requested data sector. After step 1288, steps 1298 and 1299 adjust physical sector number PREQSECL if it wrapped past maximum physical sector number PSECMAX before alignment processor 170 transfers to process 1300.

If, in step 1287, the count DEFCNTP of defects on previous tracks is not zero, the last requested data sector may be on another track, and alignment processor 170 transfers to step 1289. Steps 1289 to 1294 constitute a process loop which increments variable LCURSEC in step 1293 and variable PCURSEC in step 1290 until variable LCURSEC is equal to the logical sector number LREQSECL of the last requested data sector or is greater than the maximum number LSECMAX of logical data sectors for the target track. Steps 1291 and 1292 correct variable PCURSEC for wraps past the last physical data sector number PSECMAX on the target track. If, in step 1289, variable LCURSEC is equal to logical sector number LREQSECL, step 1296 sets variable PREQSECL equal to variable PCURSEC to save the physical sector number of the last requested logical data sector. If, in step 1294, variable LCURSEC exceeds the maximum logical sector number LSECMAX for the target track, alignment processor 170 sets the last requested data sector number LREQSECL equal to variable LSECMAX and sends a message to MPU 175 which indicates a change in the range of requested data sectors.

Following step 1296 or 1299, alignment processor 170 transfers to process 1300 and determines the physical sector number of the last logical data sector on the target track. FIG. 13 shows a flow diagram of process 1300. Step 1301 determines whether variable LCURSEC is equal to the last logical sector number LSECMAX for the target track. If so, variable PCURSEC is the physical sector number of the last logical data sector on the target track, and alignment processor 170 transfers to step 1320 to set a variable PLSECMAX equal to the physical data sector number of the last logical data sector.

If variables LCURSEC and LSECMAX are not equal, step 1302 increments variables LCURSEC and PCURSEC, and steps 1303 to 1311 scan the LZD table to find a logical data sector. Steps 1303 to 1305 correct variable PCURSEC for wrap around past the last data sector on the target track and set variable DEFSEC to a sector number from the LZD table. If variable PCURSEC is not greater than variable PSECMAX, the value of variable DEFSEC determined in process 1260 or 1280 is correct for the first value of PCURSEC. Step 1306 determines if variable PCURSEC and PSECMAX are equal. If not, the value of variable PCURSEC corresponds to a logical data sector, and alignment processor 170 transfers back to step 1301. Otherwise, variable PCURSEC is incremented in step 1307 and adjusted for wrap around in steps 1308 and 1309, a new defective sector value DEFSEC is taken from the LZD table unless the last defect entry for the target track has been reached and variable PCURSEC is greater than value DEFSEC for the last entry. The process loop containing steps 1301 to 1311 is repeated until, in step 1301, variable LCURSEC is equal to the last logical sector LSECMAX for the target track.

After alignment processor 170 determines the physical sector numbers PREQSECF, PREQSECL, and PLSECMAX respectively for the first requested data sector, the last requested data sector, and the last logical data sector on the target track, alignment processor 170 generates event control words for ECW table 157. FIGS. 14A, 14B, 14C, 14D, 15A, and 15B show flow diagrams for generating event control words.

Alignment processor 170 starts a process 1400 in step 1402 by initializing local variables in memory 750. Variables DEFSPTR, DLZFBASE, and SKIPPTR respectively point to the starts of the defect control words, the LZF table, and sector skip table 311 (FIG. 3) for the target track. Variable LZREPEAT indicates the size of the LZF table for the target track. Variables DEFBASE, DLZFPTR, and RCOUNT are changed in subsequent steps and are initially equal to variables DEFSPTR, DLZFBASE, and LZREPEAT, respectively. Variables DEFNUM and DEFSEC respectively contain a defect control word and a data sector number from the LZD table. Variables PSEC and RSEC are physical sector numbers corresponding to the LZ control words being converted and a requested data sector, respectively. Variable SKIPWD is a 16-bit word from sector skip table 311.

Following initialization in step 1402, step 1404 fetches an LZ control word from the LZF table for the target track (i.e. for the target logical zone) into variable DLZECW, loads bits 13:0 of variable DLZECW into register 715, and decrements repeat count RCOUNT. If, in step 1406, field SEGSEL of variable DLZECW indicates a partial control word, then step 1408 fetches an extension from the LZF table into variable XDLZECW and again decrements repeat count RCOUNT. Otherwise, alignment processor 170 transfers to step 1410 and determines whether the end of the LZF table has been reached. If so, variables DLZPTR and RCOUNT are re-initialized in step 1412.

In step 1414, alignment processor 170 checks field SEGSEL of variable DLZECW and determines whether variable DLZECW corresponds to a compressed LZ control word. If so, alignment processor 170 transfers to a process 1500 (FIG. 15A) which decompresses the LZ control word indicated by variable DLZECW. Otherwise, alignment processor 170 transfers to a process 1420 (FIG. 14B) which converts variable DLZECW from an LZ control word into an event control word for decoding by disk controller 140.

In process 1420, alignment processor 170 first determines, in step 1422, whether field SEGSEL of variable DLZECW indicates the start of a data sector. In accordance with this embodiment of the invention, disk controller 140 checks the skip bit only in event control words which corresponds to the start of a data sector and ignores the skip bit in other event control word. Alignment processor 170 uses the process steps shown in FIGS. 14B and 14C to correctly set or reset the skip bit in event control words having field SEGSEL indicating the start of a data sector. If the LZ control word does not indicate the start of a data sector, the skip bit is irrelevant, and alignment processor 170 leaves the skip bit unchanged and transfers from step 1422 to a process 1470.

For LZ control words corresponding to the first data segment of a data sector, steps 1424 and 1426 determine if an LZD table contains a defect control word which must be compared with physical sector number PSEC. Process 1000 (FIG. 10A) sets bit FLAG7 to indicate the target track does not contain defective data sectors. A bit FLAG6 is set to indicate sector number PSEC is greater than the sector number of the last defective data sector on the target track. If flag bit FLAG7 or FLAG6 is set, alignment processor 170 transfers from step 1424 or 1426 to step 1442. Otherwise, in step 1428, alignment processor 170 compares sector number PSEC to sector number DEFSEC. If sector numbers PSEC and DEFSEC are not equal, the data sector corresponding to the sector number PSEC is not defective, and alignment processor 170 transfers to step 1442.

If sector numbers PSEC and DEFSEC are equal, the data sector corresponding to sector number PSEC is defective. Step 1432 sets the skip bit in variable DLZECW, and steps 1434, 1436, 1438, and 1440 prepare for the next defective data sector. Step 1434 checks flag bits in defect control word DEFNUM, and step 1436 or 1438 sets or resets bit FLAG6 according to whether defect control word DEFNUM is the last defect control word for the target track. Step 1440 fetches the next defect control word DEFNUM from the LZD table and determines the sector number DEFSEC of the next defective data sector. Alignment processor 170 then transfers to process 1470 (FIG. 14D) to write an event control word to ECW table 157.

If in step 1424, 1426, or 1428 bit FLAG7 is set, bit FLAG6 is set, or sector numbers PSEC and DEFSEC are not equal, alignment processor 170 transfers to step 1442 and checks whether use of sector skip table 311 is enabled. If not, alignment processor 170 transfers to process 1470. Otherwise, alignment processor 170 transfers to a process 1450 (FIG. 14C) which sets the skip bit for data sectors listed in sector skip table 311.

Process 1450 starts in step 1452 by checking whether sector number PSEC which corresponds to variable DLZECW is equal to sector number RSEC which corresponds to a data sector in the range of requested data sectors. The skip bit is set for data sectors listed in sector skip table 311 only if the data sector is in the range of requested data sectors, because disk controller 140 skips data sectors outside the range of requested data sectors according to the values in registers REQSEC and CURSEC described below. If sector number PSEC is not equal to requested sector RSEC, alignment processor 170 transfers to process 1470 and writes the event control word. Step 1454 determines whether the most significant bit of variable SKIPWD is set, and steps 1456 and 1458 set or reset bit FLAG1 to indicate whether the data sector corresponding to sector number PSEC is listed in sector skip table 311. Steps 1460, 1462, and 1464 prepare for the next data sector by (1) shifting variable SKIPWD left by one bit, (2) incrementing a count SKIPCNT to indicate the number of times variable SKIPWD has been shifted, and (3) if variable SKIPWD has been shifted 16 times, fetching the next word from sector skip table 311. Alignment processor 170 then tests bit FLAG1, in step 1466. If bit FLAG1 is set, alignment processor 170 transfers to process 1440 (FIG. 14B) to set the skip bit of the variable DLZECW. If bit FLAG1 is zero, alignment processor 170 transfers to process 1470 to write an event control word.

Figure 14A:
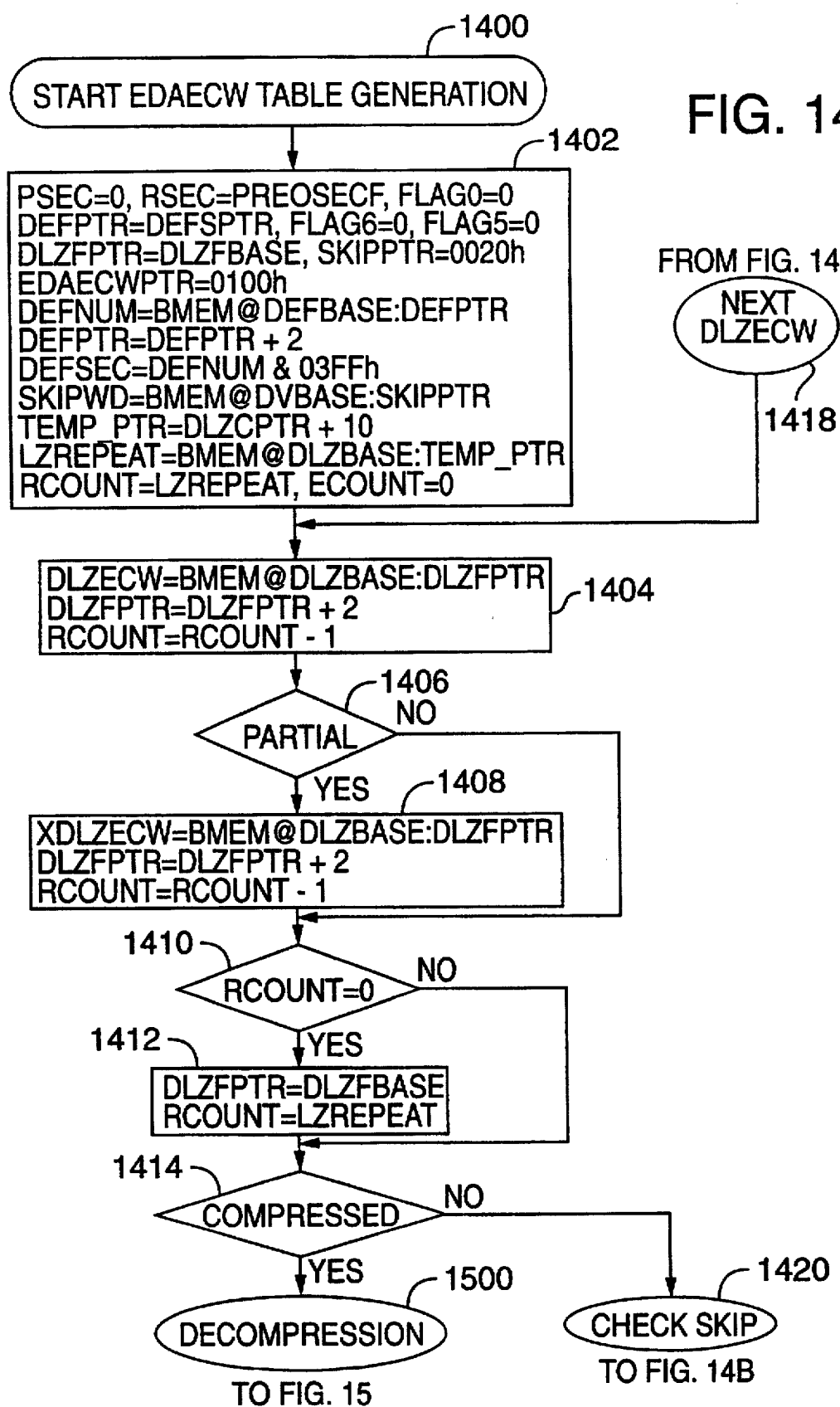
FIGS. 14A, 14B, 14C, and 14D show a flow diagram of a process which converts an LZF table, an LZD table, and a sector skip table into event control words for a target track.
Figure 14B:
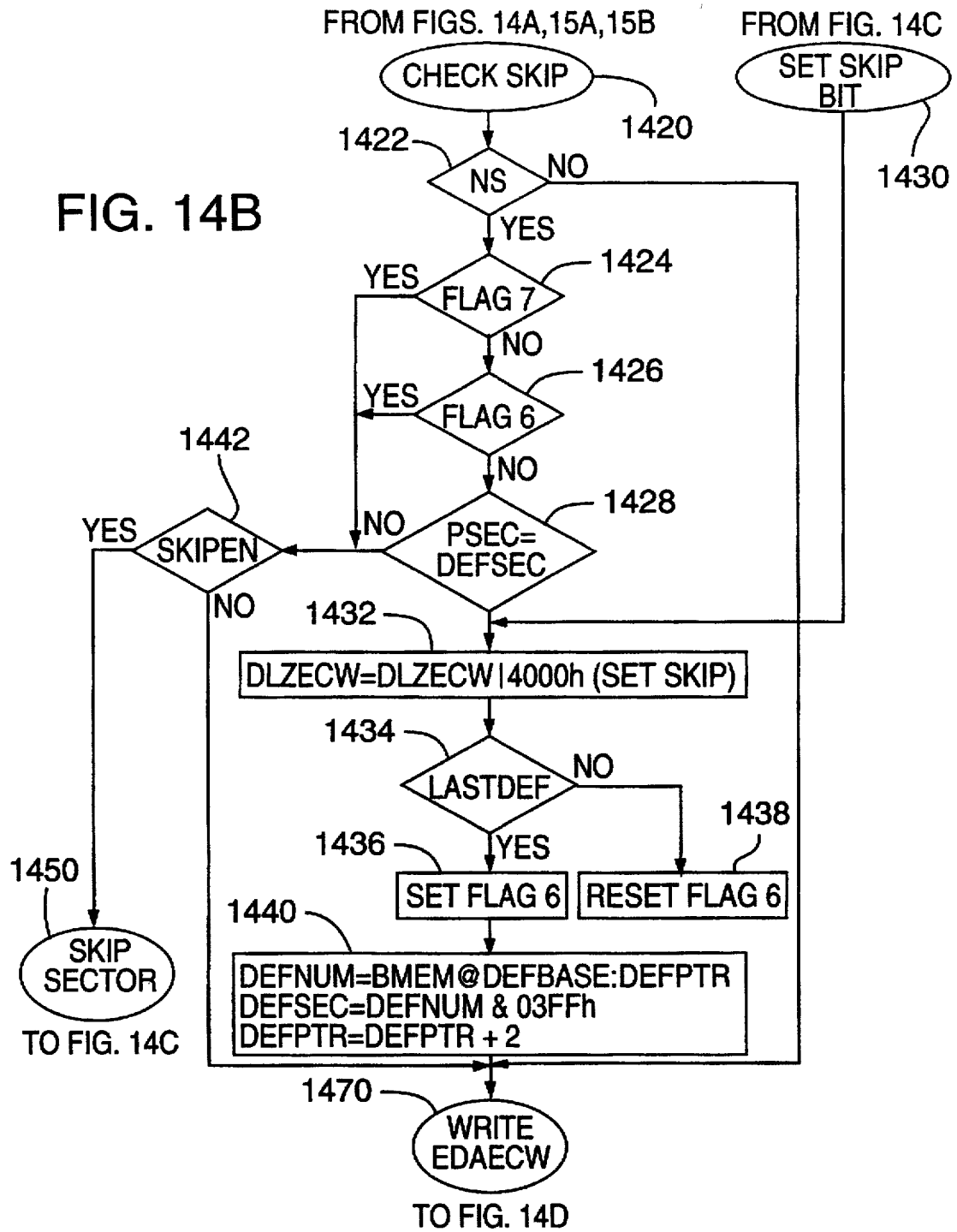
Figure 14C:
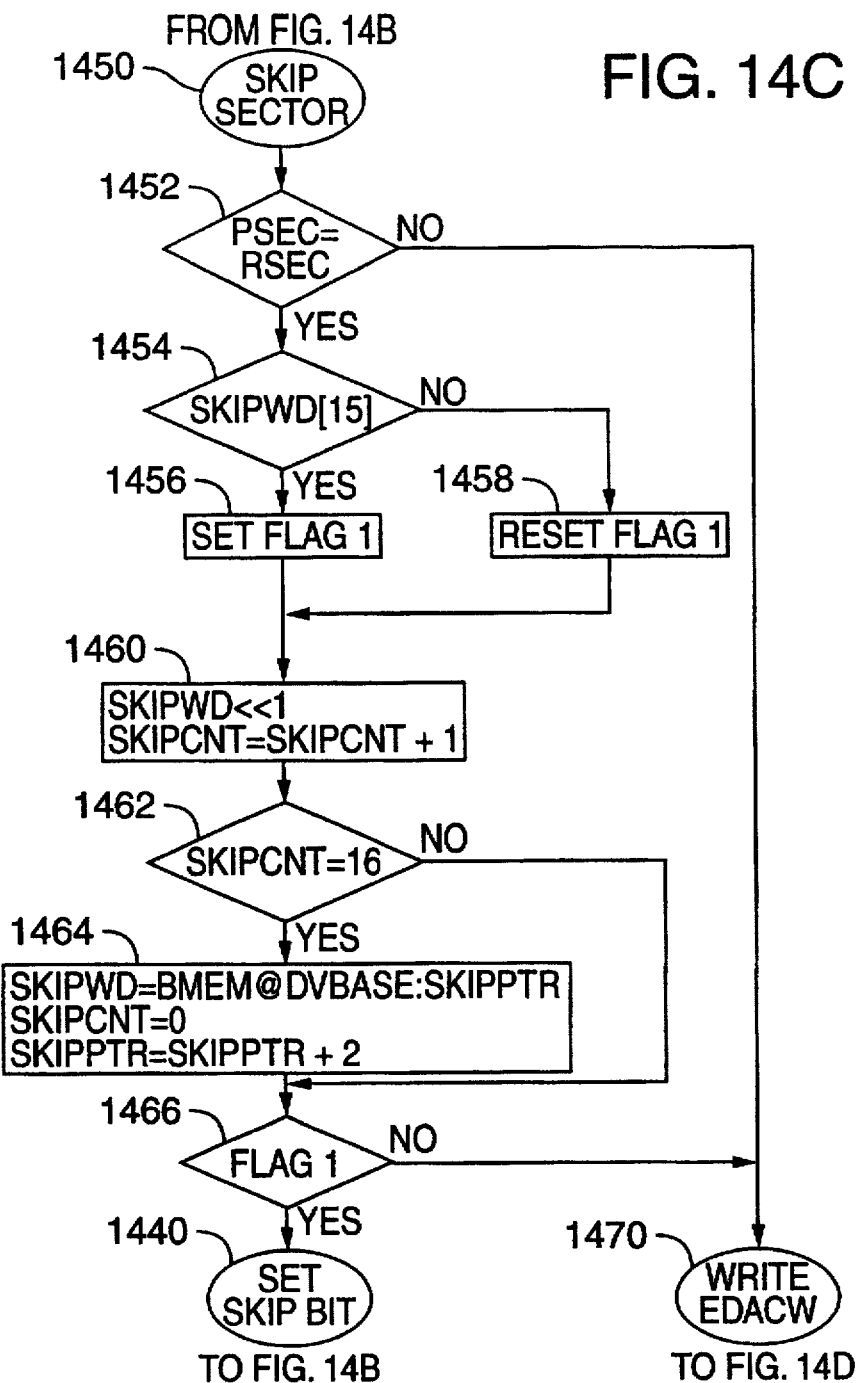
Figure 14D:
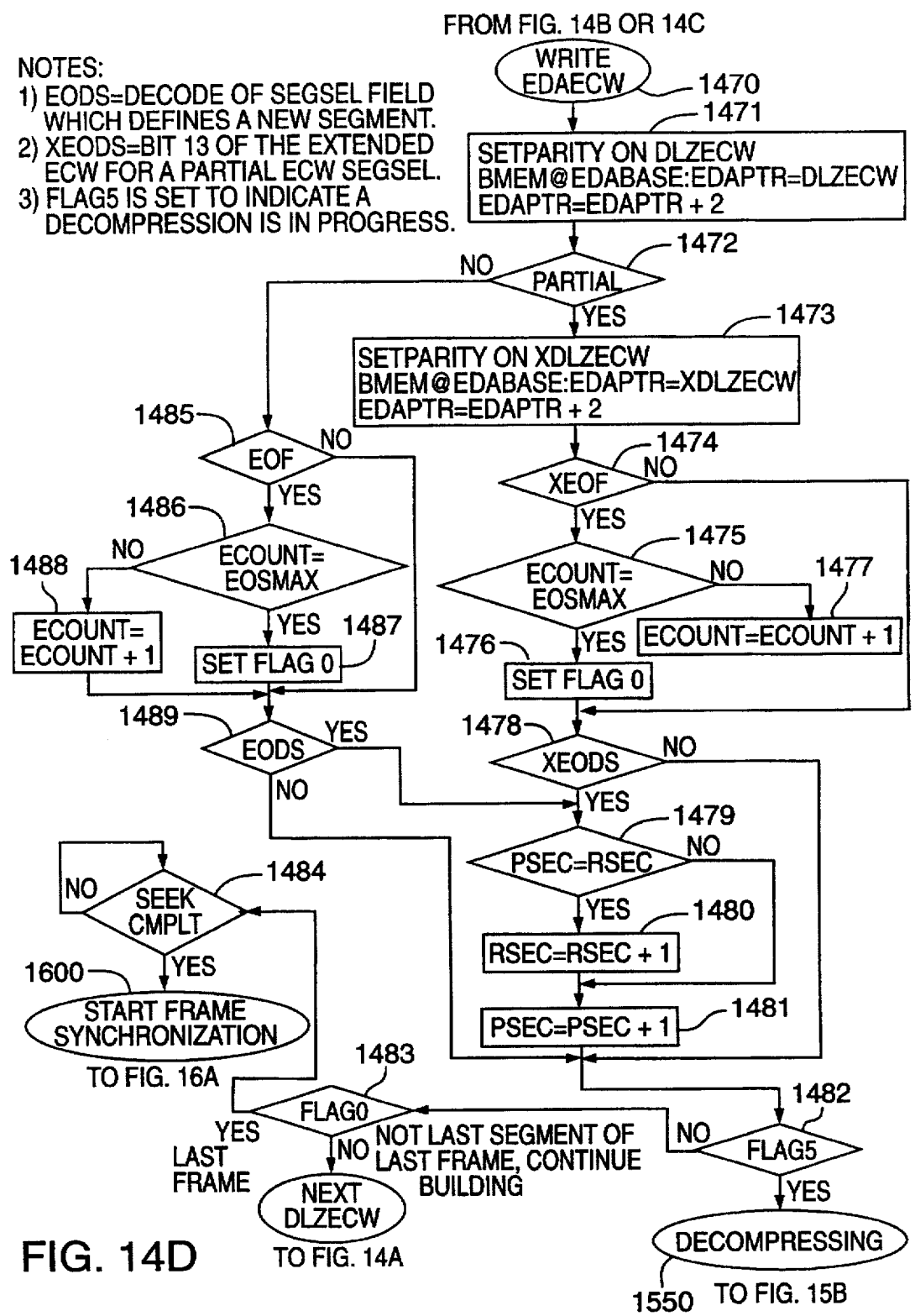

FIG. 14D shows a flow diagram of process 1470 which writes an event control word and extension (if any) to ECW table 157. Step 1471 calculates then sets the parity bit in variable DLZECW and then writes variable DLZECW to ECW table 157. Step 1472 check whether field SEGSEL of variable DLZECW indicates an extension follows, i.e. whether variable DLZECW is a partial control word. If so, alignment processor 170 transfers to step 1473 to calculate and set the parity bit in variable XDLZECW and then write variable XDLZECW to ECW table 157.

Steps 1474 to 1477, which follow writing of an extension, and steps 1485 to 1488, which follow writing of an event control word not having an extension, monitor the number of frames described by the event control words written to ECW table 157. A variable ECOUNT counts the frames described in ECW 157. Step 1474 or 1485 determines whether the control word, extension or complete, indicates the end of a data frame. For extensions, bit 14 of variable XDLZECW is checked in step 1474. For control words without an extension, field SEGSEL of variable DLZECW is decoded in step 1485. If the control word just written to ECW table 157 indicates the end of a data frame, step 1475 or 1486 determines whether variable ECOUNT has reached the number EOSMAX of data frames on the target track. If not, variable ECOUNT is incremented in step 1477 or 1488. If variable ECOUNT equals the number of data frames on the target track, bit FLAG0 is set to indicate that ECW table 157 is complete.

Step 1478 follows steps 1474 to 1477, and step 1489 follows steps 1485 to 1488. Steps 1478 or 1489 determines whether bit 13 of variable XDLZECW or field SEGSEL of DLZECW indicates the end of a data sector. If the control word written does not indicate the end of a data sector, alignment processor 170 transfers from step 1478 or 1489 to step 1482. Otherwise, steps 1479 and 1480 increment variable RSEC if the data sector which is indicated by variable PSEC and described by the control word written to ECW table 157 is a requested data sector. Step 1481 increments variable PSEC to the physical sector number of the next data sector to be described by an event control word.

Figure 15B:
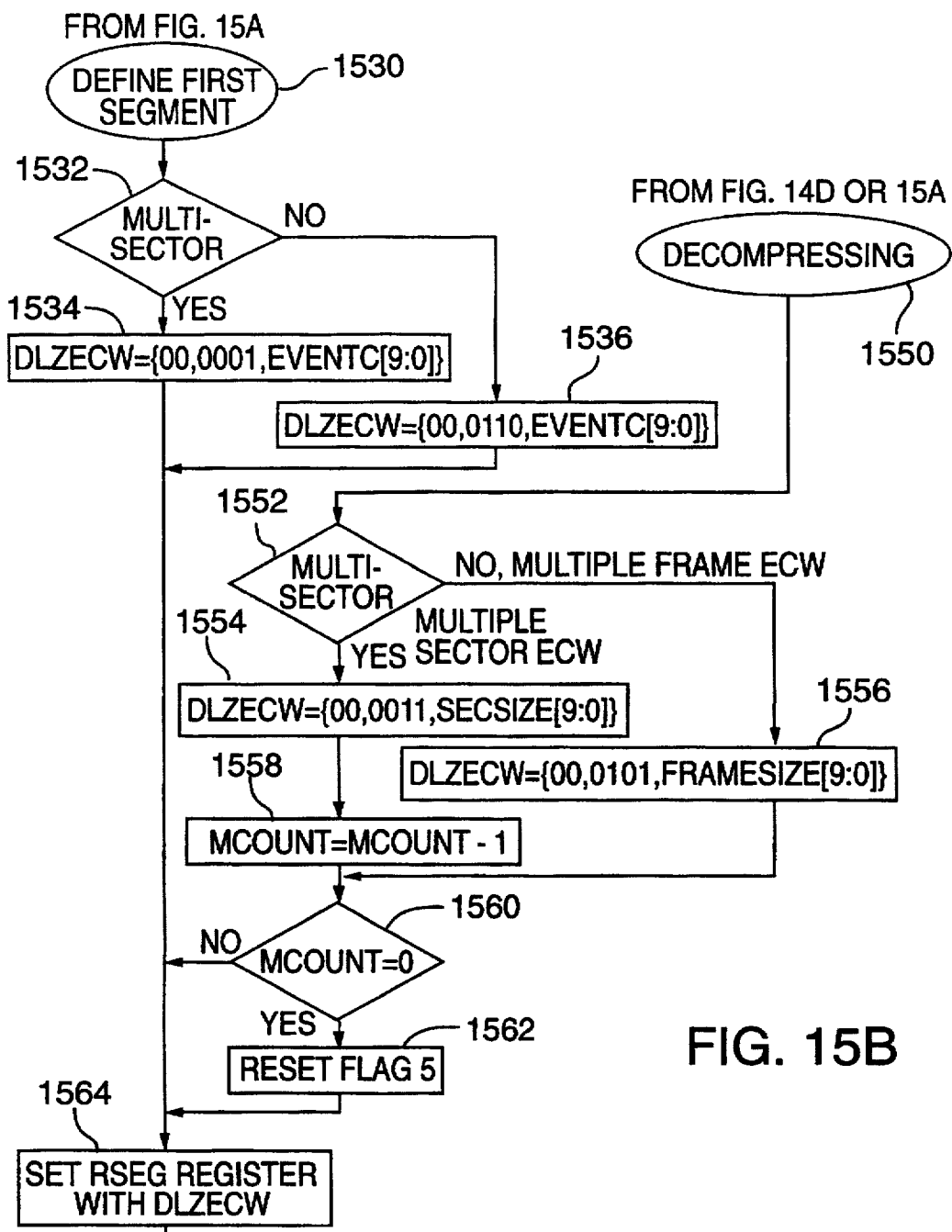

Following step 1478, 1489, or 1481, bit FLAGS is checked to determine whether an LZ control word is being decompressed. If so, alignment processor 170 transfers to process 1550 (FIG. 15B). Otherwise, alignment processor 170 transfers to step 1483 and checks whether bit FLAG0 is set. If not, alignment processor 170 transfers back to step 1404 (FIG. 14A) to fetch another LZ control to be converted. If bit FLAG0 is set, event control words for the target track are stored in ECW table 157, and alignment processor 170 transfers to step 1484 and waits until a seek to the target track is complete. Once the seek is complete, alignment processor 170 executes process 1600 which selects an event control word that is aligned with the position of a read/write head relative to the target track.

FIG. 15A shows a flow diagram for process 1500 which decompresses LZ control words. Alignment processor 170, in step 1504, sets bit FLAG5 to indicate a decompression is in progress, stores field MCOUNT of variable DLZECW in bits [1:0] of a variable MCOUNT, and stores field EVENTC of variable DLZECW in bits [9:0] of a variable EVENTC. If control word DLZECW is not a partial control word and therefore has no extension, alignment processor 170 transfers from step 1506 to step 1528 and determines whether variable EVENTC is zero. If EVENTC is not zero, alignment processor 170 transfers to a process 1530 (FIG. 15B) which writes an event control word for a variable length, first data segment described by control word DLZECW. If EVENTC is zero, control word DLZECW does not describe a variable length, first data segment; and alignment processor 170 transfers to a process 1550 which generates event control words for standard length data segments.

If control word DLZECW is a partial control word, then in step 1508, alignment processor 170 stores bits [15:13] of variable XDLZECW to bits [4:2] of variable MCOUNT and then checks, in step 1510, whether field XEVENTC of variable XDLZECW is zero. If field XEVENTC of variable XDLZECW is zero in step 1510, the first data segment can be described without an extension. If variable EVENTC is zero in step 1528, control word DLZECW and extension XDLZECW do not describe an initial data segment, and alignment processor 170 transfers to process 1550 to generate event control words corresponding to standard length data segments. If variable EVENTC is not zero in step 1528, alignment processor 170 transfers to process 1530 to generate an event control word for a first data segment.

If field XEVENTC of variable XDLZECW is not zero, the event control word for the first data segment requires an extension. Alignment processor 170 determines, in step 1512, whether the LZ control word describes multiple data sectors or multiple data frames. If the LZ control word describes multiple data sectors, the initial data segment (the variable length data segment) is the last data segment of a data sector and is followed by an ISG before the first full data segment starts. In step 1514, alignment processor 170 sets variables DLZECW and XDLZECW to values which are a partial control word and an extension which describe the last data segment of a data sector. Alignment processor 170 then transfers to process 1420 to write the event control word to ECW table 157. If, in step 1512, variables DLZECW and XDLZECW describe multiple data frames, alignment processor 170 transfers to step 1516, sets variable DLZECW to the correct partial control word for the beginning of a data sector, and sets extension XDLZECW to indicate the end of a data frame before alignment processor 170 transfers to process 1420.

Process 1530 generates an event control word to describe an initial data segment from the compressed control word. According to the syntax of Table 4, the event control word has two possible values which are alternatively set in step 1534 or 1536. Step 1534 is executed if in step 1532 the compressed control word describes multiple full data sectors in a data frame. Otherwise, the compressed control word describes part of a data sector including multiple full frame data segments, and alignment processor 170 transfers from step 1532 to step 1536. After step 1534 or 1536, alignment processor 170 moves field SEGSEL of variable DLZECW to register RSEG 715 and then transfers to process 1420.

Process 1550 generates event control words for standard size data segments that follow the initial data segment. In step 1552, alignment processor 170 determines whether the standard sized data segment is a full data sector or a full data frame. Step 1554 is executed for a full data segment, and step 1556 is executed for a full data frame. Step 1554 or 1556 sets variable DLZECW to the value of an event control word containing a 10-bit event-count from register SECSIZE or FRAMESIZE. If the length of full sector or a full frame is greater than a 10-bit value, then variable XDLZECW is set to the value of an extension. After step 1554 or 1556, variable MCOUNT is decremented in step 1558. If variable MCOUNT is not zero in step 1560, alignment processor 170 transfers step 1564 which moves field SEGSEL of variable DLZECW to register 715 and then transfers to process 1420. If variable MCOUNT is zero in step 1560, before transferring to process 1420, alignment processor 170 resets flag bit FLAGS to indicate decompression of the LZ control word is complete.

Figure 16A:
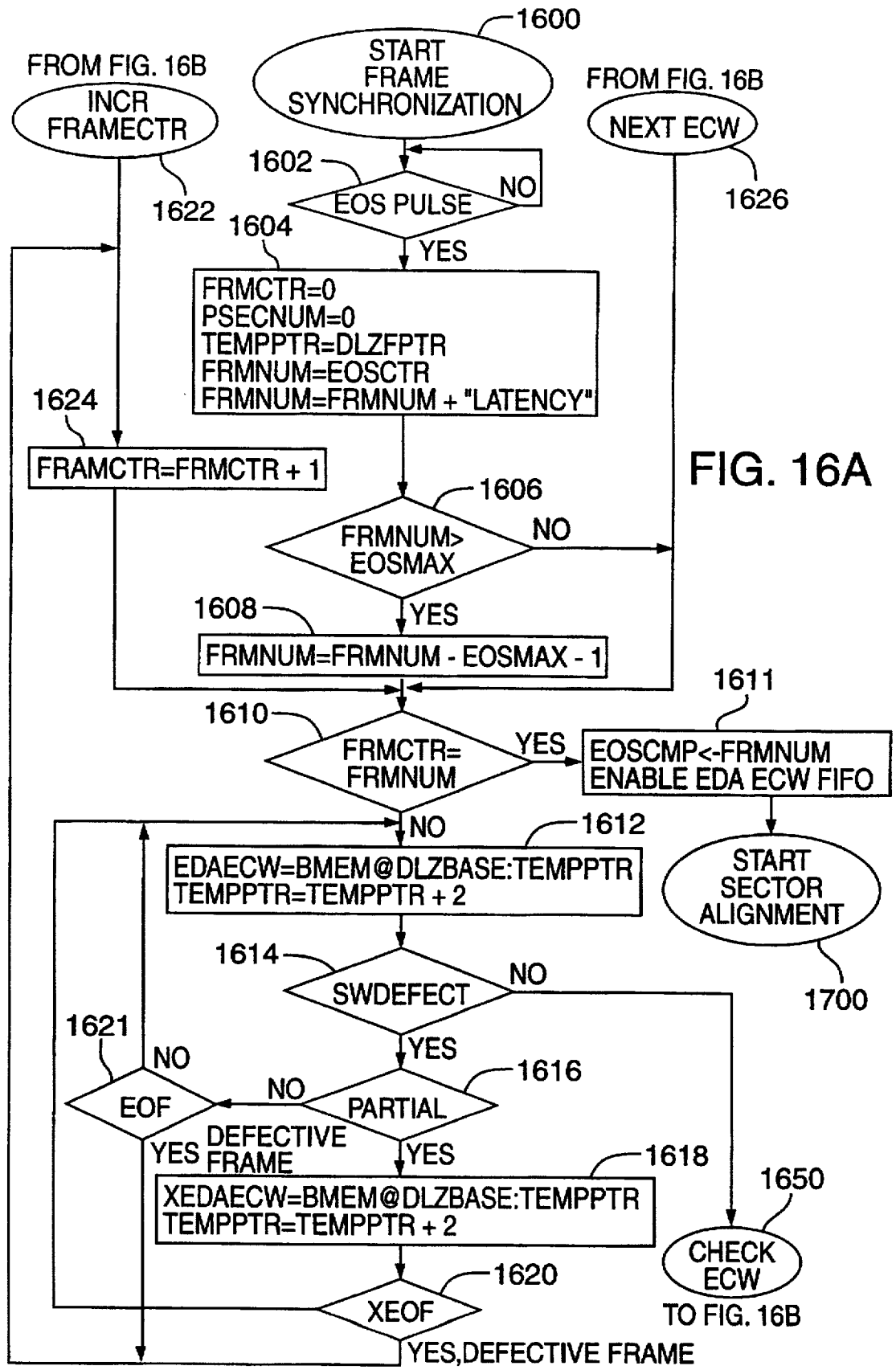
FIGS. 16A and 16B show a flow diagram of a process which aligns a disk controller and event control words with a position of a read/write head.
Figure 16B:
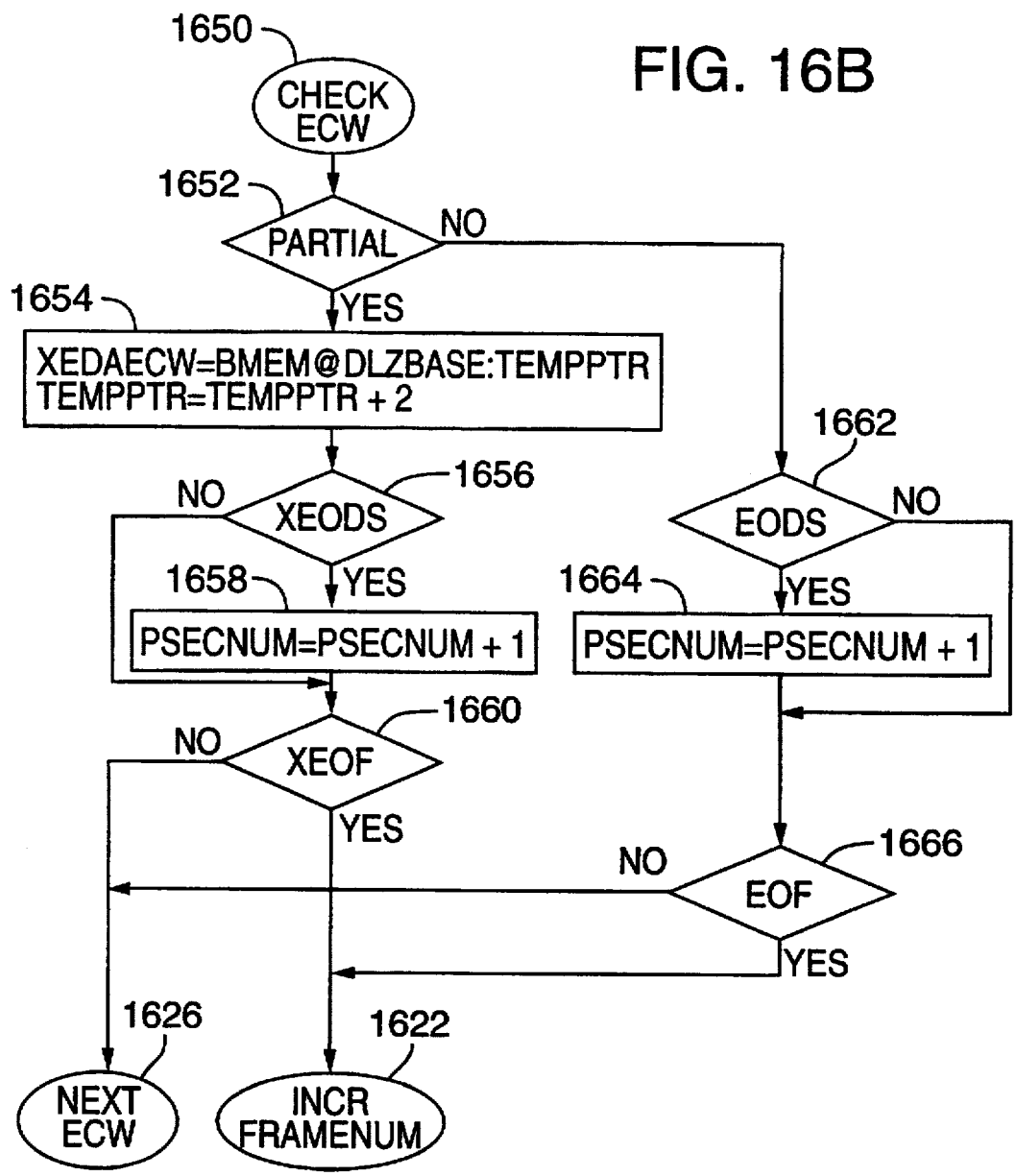

After generating the event control words for the target track, alignment processor 170 aligns disk controller 140 to the event control word which corresponds to the position of read/write heads 114. FIGS. 16A and 16B show flow diagrams of a process which synchronizes disk controller 140 with the physical position of read/write heads 114 relative to media 112. Alignment processor 170 scans ECW table 157 to find an event control word that corresponds to the position of read/write heads 114 just after a subsequent EOS pulse. In step 1602, alignment processor 170 waits for an EOS pulse. By waiting, alignment processor 170 has a fixed amount of time to complete process 1600 before disk controller 140 is started at the next EOS pulse.

Alignment processor 170 initializes variables in step 1604. Variables FRMCTR and PSECNUM, which indicate a frame number and physical sector number, are initialized to zero and change as alignment processor 170 scans through ECW table 157. A variable FRMNUM is set to equal a value from EOS counter 680 (sometimes referred to herein as register EOSCTR) plus a predetermined latency count LATENCY which approximates the number of frames that rotate past read/write heads 114 while alignment processor 170 executes alignment processes 1600 and 1700. If variable FRMNUM increases past the last data frame number EOSMAX for the target track, steps 1606 and 1608 account for wrap around in variable FRMNUM before alignment processor 170 transfers to step 1610.

If, in step 1610, variables FRMCTR and FRMNUM are equal, process 1600 is complete, and alignment processor 170 loads the target frame number into register EOSCMP, enables loading of event control words from ECW table 157 to disk controller 140, and starts a sector alignment process 1700. Otherwise, scanning of ECW table 157 continues in step 1612. In step 1612, alignment processor 170 fetches an event control word from ECW table 157 into a variable EDAECW and then in step 1614 determines if the event control word describes a swallowed defect field or a data segment. If variable EDAECW describes a swallowed defect field, alignment processor 170 transfers to step 1616 and determines whether variable EDAECW is a partial control word. If so, alignment processor 170 branches to step 1618 and reads an extension from ECW table 157 before checking, in step 1620, bit 14 of the extension to determine whether the swallowed defect is at the end of a data frame. If control word EDAECW is not a partial control word, alignment processor 170 transfers from step 1616 to step 1621 and checks field SEGSEL to determine in variable DLZECW indicates the end of a data frame. From step 1620 or 1621, alignment processor 170 transfers back to step 1612 if the event control word does not indicate the end of a data frame or transfers to step 1624 and increments variable FRMCTR before executing step 1610 if the event control word indicates the end of a data frame.

A process 1650 (FIG. 16B) handles event control words which describe a data segment and not a swallowed defect. If, in step 1652, variable DLZECW contains a partial control word, an extension is fetched from ECW table 157. Step 1656 or 1662 checks whether a data segment described is the last segment of a data sector. If so, variable PSECNUM is incremented in step 1658 or 1664 before checking, in step 1660 or 1666, whether the end of a data frame follows the data segment. Following the end of a data frame, alignment processor 170 transfers back to step 1624 and increments variable FRMCTR. Otherwise, alignment processor 170 transfers back to step 1610.

A loop containing steps numbered between 1610 and 1624 repeats until variable FRMCTR reaches variable FRMNUM, the frame number of the starting frame. After process 1600, variable PSECNUM indicates the physical sector number of the first data sector in a frame indicated by variable FRMNUM, and variable TMPPTR indicates the event control word corresponding to that frame. ECW FIFO 610 is automatically filled and kept full of event control words from ECW table 157 starting with the event control word pointed to by variable TEMPPTR. At this point, alignment processor 170 starts sector alignment process 1700 which determines the logical sector number corresponding to position of read/write heads 114 when disk controller 140 starts.

Figure 17A:
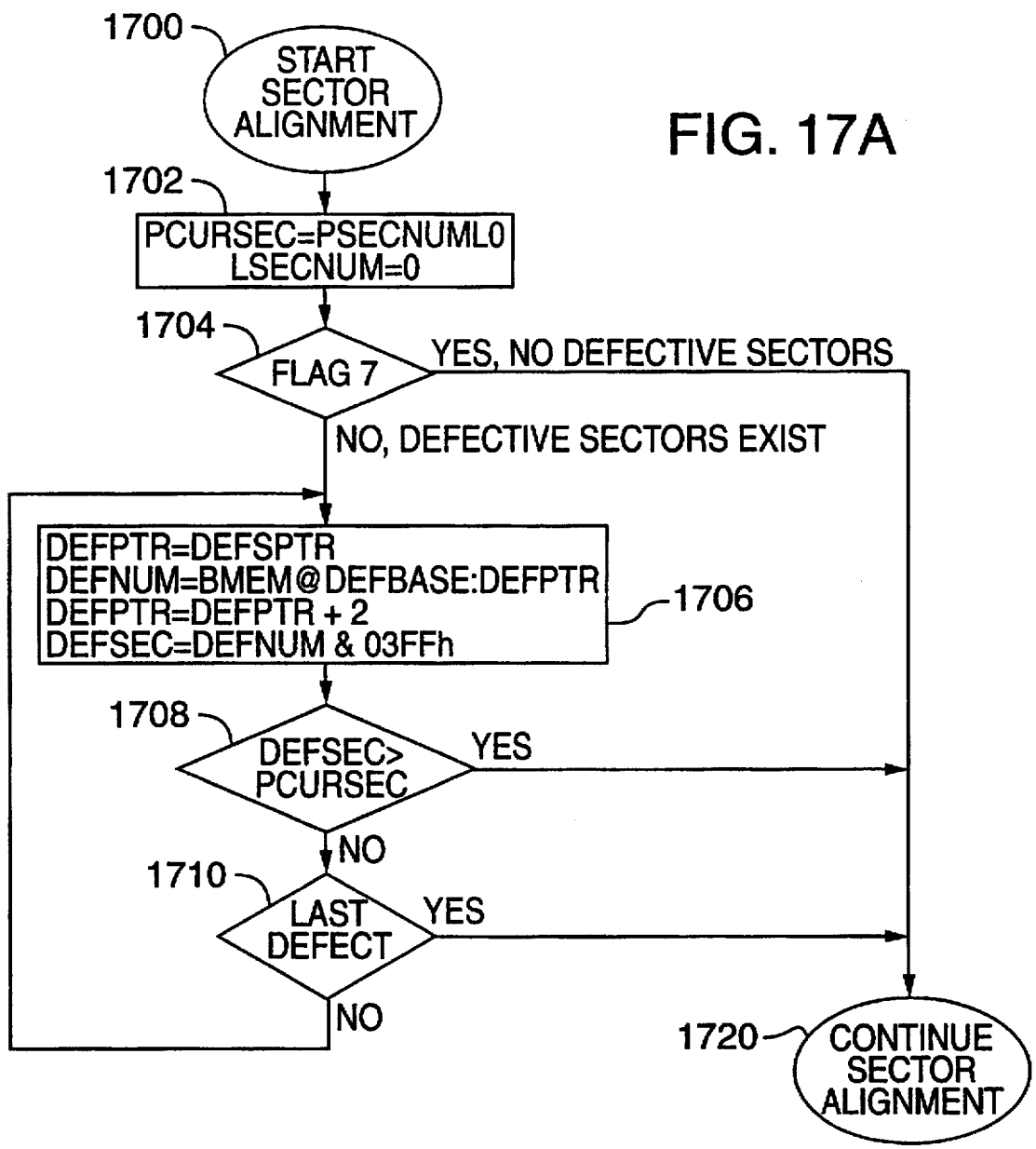
FIGS. 17A and 17B show flow diagrams of a process which identifies the logical data sector that corresponds to the position of a read/write head.
Figure 17B:
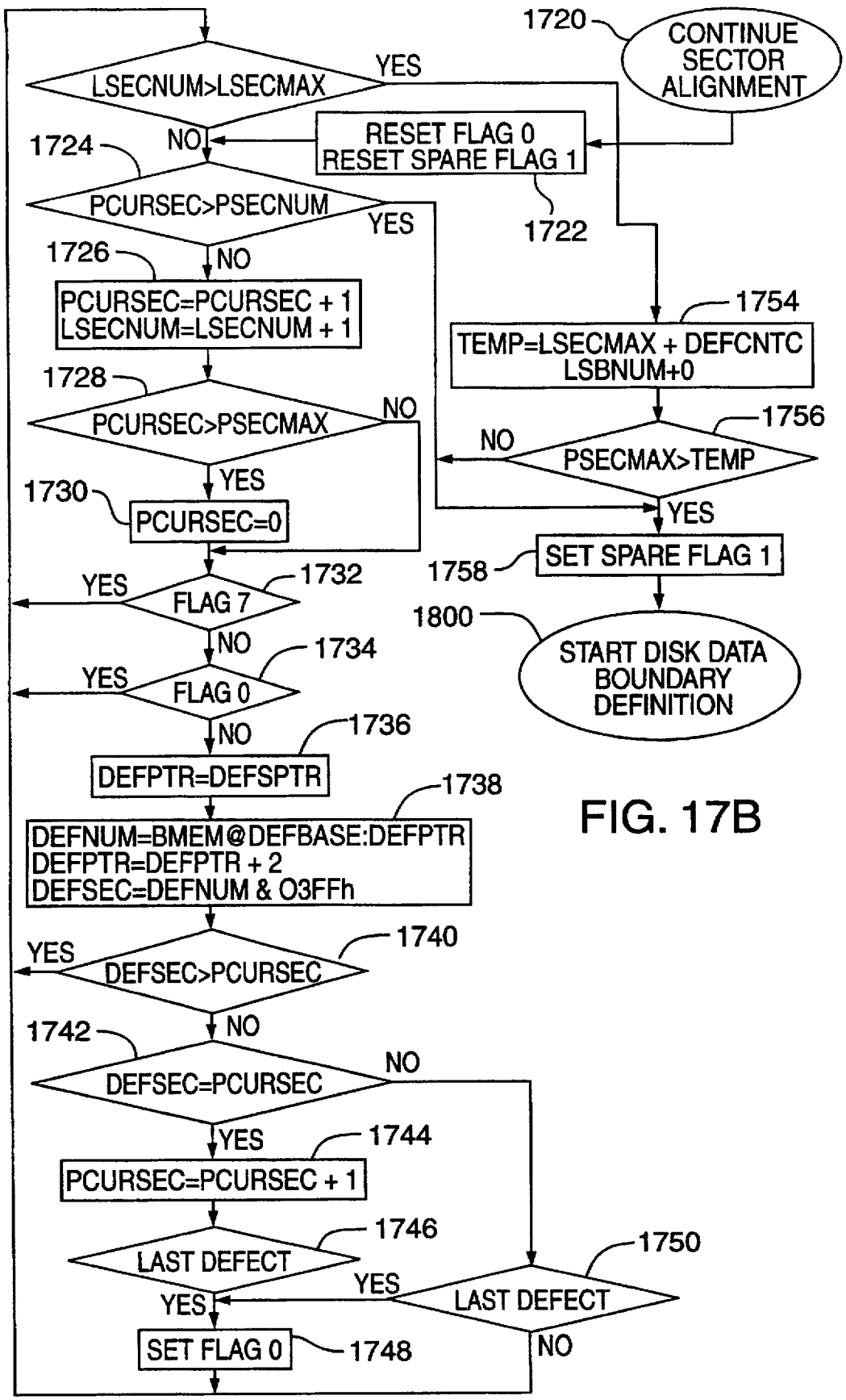

FIGS. 17A and 17B show flow diagrams of sector alignment process 1700. Alignment processor 170 starts process 1700 in step 1702 by initializing variable LSECNUM to zero and variable PCURSEC to the physical sector number PSECNUML0 corresponding to logical sector number 0. If process 1000 set bit FLAG7, the target track is free of defective data sectors, and alignment processor 170 transfers to a process 1720 (FIG. 17B). Otherwise, steps 1706, 1708, and 1710 scan the defect control words for the target track until last defect control word for the target track is found or until a defective data sector with a physical sector number greater than physical sector number of logical sector 0 is found.

Process 1720 starts in step 1722 by resetting bits FLAG0 and FLAG1 in register 720. If variables PCURSEC and PSECNUM are equal, variable LSECNUM indicates the logical sector number of the first data sector in the frame indicated by variable FRMNUM. Otherwise, a process loop containing steps numbered between 1724 and 1750 increments variable LSECNUM once for each logical sector and variable PCURSEC once for each physical sector until variables PCURSEC and PSECNUM are equal or variable LSECNUM is greater than the maximum logical sector number for the target track. Step 1726 increments variables PCURSEC and LSECNUM. Steps 1728 and 1730 correct variable PCURSEC for wrap around on the target track.

If bit FLAG7 or FLAG0 are set, variable PCURSEC corresponds to a logical data sector, and alignment processor 170 transfers from step 1732 or 1734 to step 1752. Otherwise, steps 1736 to 1746 scan through the defect control words for the target track until the scan finds a sector number DEFSEC greater than variable PCURSEC, a sector number DEFSEC equal to variable PCURSEC, or the last defect for the target track. If the last defect for the target track is found, step 1748 sets bit FLAG0 so that no further scans of the LZD table are performed.

When variables PCURSEC and PSECNUM are equal in step 1724, alignment processor 170 transfers to process 1800 which sets registers in disk control 140 for the read or write scenario (i.e. the order in which data sectors are transferred) for the requested data transfer. In particular, for read operations, the read/write head may have landed on the target track within the range of requested data sectors. When this occurs, a zero latency read immediately starts reading data sectors rather than waiting for the disk to rotate to around so that the read/write head is over the first requested data sector. Accordingly, the last requested data sectors are read before the first requested data sectors. Buffer controller 150 can use a conventional method commonly referred to as "Scatter/Gather" to read data from scattered or out-of-order data sectors and collect or gather data read in buffer 155 in the order requested. Additionally, a read ahead operation reads data from data sectors on the target track that are not requested data sectors but can be read quickly in anticipation of a subsequent data transfer request.

Although the invention is described with reference to particular embodiments, the description is only an example of the invention's application and should not be taken as a limitation. Various adaptations and combinations of features of the embodiments disclosed will be apparent to those skilled in the art and are within the scope of the present invention as defined by the claims.

APPENDIX A

This appendix describes a register set for a disk controller such as disk controller 140 of FIGS. 1 and 6.

DISK CONTROL 0 REGISTER (30h, R/W, DCTL0)

Bit 7 (DWRITE) DISK WRITE: When bit 7 is set, the data transfer is from data buffer 155 to disk 112. DFIFO 640 is prefetched, but only if data buffer 155 is available.

Bit 6 (RSTDFIFO) RESET DISK FIFO: When bit 6 is set, DFIFO 640 is held reset with no data prefetch. When bit 6 is reset, DFIFO 640 is operational.

Bit 5 (RSTDECWFIFO) RESET DISK EVENT CONTROL WORD FIFO: When bit 5 is set, ECW FIFO 610 is reset.

Bit 4 (RSTDEBC) RESET DISK EVENT BYTE COUNTER: When bit 4 is set, byte counter 630 is reset.

Bits 3:2 (NRZSEL[1:0]) NRZ SELECT: NRZSEL selects NRZ mode, the number of pins used for signal NRZ. 00=single mode NRZ[0]; 01=double mode NRZ[1:0]; 10=byte mode NRZ[7:0]; 11=Reserved.

Bit 1 (WNRZINIT) WRITE NRZ DATA INITIALIZATION VALUE: When bit 1 is set, signal NRZ indicates FFh. Bit 1 is set for read channels that require signal NRZ to be high for a time to properly set up the channel.

Bit 0 (ENECWPCHK) ENABLE EVENT CONTROL WORD PARITY CHECK: When bit 0 is set, even parity of each ECW out of ECW FIFO 610 is checked. If an error is detected, status bit ECWPERR (DISKINT1 Reg 3Ah bit 2) is set, and DCSM 620 stops. If bit 0 is reset, ECWPERR is reset and cannot be set.

DISK CONTROL 1 REGISTER (31h, R/W, DCTL1)

Bit 7 (DVERIFY) DISK VERIFY: When bit 7 is set, ECC logic executes a fault tolerant compare during a read operation. Bit DWRITE (DCTL0 Reg 30h bit 7) must be 0 when bit 7 is set to put disk controller 140 and ECC controller 145 in read mode and buffer controller 150 in write mode. ECC controller 145 compares the disk read data to the buffer expected data and checks the ECC in the disk read data. If there is an ECC error, the result of the compare is still valid if it is correctable but is only known after the correction process.

Bit 6 (SUPXFR) SUPPRESS TRANSFER: When bit 6 is set, transfers between DCTL 140 and data buffer 155 are disabled. During a write operation, register FORMAT (91h) is the data source.

Bit 5 (FRAMEXFR) FRAME READ/WRITE TRANSFER: When bit 5 is set, DCSM 620 writes or reads a complete frame per DWRITE. The frame length is defined in the event control word. During a write, the VFO field, training field, and data sync field are written, and the data is sourced from data buffer 155. If bit SUPXFR=1 (register DCTL1 bit 6), the data is sourced from register FORMAT (91h).

Bit 4 (DLONG) DISK LONG OPERATION: When bit 4 is set, both the data and ECC fields are transferred to/from data buffer 155, and DFIFO 640 is flushed (read only) after the ECC field is transferred. When bit 4 is reset, only the data field is transferred and DFIFO 640 is flushed (read only) at the data/ECC boundary.

Bit 3 (STPWRFAULT) STOP ON INPUT WRITE FAULT: When bit 3 is set, DCSM 620 stops immediately upon the assertion of signal WRFAULT.

Bit 2:0 (SYNCOFS[2:0]) EXTERNAL SYNC BYTE FOUND OFFSET: When the Enable External Sync bit (DCTL3 Reg 33h, bit 0) is set, DCTL 140 uses SYNCOFS for alignment to a mark SYNCFND produced by an external sync detect circuit. A zero offset means that mark SYNCFND occurs on the first byte following the sync byte. All offsets are earlier, and no later offset is allowed. Mark SYNCFND must meet the setup time for signal RCLK to be valid.

DISK CONTROL 2 REGISTER (32h, R/W, DCTL2)

Bits 7:4 (DTESTSEL1) DCTL TEST STROBE SELECT 1: DTESTSEL1 selects various outputs for an I/O pin TESTSTB1 for debugging.

Bits 3:0 (DTESTSEL2) DCTL TEST STROBE SELECT 2: DTESTSEL2 selects various outputs for an I/O pin TESTSTB2 for debugging.

DISK CONTROL 3 REGISTER (33h, R/W, DCTL3)

Bits 7:4 (ACTHISYNCF, ACTHISEC, ACTHIIDX, and ACTHIEOS): Bits 7, 6, 5, and 4 indicate respectively whether signals SYNCDET, SECTOR, INDEX, and EOS are active high or active low.

Bit 3 (SECPOS) SECTOR PULSE POSITIONING MODE: Bit 3 selects whether DCSM 620 operates in the "Sector Pulse Positioning" mode and synchronizes to sector pulses or operates in "Byte Count Positioning" mode and only synchronizes to EOS pulses.

Bit 2 (ENCWPOP) ENABLE DECWFIFO CONTROL WORD POP: When bit 2 is set, ECW FIFO 610 is popped when read by local MPU 175. Bit 2 is normally reset to allow reading registers without popping ECW FIFO 610 contents needed during operation. Bit 2 is set during a diagnostic check of ECW FIFO 610 or in status recovery after an error.

Bit 1 (ENBUFCW) ENABLE BUFFER EDA CONTROL WORD: When bit 1 is set, ECW FIFO 610 is loaded from data buffer 155. A fetch occurs whenever there is room in ECW FIFO 610.

Bit 0 (ENEXTSYNC) ENABLE EXTERNAL SYNC FOUND: Setting bit 0 enables external sync detection. Resetting enables the internal sync detection. The internal sync detect can be a single byte or a two-byte fault tolerant sync field per the value loaded in register SBCNT (42h).

DISK CONTROL 4 REGISTER (34h, R/W, DCTL4)

Bits 7:5 are reserved.

Bit 4 (EVENPARITY): Bit 4 is set or cleared to select even or odd parity on NRZ[7:0] when in NRZ byte mode.

Bit 3 (RLSUNCORR) RELEASE SECTOR ON UNCORRECTABLE ECC ERROR: When bit 3 is set, a data sector is released to data buffer 155 even if the data sector has an uncorrectable ECC error. Bit 3 is set for video data applications and should never be set with bit STPUNCORR (register DISKSTOP bit 7).

Bit 2 (AFTADSEC) AFTA PROCESSOR LOADS SECTOR NUMBER REGISTERS: When bit 2 is set, registers REQSEC, STOPSEC, CURRSEC, CURRSECMAX, WRAPSEC0, WRAPTOSEC0, WRAPSEC1, WRAPTOSEC1, EOSMAX, and EOSCMP are loaded by AFTA processor 170. When bit 2 is reset, MPU 175 loads these registers.

Bit 1 (ENIDXEOS) ENABLE CLEAR EOS/CURRSEC COUNTER ON INDEX: When bit 1 is set, register EOSCTR (60h) is reset to 00h when signal INDEX is asserted. When bit 1 is reset, EOSCTR only resets to 00h if the contents of registers EOSCTR and EOSMAX (61h) are equal when an EOS pulse is asserted.

Bit 0 (ENSEED) ENABLE SEED: When bit 0 is set, the SEED function is enabled. When read gate or write gate is asserted at the start of a data sector (field SEGSEL indicates a new sector), signals and data are sent to ECC controller 145 to seed the ECC.

DISK STOP REGISTER (35h, R/W, DISKSTOP)

Bit 7 (STPUNCORR) STOP ON UNCORRECTABLE ECC: When bit 7 is set, DCSM 620 stops if the correction logic encounters an uncorrectable ECC error, or ECC correction was not finished before the end of the next data sector (ECC overrun condition flagged in ECC controller 145). Only the ECC error in the data field is used. Bit 7 may be set during the sector following the ECC error. The buffer sector counter BCTR in buffer controller 150 is not incremented and the corrected data sector is not released to the host, unless bit RLSUNCORR is set (register DCTL4 bit 4).

Bit 6 (STPSEEDOVR) STOP ON SEED OVERRUN: When bit 6 is set, DCSM 620 stops when more than two hardware corrected data sectors have passed without MPU 175 reading the corrected seed FIFO (register CSEED 68h/69h).

Bit 5 (STPBERR) STOP ON DISK/BUFFER TRANSFER ERROR: When bit 5 is set, DCSM 620 stops when a disk FIFO overrun error or disk/buffer CRC/parity error is detected.

Bit 4 (STPAUTOWR) STOP ON AUTO WRITE: When bit 4 is set, DCSM 620 stops when the host write command is automatically started without MPU 175 intervening.

Bit 3 (STPCORR) STOP ON CORRECTED ECC ERROR: When bit 4 is set, DCTL 140 stops after an ECC error is hardware corrected in data buffer 155. "SECTOR_OK" is not generated to buffer controller 150 for the corrected sector that stops DCTL 140, so that the buffer counter sector BCTR in buffer controller 150 is not incremented and the data sector is not released to the host.

Bit 2 (STPENDSEC) STOP ON SECTOR BOUNDARY: When bit 2 is set, DCSM 620 stops after finishing reading or writing of a complete data sector (after processing an event control word with EODS=1). DCSM 620 stops immediately if it is not processing a data segment of a data sector.

Bit 1 (STPBNRDY) STOP ON BUFFER NOT READY: When bit 1 is set, DCSM 620 stops when data buffer 155 is not available for transfer of data.

Bit 0 (STPSEEDERR) STOP ON SEED ERROR: When bit 0 is set, DCSM 620 stops when ECC controller 145 asserts signal ESEEDERR. If an automatic stop condition occurs while write gate is on, DCSM 620 does not stop until write gate turns off. Therefore, a write terminates either in a servo area or at the end of a data sector. However, during a read operation, DCSM 620 stops immediately (except STPENDSEC) when a stop condition is detected.

DISK STATUS REGISTER (36h, R/W, DSTAT)

Bit 7 (EOSPASS) END OF SERVO PASSED: Bit 7 is asynchronously set on the asserting edge of an EOS pulse and cleared when written with a 1.

Bit 6 (EOSCMPASS) END OF SERVO COMPARE PASSED: Bit 6 is asynchronously set on the asserting edge of an EOS pulse when EOSCTR equals EOSCMP and is cleared when written with a 1.

Bit 5 (INDEXPASS) INDEX PASSED: Bit 5 is asynchronously set on the asserting edge of an INDEX pulse and is cleared when written with a 1.

Bit 4 (SECTORPASS) SECTOR PASSED: Bit 4 is asynchronously set on the asserting edge of a SECTOR pulse in "Sector Pulse Positioning" mode or at the start of the first data segment of a data sector and is cleared when this bit is written with a 1.

Bit 3:0 are reserved.

DCSM ADDRESS (37h, R/W, DCSMADR)

Bit 7 (START/RUN) START (Write)/RUN (read): When bit 7 is written with a 1, DCSM 620 is started. When bit 7 is read it reflects the status of DCSM 620 (1=running, 0=stopped).

Bit 6 is reserved.

Bits 5:0 (DCSMSTATE) DCSM STATE [5:0]: DCSMSTATE indicates the current state of DCSM 620.

DISK INTERRUPT REGISTER (38h, R/W, DISKINT0) and (3Ah, R/W, DISKINT1): Status bits in registers DISKINT0 and DISKINT1 are set and remain set when the corresponding status condition occurs. Writing a 1 clears a bit. Writing a 0 has no affect. Each status bit is enabled to generate an interrupt via a corresponding interrupt mask bit in registers DISKINTEN0 or DISKINTEN1. When any bit in register DISKINT0 or DISKINT1 is set and enabled by the corresponding bit in DISKINTEN0 or DISKINTEN1, output signal DINT1 or DINT2 is asserted.

Register DISKINT0

Bit 7 (DEBCFERR) DISK EVENT BYTE COUNTER FIFO ERROR: Bit 7 is set when an attempt is made to load byte counter 630 from ECW FIFO 610 while ECW FIFO 610 is empty, or an attempt is made to load ECW FIFO 610 when it is full. DCSM 620 stops when bit 7 is set.

Bit 6 (SECWRAP1) SECTOR NUMBER WRAPPED 1: Bit 6 is set when register REQSEC (50h/51h) has wrapped to the value specified in register WRAPTOSEC1 (5Eh/5Fh) as a result of having reached the value in register WRAPSEC1 (5Ch/5Dh). DCSM 620 increments register REQSEC upon detecting an event control word that indicates the end of a data sector (EODS).

Bit 5 (SECWRAP0) SECTOR NUMBER WRAPPED 0: Bit 5 is set when register REQSEC has wrapped to the value specified in register WRAPTOSEC0 (5Ah/5Bh) as a result of having reached the value in register WRAPSEC0 (58h/59h). DCSM 620 increments REQSEC upon detecting an event control word that indicates EODS.

Bit 4 (SWCORR) SOFTWARE CORRECTABLE DETECTED: Bit 4 is set when the data ECC is not hardware correctable but is software correctable.

Bit 3 (SECHIT) SECTOR HIT: Bit 3 is set when disk controller 140 transfers a data sector, i.e. when signal DATAFIELD is asserted.

Bit 2 (SEEDOVRN) ECC SEED FIFO OVERRUN: Bit 2 is set when the corrected seed FIFO is loaded with more than two values before MPU 175 reads it to log the data sector in error. If bit STPSEEDOVR=1 (register DISKSTOP bit 6), disk controller 140 stops when bit 2 is set. The overflowing seed value is not saved, and register REQSEC points to the next data sector (REQSEC+1 or WRAPTOSEC).

Bit 1 (DCMPNEQ) Data Compare Not Equal: Bit 1 is set when the data compare by ECC controller 145 fails.

Bit 0 (WRFLTDET) WRITE FAULT DETECTED: Bit 0 is set if DCSM 620 stops due to bit STPWRFAULT (register DCTL1 bit 3).

Register DISKINT1

Bit 7 (EOSTO) END OF SERVO PULSE TIMEOUT: Bit 7 is set when DCSM 620 does not detect an EOS pulse within one data frame time defined by register FRAMESIZE (76b/77h).

Bit 6 (SECTO) SECTOR TIMEOUT: Bit 6 is set when DCSM 620 does not detect a sector pulse within one inter-sector gap time defined by register ISGCNT (44h). This only occurs in "Sector Pulse Positioning" Mode.

Bit 5 (UNCORR) UNCORRECTABLE ECC ERROR: When set, bit 5 indicates that an uncorrectable ECC error was found in the previous read sector. DCSM 620 automatically stops if the stop on uncorrectable ECC bit (register DISKSTOP bit 7) is set.

Bit 4 (SYNCBTO) SYNC BYTE DETECT TIMEOUT: Bit 4 is set when DCSM 620 does not detect a sync byte within the time defined by register SDCNT (46h).

Bit 3 (CORRECC) CORRECTED ECC ERROR: Bit 3 is set after a hardware correctable ECC error is found and has been corrected in data buffer 155.

Bit 2 (ECWPERR) EVENT CONTROL WORD PARITY ERROR: When set, bit 2 indicates an even parity error was detected out of ECW FIFO 610. This error could be associated with a defect in data buffer 155 or ECW FIFO 610. When bit 2 is set, DCSM 620 stops immediately. This bit is also reset when bit ENECWPCHK=0 (register DCTL0 bit 0).

Bit 1 (SECOKDET) SECTOR OK DETECTED: When set, bit 1 indicates that one of the following events has occurred:

a. On a write operation, the ECC redundancy for a sector data field has been written.

b. On a read operation, a sector without errors has been written to the buffer, or sector data has been corrected in the buffer.

Bit 0 (STOPPED) SEQUENCER STOPPED: When set, bit 0 indicates that DCSM 620 has changed from a running to a stopped state.

DISK INTERRUPT ENABLE REGISTER (39h, R/W, DISKINTEN0) and (3Bh, R/W, DISKINTEN1): Setting bits in registers DISKINTEN0 and DISKINTEN1 enables corresponding bits in status registers DISKINT0 and DISKINT0 to generate an interrupt to MPU 175. Clearing a bit inhibits the interrupt for the corresponding status bit, but has no effect on the state of that status bit.

VFO COUNT REGISTER (40h, R/W, VFOCNT): Register VFOCNT contains the number of bytes of VFO field to write when write gate is asserted. The VFO pattern is always 00h, except if WNRZINIT=1 (register DCTL0 bit 1) then the first byte is FFh.

TRAINING FIELD COUNT REGISTER (41h, R/W, TFCNT): Register TFCNT contains the number of bytes of training field written after the VFO field. The training field pattern is defined by register TFPAT (48h). If a training field is not desired, setting TFCNT to 1 and TFPAT1 to 00h writes one byte which is part of the VFO field.

SYNC BYTE FIELD COUNT REGISTER (42h, R/W, SBCNT): Register SBCNT contains the number of sync bytes written after the VFO and training fields. The sync byte pattern is defined by register SBPAT (4Ah-4Ch). Only values of 1, 2, and 3 are valid for SBCNT. A value of 1 writes pattern SBPAT0 and reads one sync byte of expected pattern SBPAT0. A value of 2 writes two sync bytes of pattern {SBPAT1,SBPAT0} and reads two sync bytes of expected pattern {SBPAT1,SBPAT0}. A value of 3 writes three sync bytes of pattern {SBPAT2,SBPAT1,SBPAT0}, but a read must use the external sync detection mode.

PAD FIELD COUNT REGISTER (43h, R/W, PADCNT): Register PADCNT contains the number of bytes in a pad field written after the data or ECC. The pad pattern is always 00h. Write gate is always negated after writing the pad field.

ISG COUNT REGISTER (44h, R/W, ISGCNT): Register ISGCNT contains the number of bytes to wait between data sectors when in "Byte Count Positioning" mode. In "Sector Pulse Positioning" mode, ISGCNT is a sector pulse detection window. If a sector pulse is not detected within this time, disk controller 140 halts.

READ GATE DELAY COUNT REGISTER (45h, R/W, RGDLY): Register RGDLY contains the number of bytes to wait before asserting the read gate, after a VFO field is believed to have started. This delay prevents reading of a write splice.

SYNC BYTE DETECT COUNT REGISTER (46h, R/W, SDCNT): Register SDCNT contains the number of bytes to wait for sync byte detection after read gate is asserted.

VFO LOCK COUNT REGISTER (47h, R/W, VFOLOCK): Register VFOLOCK contains the number of bytes to wait after setting read gate before looking for a sync field or external SYNCF.

TRAINING FIELD PATTERN (48h-4Eh, R/W, TFPAT1 to TFPAT7): Registers TFPAT1 to TFPAT7 store bytes for a training field between a VFO field and a data sync field. A number of bytes indicated by register TFCNT are in the training field are written sequentially from TFPAT1 to TFPAT7.

FORMAT PATTERN (4Fh, R/W, FORMAT): Register FORMAT stores a byte repeated for a data field during a write when SUPXFR=1 (register DCTL1 bit 6).

REQUEST SECTOR NUMBER REGISTER (50h/51h, R/W, REQSEC): Register REQSEC defines the physical sector number of the next requested sector and is compared to register CURRSEC and to generate a signal SECHIT to DCSM 620. Register REQSEC is incremented when DCSM 620 completes transfer of a requested sector.

Register REQSEC0 (50h (51h)) is the low byte of the sector number.

Register REQSEC1 (51h (50h)):

Bit 7 (EOT) END OF TRANSFER: Bit 7 is set when the sector number in register REQSEC equals the sector number register STOPSEC (52h).

Bits 6:2 are reserved.

Bits 1:0 are the two most significant bits of the sector number. The addresses of registers REQSEC1 and REQSEC0 are swapped to the parenthesized values when SWAPADD=1.

STOP SECTOR NUMBER REGISTER (52h/53h, R/W, STOPSEC): Register STOPSEC is compared to register REQSEC to determine the end-of-transfer status. DCSM 620 stops at the end of the data sector if the sector number in register REQSEC equals the sector number in register REQSEC but only if the WRAPSEC0 and/or WRAPSEC1 registers have not been loaded, or if the wrap has not occurred. Register STOPSEC can be updated on-the-fly. AFTA processor 170 loads register STOPSEC when AFTADSEC=1 (register DCTL4 bit 2), and MPU 175 can only read it then.

Register STOPSEC0 (52h(53h), R/W) is the low byte of register STOPSEC.

Register STOPSEC1 (53h(52h), R/W)

Bits 7:2 are reserved.

BitS 1:0 are the two most significant bits of register STOPSEC. The addresses of registers STOPSEC1 and STOPSEC0 are swapped to the parenthesized values when SWAPADD=1.

CURRENT SECTOR NUMBER REGISTER (54h/55h, R/W, CURRSEC): Register CURRSEC indicates the position of read/write heads 114 and is compared to register REQSEC. When register REQSEC equals register CURRSEC, DCSM 620 is signaled that the requested sector envelope is reached. Register CURRSEC increments at the end of each data sector and wraps to 000h when the CURRSEC=CURRSECMAX. AFTA processor 170 can load register CURRSEC if AFTADSEC=1 (register DCTL4 bit 2), and MPU 175 can only read it then. The addresses of registers CURRSEC1 and CURRSEC0 are swapped to the parenthesized values when SWAPADD=1.

Register CURRSEC 0 (54h(55h), R/W) is the low byte of the data sector number.

Register CURRSEC1 (55h(54h), R/W)

Bit 7 (CURRSECEQ) CURRENT SECTOR EQUALS REQUEST SECTOR: Bit 7 is asserted when CURRSEC equals REQSEC.

Bit 6 (EOSCMPEQ) EOS COUNTER EQUALS EOS COMPARE: Bit 6 is asserted when EOSCTR equals EOSCMP.

Bit 5 (EOSMAXEQ) EOS COUNTER EQUALS EOS MAXIMUM: Bit 5 is asserted when EOSCTR equals EOSMAX.

Bit 4 (CURRMAXEQ) CURRENT SECTOR EQUALS MAXIMUM CURRENT SECTOR: Bit 4 is asserted when CURRSEC equals CURRSECMAX.

Bits 3:2 are reserved.

Bit 1:0 are the two most significant bits of the data sector number.

CURRENT SECTOR NUMBER MAXIMUM REGISTER (56h/57h, R/W, CURRSECMAX) Register CURRSECMAX defines the value at which register CURRSEC wraps to 000h. AFTA processor 170 can load register CURRSECMAX when AFTADSEC=1 (register DCTL4 bit 2), when MPU 175 can only read it. The addresses of registers CURRSECMAX1 and CURRSECMAX0 are swapped to the parenthesized values when SWAPADD=1.

Register CURRSECMAX0 (56h(57h), R/W)

Bits 7:0 are the low byte of register CURRSECMAX.

Register CURRSECMAX1 (57h(56h), R/W)

Bits 7:2 are reserved. Bits 1:0 are the two most significant bits of register CURRSECMAX.

WRAP SECTOR 0 REGISTER (58h/59h, R/W, WRAPSEC0) Register WRAPSEC0 store the sector number at which the register REQSEC wraps to the contents of the register WRAPTOSEC0. Register REQSEC wraps to the indicated value when DCSM 620 increments REQSEC while it equals WRAPSEC0. This wrap function is only enabled if WRAPSEC0 is loaded, and when the wrap occurs the wrap function is disabled. If register WRAPSEC1 is loaded before WRAPSEC0 is loaded, the wrap function for WRAPSEC0 is not enabled until the wrap at WRAPSEC1 occurs. AFTA processor 170 can load register WRAPSEC0 when AFTADSEC=1 (DCTL4 Reg 34h bit 2), when MPU 175 can only read it. The addresses of registers WRAPSEC00 and WRAPSEC01 are swapped to the parenthesized values when SWAPADD=1.

Register WRAPSEC00 (58h(59h), R/W) is the low byte of register WRAPSEC0.

Register WRAPSEC01 (59h(58h), R/W)

Bits 7:2 are reserved. Bits 1:0 are the two most significant bits of register WRAPSEC0.

WRAP TO SECTOR 0 REGISTER (5Ah/5Bh, R/W, WRAPTOSEC0): Register WRAPTOSEC0 specifies the value that register REQSEC wraps to when incremented past the value in register WRAPSEC0. AFTA processor 170 can load register WRAPTOSEC0 when AFTADSEC=1 (register DCTL4 bit 2), and MPU 175 can only read it. The addresses registers WRAPTOSEC00 and WRAPTOSEC01 are swapped to the parenthesized values when SWAPADD=1.

Register WRAPTOSEC00 (5Ah(5Bh), R/W) is the low byte of register WRAPTOSEC0.

Register WRAPTOSEC01 (5Bh(5Ah), R/W)

Bit 7:2 are reserved. Bits 1:0 are the two most significant bits of register WRAPTOSEC0.

WRAP SECTOR 1 REGISTER (5Ch/5Dh, R/W, WRAPSEC1): Register WRAPTOSEC1 specifies the value that register REQSEC wraps to when incremented past the value in register WRAPSEC1. AFTA processor 170 can load register WRAPTOSEC1 when AFTADSEC=1 (register DCTL4 bit 2), and MPU 175 can only read it. The addresses registers WRAPTOSEC10 and WRAPTOSEC11 are swapped to the parenthesized values when SWAPADD=1.

Register WRAPTOSEC10 (5Ch(5Dh), R/W) is the low byte of register WRAPTOSEC1.

Register WRAPTOSEC11 (5Dh(5Ch), R/W)

Bit 7:2 are reserved.

Bits 1:0 are the two most significant bits of register WRAPTOSEC0.

WRAP TO SECTOR 1 REGISTER (5Eh/5Fh, R/W, WRAPTOSEC1) Register WRAPTOSEC1 specifies the value that register REQSEC wraps to when incremented past the value in register WRAPSEC1. Register WRAPTOSEC1 is only used in implementations using AFTA processor 170. When AFTADSEC=1 (register DCTL4 bit 2), AFTA processor 170 can load register WRAPTOSEC1, and MPU 175 can only read it. The WRAPTOSEC10 and WRAPTOSEC11 Register addresses are swapped to the parenthesized values when SWAPADD=1. Register WRAP- TOSEC10 (5Eh(5Fh), R/W) is the low byte of register WRAPTOSEC1. Register WRAPTOSEC11 (5Fh(5Eh), R/W) bits 1:0 are the two most significant bits of register WRAPTOSEC1.

EOS COUNTER (60h, R/W, EOSCTR) Counter EOSCTR is an 8-bit counter which indicates the current Frame Number. Counter EOSCTR increments every EOS pulse and wraps to 00h on an EOS pulse when counter EOSCTR equals register EOSCMP (62h). When ENIDXEOS=1 (register DCTL4 bit 1), counter EOSCTR resets to 00h when signal INDEX is asserted. Counter EOSCTR cannot be loaded at the same time as EOS or INDEX Pulse.

EOS MAXIMUM REGISTER (61h, R/W, EOSMAX) Register EOSMAX stores the maximum frame number for a track. When AFTADSEC=1 (register DCTL4 bit 2), AFTA processor 170 can load, but MPU 175 can only read register EOSMAX.

EOS COMPARE REGISTER (62h, R/W, EOSCMP) Register EOSCMP stores the target frame number where the first requested data sector starts. When the target frame number equals the contents of counter EOSCTR and an EOS pulse is asserted, DCSM 620 begins processing event control words and monitoring frame fields. when AFTADSEC=1 (DCTL4 Reg 34h bit 2), AFTA processor 170 can load, but local MPU can only read register EOSCMP.

ECC SEED REGISTER (64h/65h/67h, W, SEED) Register SEED stores the 3 most significant bytes of an ECC Seed sent to ECC controller 145. Bits 9:0 are sourced from register REQSEC. Register SEED is used when ENSEED=1 (register DCTL4 bit 0) and a new data segment is processed. When this occurs, a 4-byte seed {SEED3, SEED2, SEED1, REQSEC1, REQSEC0} is sent to ECC controller 145. The SEED2 and SEED3 Register addresses are swapped when SWAPADD=1. The SEED1 Register address is changed to the parenthesized values when SWAPADD=1. Register SEED2 (64h(65h), W) contains bits 23:16 of the ECC Seed. Register SEED3 (65h(64h), W) contains bits 31:24 of the ECC Seed. Register SEED1 (67h(66h), W) bits 7:2 contains bits 15:10 of the ECC seed. Bit 1:0 are reserved.

CORRECTED SEED FIFO (68h/69h, R, CSEED) The Corrected Seed FIFO is loaded with the current ECC Seed Value when register REQSEC is incremented and there is a current ECC Error. However, this entry is not valid until ECC controller 145 determines the ECC error is correctable and has corrected the error in data buffer 155. After two values are pushed into FIFO CSEED, FIFO CSEED is full, and further pushes sets status bit SEEDOVRN (register DISKINT0 bit 2). The overflow seed value is not stored to preserve the last value pushed. Disk controller 140 stops when SEEDOVRN is set if STPSEEDOVR=1 (register DISKSTOP bit 6). When MPU 175 reads FIFO CSEED, the first available value is popped on the second byte read. In Motorola Addressing Mode this occurs when CSEED0 Reg 68h is read. In Intel Addressing Mode this occurs when CSEED1 Reg 68h is read. These registers can be read while disk controller 140 is running without corrupting FIFO CSEED. FIFO CSEED resets when ENSEED=0 (register DCTL4 bit 0). The CSEED0 and CSEED1 Register addresses are swapped to the parenthesized values when SWAPADD=1.

Register CSEED0 (68h(69h), R) contains are bits 7:0 of the first corrected seed entered into FIFO CSEED since the last read of FIFO CSEED.

Register CSEED1 (69h(68h), R) bit 7 (CSEEDVALID) is set when the value in FIFO CSEED is valid. When the microprocessor reads FIFO CSEED bit 7 is reset if FIFO CSEED is empty. Bit 6:3 are reserved. Bit 1:0 are bits 9:8 of the first corrected seed entered into FIFO CSEED since the last read of FIFO CSEED.

SEGMENT OVERHEAD WAIT COUNT (6Bh, R/W, DSOWC) Register DSOWC stores the total length of overhead frame fields in a data segment, i.e. the sum of values from registers VFOCNT, TFCNT, SBCNT, and PADCNT. In "Byte Count Positioning" mode, (SECPOS=0, register DCTL3 bit 3), the value from register ISGCNT is also added.

SYNC BYTE PATTERN (6Ch/6Dh/6Eh, R/W, SBPAT0/1/2) Register SBPAT stores bytes for a data sync field written when write gate is asserted and expected when read gate is asserted.

ECW FIFO (70h/71h, R/W, DECWFIFO) ECW FIFO 610 is loaded with event control words in two ways. One way is from data buffer 155 which is done automatically when ENBUFCW=1 and ECW FIFO 610 is not full. The other way (ENBUFCW=0) is MPU 175 writes directly to address in disk controller 140 corresponding to ECW FIFO 610. A 16-bit value is pushed into ECW FIFO 610 on writing to address 71h which means the order is always address 70h followed by 71h. This ordering enables word writes to this 8-bit device to operate ECW FIFO 610 properly in both Intel and Motorola addressing modes. The read operates in the same manner with the pop occurring on address 71h, but only if ENCWPOP=1 (register DCTL3 bit 2). DCSM 620 must be quiescent to assure valid data on the read. DECW-FIFO0 and DECWFIFO1 register addresses are swapped to the parenthesized values when SWAPADD=1. Addresses DECWFIFO0 and DECWFIFO0 are the low and high order bytes of the 8 word ECW FIFO 610 when ENBUFCW=0 (register DCTL3 bit 1). When ENBUFCW=1, MPU 175 cannot write to ECW FIFO 610.

BYTE COUNTER (72h (73h), R, DEBC): Byte counter 630 is synchronized to the EOS pulse and counts bytes to determine the subsequent position within a data frame. When in sector positioning mode byte counter re-synchronizes to each sector pulse. DCSM 620 loads byte counter 630 from field EVENTC of event control word in ECW FIFO 610 or one of registers VFOCNT, TFCNT, SBCNT, PADCNT, RGDLY, SDCNT, VFOLOCK, DSOWC, and FRAMESIZE. Byte counter 630 only counts when DCSM 620 is running (RUN=1 in register DCSMADR). Registers DEBC0 (72h (73h), R) and DEBC1 (73h (72h), R) hold the low and high order bytes of byte counter 630. Registers DEBC0 and DEBC1 swap addresses to the parenthesized values when SWAPADD=1.

DISK EVENT BYTE COUNT STATUS DEBCSTAT (74h, R, DEBCSTAT)

Bits 7:4 (DEBCTYPE) DISK EVENT BYTE COUNT TYPE: DEBCTYPE defines the type of count in byte counter 630. Types are defined as follows: 1 VFO Field Count; 2 Training Field Count; 3 Sync Byte Field Count; 4 Pad Field Count; 5 Inter-Sector Gap Wait Count; 6 Read Gate Delay; 7 Sync Byte Detect Window Count; 8 Sector Pulse Window Count; 9 EDA Control Word Event Count, the type of event described in register DECWSTAT (75h); 10 Frame Size Count; 11 Segment Overhead Wait Count; and 12 Secondary Format Count.

Bit 3:0 (DECWFCNT) DISK EVENT CONTROL WORD FIFO COUNT [3:0]: DECWFCNT reflect the number of bytes currently in ECW FIFO 610. A value of 8 is FULL and a value of 0 is empty.

DISK EVENT CONTROL WORD STATUS (75h, R, DECWSTAT)

Bit 7 (PARITY) EVEN PARITY: This bit is EVEN PARITY bit 15 of the event control word or extension currently active in byte counter 630, but only if DEBCTYPE is 8h or Bh in register DEBCSTAT bits 7:4. The currently active control word is not the current value out of ECW FIFO 610.

Bit 6 (SKIP/EOF) SKIP SECTOR/END OF FRAME: SKIP/EOF is bit 14 of the event control word (SKIP) or the extension (EOF) that is currently active in byte counter 630, but only if DEBCTYPE is 8h or Bh.

Bit 5 (SEGSEL/EODS)SEGMENT SELECT [3]/END OF DATA SECTOR: SEGSEL/EODS is bit 13 of the event control word (SEGSEL[3]) or extension (EODS) that is currently active in byte counter 630, but only if DEBCTYPE 8h or Bh.

Bits 4:2 (SEGSEL) SEGSEL[2:0] are bits 12:10 of the event control word that is currently active in byte counter 630, but only if DEBCTYPE is 8h.

Bit 1:0 are reserved.

FRAME SIZE (76h /77h, R/W, FRAMESIZE) Register FRAMESIZE stores the size in bytes of a data frame and is loaded into register DEBC when waiting for an EOS pulse. DCSM 620 halts if the EOS pulse is not detected within this time. Registers FRAMESIZE1 and FRAMESIZE0 swap address to the parenthesized values when SWAPADD=1.

DATA COUNTER (78h/79h, R, DC) Data counter 685 counts data and ECC fields of a data sector. DCSM 620 loads data counter 685 from register DSECSIZE at the beginning of a new data sector defined by as indicated by an event control word. As a data field is transferred, data counter 685 counts down. Upon reaching 0, data counter 685 is loaded from register DECCSIZE and continues to count down during the data segment reaching reaches 0 and stopping. After stopping, the DCTYPE is 1. When data counter is loaded from register DSECSIZE, DCTYPE is reset to 0, and when loaded from register DECCSIZE, DCTYPE is set to 1. DC1 and DC0 Register addresses are swapped to the parenthesized values when SWAPADD=1.

Register DC0 (78h (79h), R) is the low order byte of data counter 685.

Register DC1 (79h (78h), R)

Bit 7 (DCTYPE) DATA BYTE COUNTER TYPE: Bit 7 defines the type of count currently in DC[10:0]. When DCTYPE=0 the count is DSECSIZE, and when DCTYPE=1 the count is DECCSIZE.

Bits 6:3 are reserved.

Bits 2:0 (DC) DATA BYTE COUNTER [10:8]: This register are the most significant bits of data counter 685.

DISK SECTOR SIZE (7Ah/7Bh, R/W, DSECSIZE): Register DSECSIZE stores the size of the data portion of a data sector. See register DC.

DISK ECC SIZE (7Ch, R/W, DECCSIZE): Register DECCSIZE stores a 5-bit byte count for the ECC field.

DISK FIFO STATUS REGISTER (7Dh, R, DFSTAT):

Bit 7 (DFERR) DISK FIFO ERROR: When bit 7 is set, DFIFO 640 has overrun (write to full FIFO) or underrun (read from empty FIFO). Bit 7 is reset when DFIFO 640 is reset. DCSM 620 stops when bit 7 is set if STPBERR=1 (register DISKSTOP bit 5 is set).

Bits 6 are reserved.

Bits 5:0 (DFCNT) DISK FIFO BYTE COUNT [5:0]: DFCNT indicates the number of bytes currently in DFIFO 640. A value of 00h is EMPTY and a value of 20h is FULL.

APPENDIX B

The following tables describe an instruction set for alignment processor 170 such as shown in FIGS. 7A and 7B. In the following tables, Rs and Rd are variables in memory 750, and RXw is a register external to alignment processor 170. Bit values x are irrelevant.

TABLE B1

AFTA Processor Instruction Set

| INSTRUCTION | MACHINE CODE | # COMMENTS |
|---|---|---|
| NOOP | 0000 0000 0000 0000 | No Operation |
| HALT | 0000 0000 0000 0001 | Unconditional Halt |
| Reserved | 0000 0000 0000 1xxx | |
| Reserved | 0000 0000 0001 xxxx | |
| Reserved | 0000 0000 001x xxxx | |
| Reserved | 0000 0000 01xx xxxx | |
| JUMP a | 0000 0000 1aaa aaaa | Jump to Address a. |
| SEQCTL1 Cn | 0000 0001 nnnn nnnn | Execute command C1n. See Table B2. |
| SEQCTL2 Cn | 0000 0010 nnnn nnnn | Execute command C2n. See Table B3. |
| CHKCRC b Rs | 0000 0011 bbbs ssss | Check CRC for Table Starting at DBASE[bbb]: (DVRAM@Rs). See Table B4. |
| RSTFLAG d | 0000 0100 dddd dddd | Reset Flag if d = 1 |
| SETFLAG d | 0000 0101 dddd dddd | Set Flag if d = 1 |
| SETMSG m | 0000 0110 mmmmm mmmmm | MESSAGE = m |
| ADDC Rs | 0000 0111 000s ssss | Rs = Rs + CARRY |
| SUBC Rs | 0000 0111 001s ssss | Rs = Rs – CARRY |
| Reserved | 0000 0111 01xx xxxx | |
| Reserved | 0000 0111 1xxx xxxx | |
| OVERLAY c p | 0000 1000 00cc cccc pppp pppp pppp pppp | Load cc bytes of an overlay from BMEM@DCBASE:pppp |
| Reserved | 0000 1000 01xx xxxx | |
| Reserved | 0000 1000 1xxx xxxx | |
| Reserved | 0000 1001 xxxx xxxx | |
| Reserved | 0000 101x xxxx xxxx | |
| Reserved | 0000 11xx xxxx xxxx | |
| LOAD Rd v | 0001 00dd dddx xxxx vvvv vvvv vvvv vvvv | Rd = v |
| MOVE Rd Rs | 0001 01dd ddds ssss | Rd = Rs |
| ADD Rd Rs | 0001 10dd ddds ssss | Rd = Rd + Rs |
| SUB Rd Rs | 0001 11dd ddds ssss | Rd = Rd – Rs |
| STORE b Rs Rd | 001b bbdd ddds ssss | BMEM@DBASE[b]:(DVRAM@Rd) = Rs See Table B4. |
| FETCH b Rd Rs | 010b bbdd ddds ssss | Rd = BMEM@DBASE[b]:(DVRAM@Rs) See Table B4. |
| ADDX Rd Rs v | 0110 00dd ddds ssss vvvv vvvv vvvv vvvv | Rd = Rs + v |
| SUBX Rd Rs v | 0110 01dd ddds ssss vvvv vvvv vvvv vvvv | Rd = Rs – v |
| ADDI Rd v | 0110 10dd dddv vvvv | Rd = Rd + v |
| SUBI Rd v | 0110 11dd dddv vvvv | Rd = Rd – v |
| AND Rd Rs | 0111 00dd ddds ssss | Rd = Rd & Rs |
| OR Rd Rs | 0111 01dd ddds ssss | Rd = Rd | Rs |
| ANDI Rd Rs d | 0111 10dd ddds ssss dddd dddd dddd dddd | Rd = Rs & d |
| ORI Rd Rs d | 0111 11dd ddds ssss dddd dddd dddd dddd | Rd = Rs | d |
| SHIFTR Rd n | 1000 xxdd dddx nnnn | Rd = Rd >> n |
| SHIFTL Rd n | 1001 xxdd dddx nnnn | Rd = Rd << n |
| SETPARITY Rd | 1010 00dd dddx xxxx | Rd = Rd with Bit 15 set or reset for even parity. |
| SETRBIT Rs | 1010 01xx xxxs ssss | RBIT = Rs |
| SETRSEG Rs | 1010 1xxx xxxs ssss | RSEG = Rs[13:10] |
| CMPEQ Rd Rs a | 1011 00dd ddds ssss 000x xxxx xaaa aaaa | If Rs = Rd jump to a. |
| CMPNEQ Rd Rs a | 1011 00dd ddds ssss 001x xxxx xaaa aaaa | If Rs!= Rd jump to a. |
| CMPL Rd Rs a | 1011 00dd ddds ssss 010x xxxx xaaa aaaa | If Rs < Rd jump to a. |
| CMPGT Rd Rs a | 1011 00dd ddds ssss 011x xxxx xaaa aaaa | If Rs > Rd jump to a. |
| CMPLE Rd Rs a | 1011 00dd ddds ssss 100x xxxx xaaa aaaa | If Rs <= Rd jump to a. |

TABLE B1-continued

AFTA Processor Instruction Set

| INSTRUCTION | MACHINE CODE | # COMMENTS |
|---|---|---|
| CMPGE Rd Rs a | 1011 00dd ddds ssss<br>101x xxxx xaaa aaaa | If Rs >= Rd jump to a. |
| Reserved | 1011 01xx xxxx xxxx | |
| WRITE RXw Rs | 1011 10ww wwws ssss | RXW = Rs. See Table B5. |
| READ RXw Rs | 1011 11ww wwws ssss | Rs = RXw. See Table B5. |
| BRANCH0 b a | 1100 bbbb baaa aaaa | If Bit(b) = 0, go to a. See Table B6. |
| BRANCH1 b a | 1101 bbbb baaa aaaa | If Bit(b) = 1, go to a. See Table B6. |
| RBIT0 b a | 1110 0bbb baaa aaaa | If RBIT(b) = 0 jump to a. |
| RBIT1 b a | 1110 1bbb baaa aaaa | If RBIT(b) = 1 jump to a. |
| Reserved | 1111 xxxx xxxx xxxx | |

TABLE B2

Bit Significant Command 1 Field Definition

| n | Command Cn | Definition |
|---|---|---|
| 0 | ENEDAECW | Enable the ECW FIFO |
| 1 | STARTDCSM | Start Disk Control State Machine |
| 2 | ENHOSTLINK | Enable Host Link Port in Buffer Controller |
| 3 | ENDISKLINK | Enable Disk Link Port in Buffer Controller |
| 4 | SETDWRITE | Sets write operation in disk controller. |

TABLE B3

Bit Significant Command 2 Field Definition

| n | Command Cn | Definition |
|---|---|---|
| 0 | DSBLEDAECW | Disable the ECW FIFO |
| 1 | RSTEDAECW | Reset the ECW FIFO |
| 2 | STOPDCSM | Stop Disk Control State Machine |
| 3 | DSBLHOSTLINK | Disable Host Link Port in Buffer Controller |
| 4 | DSBLDISKLINK | Disable Disk Link Port in Buffer Controller |
| 5 | RSTDWRITE | Sets read operation in disk controller. |

TABLE B4

Disk Base Register Select (DBASE[b])

| bbb | Base Register | Description |
|---|---|---|
| 000 | DZBASE | Base to LZ Configuration and Format Tables, used as BADR[23:16] |
| 001 | DZBASE | Base to LZ Configuration and Format Tables, used as BADR[23.:16] |
| 010 | DEFBASE | Base to Defect Table(s), used as BADR[23:16] |
| 011 | DCBASE | Base to Code Overlays, used as BADR[23:16] |
| 100 | Reserved | |
| 101 | DVBASE | Base to Dynamic Variable Table and EDA ECW Table, used as BADR[23:16] |

TABLE B4-continued

Disk Base Register Select (DBASE[b])

| bbb | Base Register | Description |
|---|---|---|
| 110 | EDABASE | Base to ECW table us as BADR[23:16] |
| 111 | Reserved | |

TABLE B5

External Register Select Field Definition

| w wwww | RX(w) definition | Location |
|---|---|---|
| 0 0000 | REQSEC[9:0] (Write Only) | DCTL 140 |
| 0 0001 | STOPSEC[9:0] (Write Only) | DCTL 140 |
| 0 0010 | CURRSEC[9:0] (Write Only) | DCTL 140 |
| 0 0011 | CURRSECMAX[9:0] (Write Only) | DCTL 140 |
| 0 0100 | WRAPSEC0[9:0] (Write Only) | DCTL 140 |
| 0 0101 | WRAPTOSEC0[9:0] (Write Only) | DCTL 140 |
| 0 0110 | WRAPSEC1[9:0] (Write Only) | DCTL 140 |
| 0 0111 | WRAPTOSEC1[9:0] (Write Only) | DCTL 140 |
| 0 1000 | EOSMAX[7:0] (Write Only) | DCTL 140 |
| 0 1001 | EOSCMP[7:0] (Write Only) | DCTL 140 |
| 0 1010 | EOSCTR[7:0] (Read Only) | DCTL 140 |
| 0 1011 | Reserved | Reserved |
| 0 1100 | EOSMAX[7:0] (Write Only) | DCTL 140 |
| 0 1101 | EOSCMP[7:0] (Write Only) | DCTL 140 |
| 0 1110 | EOSCTR[7:0] (Read Only) | DCTL 140 |
| 0 1111 | Reserved | Reserved |
| 1 0000 | EDABASE[15:0] (Write Only) | BCTL 150 |
| 1 0001 | DEFBASE[7:0] (Write Only) | BCTL 150 |
| 1 0010 | HOSTLINKPTR[7:0] (Write Only) | BCTL 150 |
| 1 0011 | DISKLINKPTR[7:0] (Write Only) | BCTL 150 |
| 1 01xx | Reserved | Reserved |
| 1 1xxx | Reserved | Reserved |

TABLE B6

Branch Select Field Definition

| bbbbb | LABEL | Definition |
|---|---|---|
| 00000 | EOSPULSE | EOS input pin active (Synchronized Pulse) |
| 00001 | INPUT | INPUT Pin active (Synchronized Level) |
| 00010 | INCURSEC | Increment current sector number pulse. |
| 00011 | MULISECTOR | RSEG[3:0] = Multiple sectors. |
| 00100 | NS | RSEG[3:0] = New data sector. |
| 00101 | EODS | RSEG[3:0] = End of data sector. |
| 00110 | EOF | RSEG[3:0] = End of frame. |
| 00111 | COMPRESSED | RSEG[3:0] = Compressed ECW. |
| 01000 | PARTIAL | RSEG[3:0] = Partial ECW. |
| 01001 | SWDEFECT | RSEG[3:0] = Swallowed Defect. |
| 01010 | CRCOK | All Buffer Table CRC Checks have been completed without Error (OR of ACTSTAT Reg 24h bits 3:0) |
| 01011 | SECWRAP0 | REQSEC has wrapped from WRAPSEC0 to WRAPTOSEC0 |
| 01100 | SECWRAP1 | REQSEC has wrapped from WRAPSEC1 to WRAPTOSEC1 |
| 01101 | CODECRCOK | All buffer table CRC checks are completed without an error. |
| 01110 | ASEQMSG | Message interrupt to MPU. |
| 01111 | BCRCAVAIL | Set when buffer controller can accept a CHKCRC command. |
| 10000 | FLAG0 | FLAG0: General Purpose Flag Bit. |
| 10001 | FLAG1 | FLAG1: General Purpose Flag Bit. |
| 10010 | FLAG2 | FLAG2: General Purpose Flag Bit. |
| 10011 | FLAG3 | FLAG3: General Purpose Flag Bit. |
| 10100 | FLAG4 | FLAG4: General Purpose Flag Bit. |
| 10101 | FLAG5 | FLAG5: General Purpose Flag Bit. |

TABLE B6-continued

Branch Select Field Definition

| bbbbb | LABEL | Definition |
|---|---|---|
| 10110 | FLAG6 | FLAG6: General Purpose Flag Bit. |
| 10111 | FLAG7 | FLAG7: General Purpose Flag Bit. |
| 11000 | ABRCH0 | ABRCH Reg 63h bit 0 |
| 11001 | ABRCH1 | ABRCH Reg 63h bit 1 |
| 11010 | ABRCH2 | ABRCH Reg 63h bit 2 |
| 11011 | ABRCH3 | ABRCH Reg 63h bit 3 |
| 11100 | ABRCH4 | ABRCH Reg 63h bit 4 |
| 11101 | ABRCH5 | ABRCH Reg 63h bit 5 |
| 11110 | ABRCH6 | ABRCH Reg 63h bit 6 |
| 11111 | ABRCH7 | ABRCH Reg 63h bit 7 |

We claim:

1. A disk control circuit comprising:
    a first counter for storage of a first value indicating a position of a head relative to a track on a disk;
    a first register for storage of a second value indicating a sector requested for a data transfer;
    a buffer controller; and
    a disk controller that controls transfers of data between the disk and a data buffer via the buffer controller, wherein the disk controller receives from the buffer controller a sequential list of control words that correspond to and identify frame fields that the head sequentially encounters during rotation of the disks decodes each control word to determine an event type indicated by the control word, increments the first value in the first counter in response to a decoded control word indicating a corresponding frame field is at the end of a data sector, and transfers data between the disk and the data buffer when the first value is equal to the second value.

2. The disk control circuit of claim 1, further comprising:
    a second counter which counts pulses that indicate when servo sectors on the disk pass the head;
    a second register, wherein the buffer controller starts at an address indicated by a value in the second register and sequentially provides control words from the data buffer to the disk controller; and
    an alignment processor operably coupled to the second counter and the second register, wherein the alignment processor identifies a control word which corresponds to a count in the second counter and writes to the second register an address for the identified control word.

3. The circuit of claim 2, wherein the alignment processor further comprises circuitry for setting the value in the first register to indicate a physical sector number corresponding to a count in the second counter.

4. The circuit of claim 3, wherein the count in the second counter indicates a data frame number and is incremented in response to an EOS pulse from a servo control system.

5. The circuit of claim 2, wherein the disk control circuit comprises a monolithic integrated circuit which includes the disk controller and the alignment processor.

6. The circuit of claim 2, wherein the alignment processor comprises:
    an instruction memory; and
    an instruction decoder which decodes and executes instructions stored in the instruction memory.

7. The circuit of claim 6, wherein in response to a first instruction, the instruction decoder loads the instruction memory with instructions.

8. The circuit of claim 6, wherein in response to a first instruction, the instruction decoder loads the instruction memory with instructions received from the data buffer via the buffer controller.

9. A method for finding storage locations in a headerless track on a disk, comprising:
    storing a table of event control words in a memory, wherein each event control word corresponds to and describes a frame field, and the event control words in the table are in an order matching an order in which a head encounters corresponding frame fields on the disk;
    decoding event control words in the order of the table; and
    incrementing a first count when a frame field which passes the head corresponds to an event control word that indicates an end of a data sector, wherein the first count indicates a physical sector number.

10. The method of claim 9, further comprising in response to the first count being equal to a physical sector number of a requested data sector, transferring data from a frame field that the corresponding an event control word indicates is a data field.

11. The method of claim 10, wherein the event control word corresponding to the data field contains an event-count indicating a storage capacity for the data field.

12. The method of claim 9, wherein each event control word has a first part which indicates an event type for a portion of the disk including the frame field corresponding to the event control word and a second part which indicates an event-count for the frame field.

13. The method of claim 12, wherein a first of the event control words corresponds to a first frame field, and the method further comprises:
    storing in a register set event-counts for fixed-length frame fields;
    identifying from the second part of the first control word an event-count for the first frame field;
    identifying from the first part of the first control word a type of second frame field which is a fixed-length frame field at a boundary of the first frame field; and
    determining from the register set an event-count for the second frame field.

14. The method of claim 9, wherein each event control word indicates whether the corresponding frame field is a data segment or a swallowed defect field.

15. The method of claim 14, wherein each event control word that indicates a frame field is a data segment also indicates whether the frame field starts a data sector.

16. The method of claim 15, wherein each event control word that indicates a frame field is a data segment also indicates whether the frame field ends a data sector.

17. The method of claim 15, wherein each event control word also indicates whether the frame field is adjacent a servo sector.

18. The method of claim 9, wherein a first of the event control words indicates a number of data segments which follow the corresponding frame field, wherein each of the following data segments has a fixed-length for the largest data segment which fits in a data frame.

19. The method of claim 15, wherein a first of the event control words indicates a number of data segments which follow the corresponding frame field, wherein each of the following data segments contains all the data in a data sector.

20. A disk controller for disk drive system, wherein a track on a disk in the disk drive system contains one or more type of variable-length frame field and one or more type of fixed-length frame field, the disk controller comprising:

a buffer for control words, wherein each control word indicates an event type and a byte count, an event type describes a series of one or more frame fields on a portion of the track containing a variable-length field, and the byte count indicates a length for the variable-length frame field;

a register set for byte counts of the types of fixed-length frame fields on the track;

a multiplexer having input ports coupled to the buffer and the register set;

a counter having an input port coupled to the multiplexer, wherein the counter loads a byte count selected via the multiplexer, changes the byte count in response to a pulse of a clock signal, and asserts a signal when the byte count reaches a cut-off value; and a state machine coupled to the buffer, the multiplexer, and the byte counter, wherein the state machine controls sequential loading of the counter with a series of one or more byte counts for a series of frame fields which correspond to an event type in a control word, and the state machine identifies boundaries of frame fields from the signal asserted by the counter.

21. The disk controller of claim 20, further comprising an input interface coupled to the register set, wherein the input interface enables an external circuit to write byte counts in registers of the resister set.

22. A method for identifying storage locations on a headerless track, comprising:

formatting a headerless track using one or more type of variable-length frame fields and one or more type of fixed-length frame fields;

storing a table of control words in a memory, wherein each control word includes an event type field and a byte count, wherein the event type field identifies a series of one or more frame fields in a portion of the track including a variable-length frame field, and the byte count indicates a length for the variable-length frame field;

storing, in a register set, a set of byte counts for the types of fixed-length frame fields on the track;

determining from the event type field of a control word a series of frame fields in a portion of the track; and using byte counts from the register set and the byte count from the control word to identify boundaries of frame fields in the portion of the track.

23. The method of claim 22, wherein the control words in the table are in an order matching an order in which a head encounters frame fields associated with the control words.

24. The method of claim 22, wherein the event type field indicates whether the variable-length field described by the control word is a data segment at a start of a data sector, a data segment at the end of a data sector, or a swallowed defect field.

* * * * *